US 6,540,940 B1

(12) United States Patent
Negoro et al.

(10) Patent No.: US 6,540,940 B1
(45) Date of Patent: Apr. 1, 2003

(54) ORIENTATION LAYER CONTAINING (METH) ACRYLIC COPOLYMER HAVING HYDROPHOBIC REPEATING UNITS

(75) Inventors: Masayuki Negoro, Minami-ashigara (JP); Ken Kawata, Minami-ashigara (JP); Hideyuki Nishikawa, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 344 days.

(21) Appl. No.: 09/643,866

(22) Filed: Aug. 23, 2000

(30) Foreign Application Priority Data

Aug. 23, 1999 (JP) .......................................... 11-235589
Sep. 6, 1999 (JP) .......................................... 11-251795
Sep. 29, 1999 (JP) .......................................... 11-276741

(51) Int. Cl.[7] .......................... C09K 19/52; C09K 19/00
(52) U.S. Cl. ................. 252/299.01; 428/1.55; 428/1.2
(58) Field of Search .................. 428/1.1, 1.2, 1.21, 428/1, 25, 1.26, 1.28, 1.3, 1.55, 1.6; 252/299.01

(56) References Cited

U.S. PATENT DOCUMENTS

| | | | | |
|---|---|---|---|---|
| 4,618,514 A | * | 10/1986 | McClelland et al. | ......... 428/1.1 |
| 5,583,679 A | * | 12/1996 | Ito et al. | ..................... 349/118 |
| 5,646,703 A | | 7/1997 | Kamada et al. | |
| 5,670,084 A | * | 9/1997 | Harada et al. | ......... 252/299.01 |
| 5,855,971 A | | 1/1999 | Kobori et al. | |

FOREIGN PATENT DOCUMENTS

| | | |
|---|---|---|
| DE | 39 11 620 | 10/1999 |
| JP | 06-214116 | 8/1994 |
| JP | 07-013021 | 1/1995 |
| JP | 07-104284 | 4/1995 |
| JP | 11-212078 | * 8/1999 ......... G02F/1/1335 |

OTHER PUBLICATIONS

Computer generated translation of Watabe Japanese Patent.*

* cited by examiner

Primary Examiner—Mark F. Huff
Assistant Examiner—Jennifer R Sadula
(74) Attorney, Agent, or Firm—Burns, Doane, Swecker & Mathis, LLP

(57) ABSTRACT

An orientation layer for aligning liquid crystal molecules is provided on a substrate. The orientation layer contains an acrylic copolymer or a methacrylic copolymer. The copolymer comprises repeating units represented by the formula (I) and repeating units represented by the formula (II) or (III).

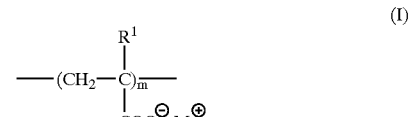

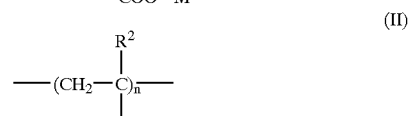

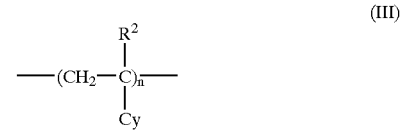

11 Claims, 5 Drawing Sheets

ORIENTATION LAYER CONTAINING (METH) ACRYLIC COPOLYMER HAVING HYDROPHOBIC REPEATING UNITS

FIELD OF THE INVENTION

The present invention relates to an orientation layer for liquid crystal molecules and a process for preparation thereof. The invention also relates to an optical compensatory sheet comprising a transparent substrate, an orientation layer and an optically anisotropic layer comprising discotic liquid crystal molecules in this order. The invention further relates to a liquid crystal display of an STN mode. The invention furthermore relates to a process of alignment of discotic liquid crystal molecules at an average inclined angle in the range of 50° to 90°.

BACKGROUND OF THE INVENTION

A liquid crystal display of an STN mode comprises a liquid crystal cell of an STN (Super Twisted Nematic) mode, two polarizing elements arranged on each side of the liquid crystal cell, and one or two optical compensatory sheets (phase retarders) arranged between the liquid crystal cell and the polarizing element.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecule. Each of the substrates has an orientation layer, which has a function of aligning the rod-like liquid crystal molecule. The rod-like liquid crystal molecules are twisted by using a chiral agent. A twist angle of the molecules is in the range of 90° to 360°.

Without use of an optical compensatory sheet, a liquid crystal display of an STN mode displays an image colored blue or yellow because of birefringence of rod-like liquid crystal molecules. The blue or yellow color is inconvenient for not only a black and white image but also a color image. An optical compensatory sheet has a function of removing color from an image to display a bright and clear image. The optical compensatory sheet also has a function of enlarging a viewing angle of a liquid crystal cell. A stretched birefringent film has usually been used as the optical compensatory sheet. Japanese Patent Provisional Publication Nos. 7(1995)-104284 and 7(1995)-13021 disclose an optical compensatory sheet made of a stretched birefringent film for a liquid crystal display of an STN mode.

An optical compensatory sheet comprising an optically anisotropic layer on a transparent substrate has been proposed to be used in place of the stretched birefringent film. The optically anisotropic layer is formed by aligning discotic liquid crystal molecules and fixing the aligned molecules. The discotic liquid crystal molecules usually have large birefringence. The discotic liquid crystal molecules also have various alignment forms. Accordingly, an optical compensatory sheet obtained by using the discotic liquid crystal molecule has a specific optical characteristic that cannot be obtained by the conventional stretched birefringent film. The optical compensatory sheet using the discotic liquid crystal molecule is disclosed in Japanese Patent Provisional Publication No. 6(1994)-214116, U.S. Pat. Nos. 5,583,679, 5,646,703 and German Patent Publication No. 3,911,620A1. However, the disclosed optical compensatory sheet is designed to be used in a liquid crystal display of a TN (Twisted Nematic) mode.

The optical compensatory sheet containing the discotic liquid crystal molecules should be redesigned to be used in a liquid crystal display of an STN mode. In a liquid crystal cell of the STN mode, rod-like liquid crystal molecules are aligned according to a super twisted birefringent mode at a twist angle of larger than 90°. The liquid crystal display of the STN mode can display a clear image of a large volume according to a time-sharing addressing method even though the display has a simple matrix electrode structure (having no active matrix such as a thin film transistor or a diode).

The discotic liquid crystal molecules should be essentially vertically aligned (homogeneously aligned) to optically compensate the liquid crystal cell of the STN mode. The discotic liquid crystal molecules are preferably further twisted.

Japanese Patent Provisional Publication No. 9(1997)-26572 discloses an optical compensatory sheet in which discotic liquid crystal molecules are twisted. The drawings of Japanese Patent Provisional Publication No. 9(1997)-26572 further illustrate that discotic liquid crystal molecules are essentially vertically aligned. According to the method disclosed in Japanese Patent Provisional Publication No. 9(1997)-26572, discotic liquid crystal molecules are essentially vertically aligned by coating the molecules on a glass substrate, drying them, and applying magnetic field to them along a direction parallel to the substrate.

SUMMARY OF THE INVENTION

The method disclosed in Japanese Patent Provisional Publication No. 9(1997)-26572 requires a specific apparatus for magnetic alignment of the discotic liquid crystal molecules. Further, it is technically difficult to reproduce the magnetic alignment.

On the other hand, rod-like liquid crystal molecules used in a liquid crystal cell have been investigated to align the molecule essentially vertically (homeotropic alignment). For example, a liquid crystal display of a vertical alignment (VA) mode uses an orientation layer having a function of essentially vertically aligning rod-like liquid crystal molecules. In the liquid crystal display of the VA mode, rod-like liquid crystal molecules are essentially vertically aligned while not applying voltage to the cell, and are essentially horizontally aligned while applying voltage to the cell. Various orientation layers have been proposed to align rod-like liquid crystal molecules.

However, it is technically difficult to align discotic liquid crystal molecules uniformly (monodomain alignment) from an interface facing an orientation layer to another interface facing the air by using an orientation layer proposed to align rod-like liquid crystal molecules. Most of the orientation layers having a function of aligning rod-like liquid crystal molecules are not effective in aligning discotic liquid crystal molecules.

An object of the present invention is to provide an orientation layer having a function of aligning liquid crystal molecule (particularly discotic liquid crystal molecules) vertically.

Another object of the invention is to provide an optical compensatory sheet suitable for a liquid crystal display of an STN mode.

A further object of the invention is to provide a liquid crystal display of an STN mode that can display a clear image of a high contrast, in which blue or yellow color caused by birefringence of rod-like liquid crystal molecule is reduced.

A furthermore object of the invention is to provide a method for vertical, uniform and stable alignment of discotic liquid crystal molecules.

The present invention provides an orientation layer for aligning liquid crystal molecules provided on a substrate, wherein the orientation layer contains an acrylic copolymer or a methacrylic copolymer comprising repeating units represented by the formula (I) and repeating units represented by the formula (II) or (III):

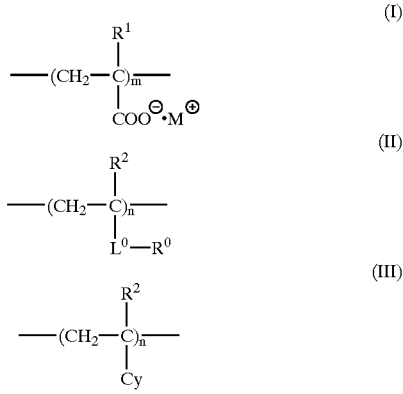

in which $R^1$ is hydrogen or methyl; $R^2$ is hydrogen, a halogen atom or an alkyl group having 1 to 6 carbon atoms; M is proton, an alkali metal ion or an ammonium ion; $L^0$ is a divalent linking group selected from the group consisting of —O—, —CO—, —NH—, —SO$_2$—, an alkylene group, an alkenylene group, an arylene group and a combination thereof; $R^0$ is a hydrocarbon group having 10 to 100 carbon atoms or a fluorine atom substituted hydrocarbon group having 1 to 100 carbon atoms; Cy is an alicyclic group, an aromatic group or a heterocyclic group; m is 10 to 99 mole %; and n is 1 to 90 mole %.

The invention also provides a process for the preparation of an orientation layer which comprises the steps of: coating a solution of an acrylic copolymer or a methacrylic copolymer comprising repeating units represented by the formula (I) and repeating units represented by the formula (II) or (III) on a substrate to form a coated layer; drying the coated layer; rubbing a surface of the coated layer; and heating the coated layer at 50 to 300° C. in this order.

The invention further provides an optical compensatory sheet comprising a transparent substrate, an orientation layer and an optically anisotropic layer in this order, said optically anisotropic layer comprising discotic liquid crystal molecules, wherein the orientation layer contains an acrylic copolymer or a methacrylic copolymer comprising repeating units represented by the formula (I) and repeating units represented by the formula (II) or (III), said discotic liquid crystal molecules being aligned at an average inclined angle in the range of 50° to 90°.

The invention furthermore provides a liquid crystal display comprising a liquid crystal cell of an STN mode, two polarizing elements arranged on each side of the liquid crystal cell and one or two optical compensatory sheets arranged between the liquid crystal cell and the polarizing elements, wherein the optical compensatory sheet comprises a transparent substrate, an orientation layer and an optically anisotropic layer in order, said transparent substrate being adjacent to the polarizing element, said optically anisotropic layer comprising discotic liquid crystal molecules, said orientation layer containing an acrylic copolymer or a methacrylic copolymer comprising repeating units represented by the formula (I) and repeating units represented by the formula (II) or (III), said discotic liquid crystal molecules being aligned at an average inclined angle in the range of 50° to 90°, and said discotic liquid crystal molecules being twisted at a twist angle in the range of 90° to 360°.

The invention still furthermore provides a method of alignment of discotic liquid crystal molecules, which comprises forming an optically anisotropic layer comprising discotic liquid crystal molecules on an orientation layer containing an acrylic copolymer or a methacrylic copolymer comprising repeating units represented by the formula (I) and repeating units represented by the formula (II) or (III) to align the discotic liquid crystal molecules at an average inclined angle in the range of 50° to 90°.

In the present specification, the term "average inclined angle" means an average of angles between discotic planes of discotic liquid crystal molecules (or long axes of rod-like liquid crystal molecules) and a surface of a transparent substrate (or a surface of an orientation layer). The present specification refers to alignment of liquid crystal molecules at an average inclined angle in the range of 50° to 90° as essentially vertical alignment of the molecules.

The present inventors have succeeded in obtaining essentially vertical, uniform and stable alignment of liquid crystal molecules by using an orientation layer containing a specific (meth)acrylic copolymer. The copolymer has repeating units having a side chain containing a hydrocarbon group, a side chain containing a fluorine atom substituted hydrocarbon group or a cyclic structure directly attached to a main chain. The orientation layer is particularly effective in aligning discotic liquid crystal molecule.

An optical compensatory sheet suitable for a liquid crystal display of an STN mode is now obtained by using the discotic liquid crystal molecules of the essentially vertical, uniform and stable alignment. Thus, blue or yellow color is reduced in a liquid crystal display of an STN mode to display a clear image of a high contrast by using an optical compensatory sheet, in which the discotic liquid crystal molecules are essentially vertically aligned (and preferably twisted).

DETAILED DESCRIPTION OF THE INVENTION

Figure 1:
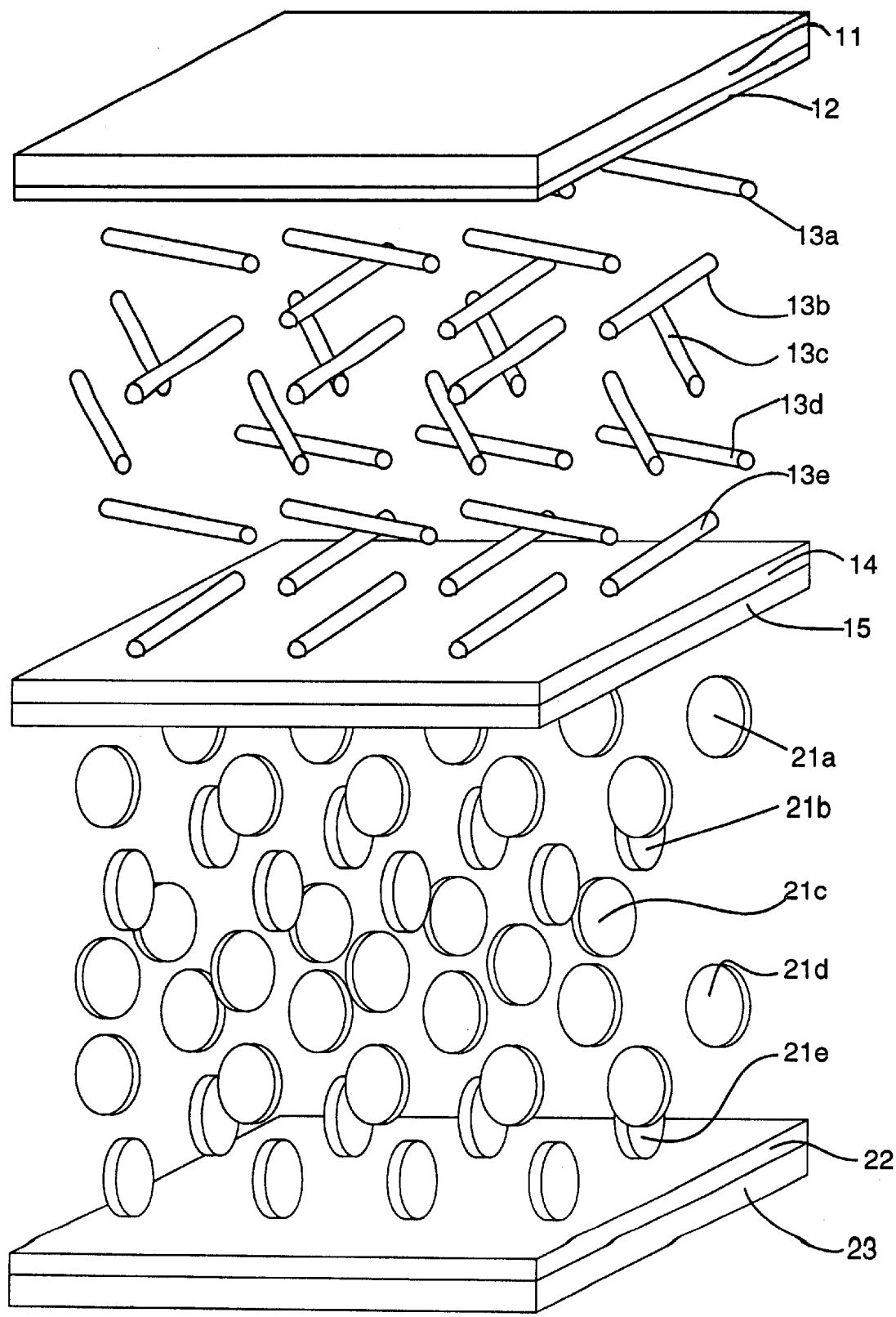
FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

As is shown in FIG. 1, a liquid crystal cell (11 to 15) comprises an upper substrate (11) having an upper orientation layer (12), a lower substrate (15) having a lower orientation layer (14) and a liquid crystal layer comprising rod-like liquid crystal molecules (13a to 13e) sealed between the orientation layers (12 & 14). The rod-like liquid crystal molecules (13a to 13e) are aligned by functions of the orientation layers (12 & 14), and are twisted by a function of a chiral agent (not shown) contained in the liquid crystal layer.

Each of the upper and lower substrates (11 & 15) has an electrode (not shown), which has a function of applying voltage to the rod-like liquid crystal molecules (13a to 13e).

When voltage is not applied to the liquid crystal cell of an STN mode (off), the rod-like liquid crystal molecules (13a to 13e) are essentially horizontally aligned parallel to the surface of the orientation layers (12 & 14), as is shown in FIG. 1. The rod-like liquid crystal molecules (13a to 13e) are twisted along a thickness direction, and spiral on a plane (counterclockwise about 240° from 13a to 13e in FIG. 1).

When voltage is applied to the liquid crystal cell of an STN mode (on), rod-like liquid crystal molecules placed in the middle of the cell (13b to 13d) are rather vertically aligned (realigned parallel to a direction of an electric field), compared with FIG. 1 (off). On the other hand, the alignment of the other rod-like liquid crystal molecules (13a, 13e) neighboring the substrates (11, 15) is not essentially changed after applying voltage to the cell.

An optical compensatory sheet is provided under the liquid crystal cell. The optical compensatory sheet shown in FIG. 1 comprises a transparent substrate (23), an orientation layer (22) and an optically anisotropic layer in order. The optically anisotropic layer is formed by aligning discotic liquid crystal molecules (21a to 21e) and fixing the molecules while keeping the alignment.

According to the present invention, discotic liquid crystal molecules (21a to 21e) are so aligned that discotic planes of the molecules are essentially perpendicular to a surface of the orientation layer (22). The discotic liquid crystal molecules (21a to 21e) are preferably twisted along a thickness direction, and spiral on a plane (clockwise about 240° from 21a to 21e in FIG. 1).

In FIG. 1, alignment of each of the rod-like liquid crystal molecules corresponds to alignment of each of the discotic liquid crystal molecules, namely 13a to 21e, 13b to 21d, 13c to 21c, 13d to 21b and 13e to 21a. Accordingly, the discotic liquid crystal molecule 21e optically compensates the rod-like liquid crystal molecule 13a, 21d compensates 13b, 21c compensates 13c, 21b compensates 13d, and 21a compensates 13e. The optical relation between the rod-like liquid crystal molecule and the discotic liquid crystal molecule is described below referring to FIG. 2.

Figure 2:
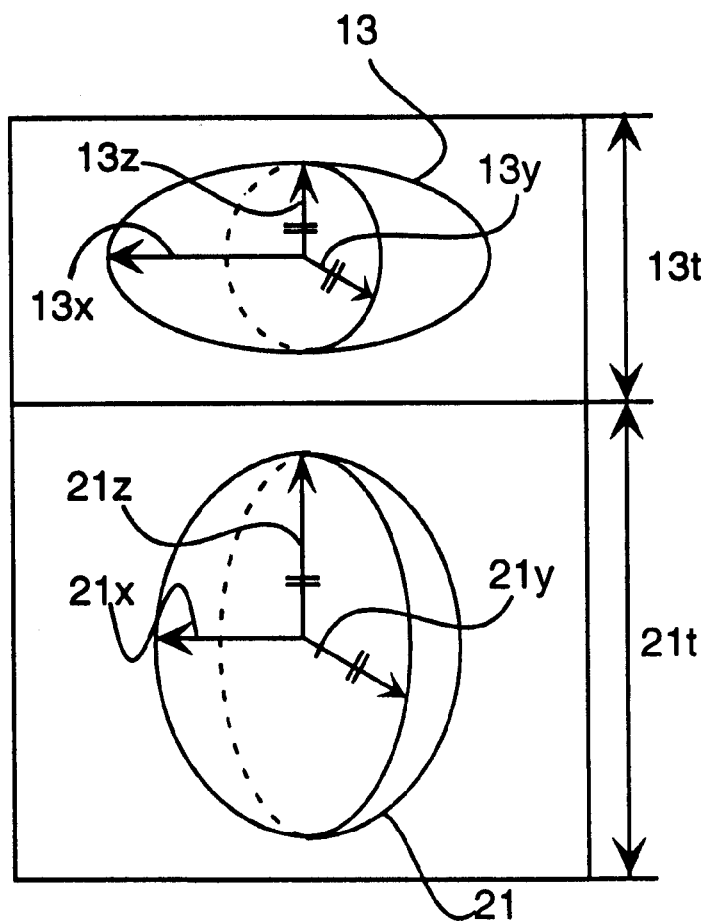
FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

The refractive index ellipsoid (13) of a rod-like liquid crystal molecule in a liquid crystal cell is formed by refractive indices ($13x$, $13y$) in plane parallel to an orientation layer and a refractive index ($13z$) along a thickness direction. In a liquid crystal cell of an STN mode, the refractive index ($13x$) along one direction in place is relatively large, while the index ($13y$) along a direction perpendicular to the direction of ($13x$) is relatively small. The refractive index ($13z$) along the direction is also relatively small in a liquid crystal cell of an STN mode. Therefore, the refractive index ellipsoid (13) has a shape like a laid football, as is shown in FIG. 2. The liquid crystal cell having the refractive index ellipsoid (not spherical) shows a birefringence depending on a viewing angle. The dependency on the viewing angle is canceled by an optical compensatory sheet.

The refractive index ellipsoid (21) of a discotic liquid crystal molecule in an optical compensatory sheet is also formed by refractive indices ($21x$, $21y$) in plane parallel to an orientation layer and a refractive index ($21z$) along a thickness direction. The refractive index ($21x$) along one direction in place is relatively small, while the index ($21y$) along a direction perpendicular to the direction of ($21x$) is relatively small. The refractive index ($121z$) along the direction is also relatively large. These refractive indices are obtained by aligning a discotic liquid crystal molecule essentially vertically. Therefore, the refractive index ellipsoid (21) has a shape like a standing disk, as is shown in FIG. 2.

A retardation formed in a liquid crystal cell (1) can be compensated by a retardation formed in an optical compensatory sheet (2) because of the above-described relation. The dependency on a viewing angle of the liquid crystal cell can be canceled by adjusting optical characteristics of a rod-like liquid crystal molecule and a discotic liquid crystal molecule that has a director having the same direction as the director of the rod-like liquid crystal molecule. In more detail, the dependency on a viewing angle can be canceled by adjusting refractive indices ($13x$, $13y$, $13z$) of a rod-like liquid crystal molecule, refractive indices ($21x$, $21y$, $21z$) of a discotic liquid crystal molecule, a thickness ($13t$) of the rod-like liquid crystal molecule layer and a thickness ($21t$) of the discotic liquid crystal molecule layer according to the following formulas.

$$|(13x-13y)\times 13t|=|(21x-21y)\times 21t|$$

$$|(13x-13z)\times 13t|=|(21x-21z)\times 21t|$$

Figure 3:
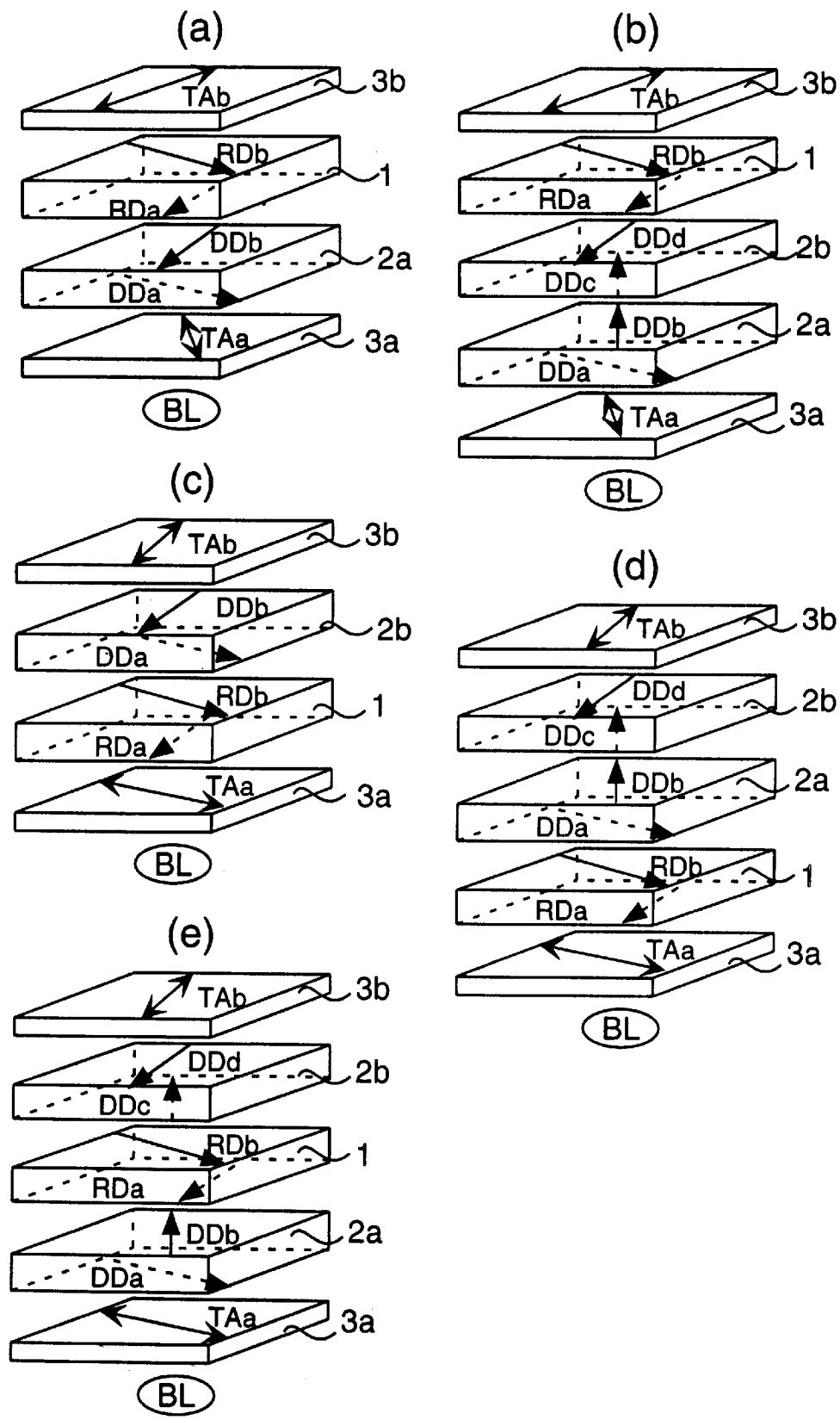
FIG. 3 schematically illustrates a layered structure of a liquid crystal display of an STN mode.

FIG. 3 schematically illustrates a layered structure of a liquid crystal display of an STN mode.

The liquid crystal display shown in FIG. 3(a) comprises a backlight (BL), a lower polarizing element (3a), a lower optical compensatory sheet (2a), a liquid crystal cell of an STN mode (1) and an upper polarizing element (3b) in order.

The liquid crystal display shown in FIG. 3(b) comprises a backlight (BL), a lower polarizing element (3a), a lower optical compensatory sheet (2a), an upper optical compensatory sheet (2b), a liquid crystal cell of an STN mode (1) and an upper polarizing element (3b) in order.

The liquid crystal display shown in FIG. 3(c) comprises a backlight (BL), a lower polarizing element (3a), a liquid crystal cell of an STN mode (1), an upper optical compensatory sheet (2b) and an upper polarizing element (3b) in order.

The liquid crystal display shown in FIG. 3(d) comprises a backlight (BL), a lower polarizing element (3a), a liquid crystal cell of an STN mode (1), a lower optical compensatory sheet (2a), an upper optical compensatory sheet (2b) and an upper polarizing element (3b) in order.

The liquid crystal display shown in FIG. 3(e) comprises a backlight (BL), a lower polarizing element (3a), a lower optical compensatory sheet (2a), a liquid crystal cell of an STN mode (1), an upper optical compensatory sheet (2b) and an upper polarizing element (3b) in order.

FIG. 3 shows arrows, which indicate the following optical directions.

TAa: Transparent axis (TAa) of a lower polarizing element (3a)

DDa: Normal (director's) direction of a discotic plane of a discotic liquid crystal molecule adjacent to an orientation layer in a lower optical compensatory sheet (2a)

DDb: Normal (director's) direction of a discotic plane of a discotic liquid crystal molecule adjacent to a liquid crystal cell in a lower optical compensatory sheet (2a)

RDa: Rubbing direction of a lower orientation layer of a liquid crystal cell (1)

RDb: Rubbing direction of an upper orientation layer of a liquid crystal cell (1)

DDc: Normal (director's) direction of a discotic plane of a discotic liquid crystal molecule adjacent to a liquid crystal cell in an upper optical compensatory sheet (2b)

DDd: Normal (director's) direction of a discotic plane of a discotic liquid crystal molecule adjacent to an orientation layer in an upper optical compensatory sheet (2b)

TAa: Transparent axis (TAa) of an upper polarizing element (3b)

The angles between the optical directions are described below referring to FIG. 4 and FIG. 5.

Figure 4:
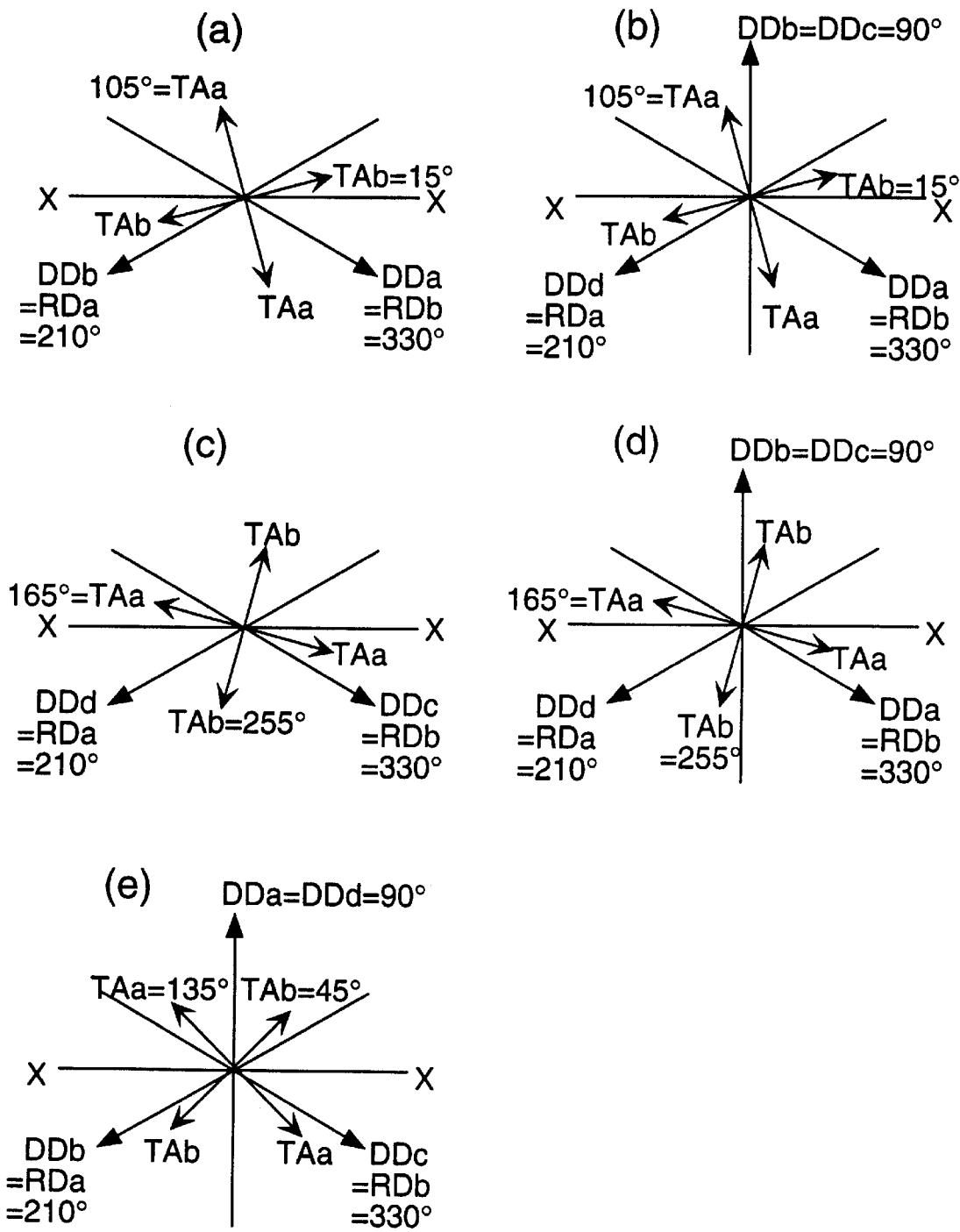
FIG. 4 is a plane view showing preferred optical directions about elements of a liquid crystal display of an STN mode.

FIG. 4 is a plane view showing preferred optical directions about elements of a liquid crystal display of an STN mode. FIG. 4 shows arrangements taking account of a front contrast.

FIG. 4(a) shows a liquid crystal display comprising one optical compensatory sheet between a lower polarizing element and a liquid crystal cell of an STN mode, as is shown in FIG. 3(a).

FIG. 4(b) shows a liquid crystal display comprising two optical compensatory sheets between a lower polarizing element and a liquid crystal cell of an STN mode, as is shown in FIG. 3(b).

FIG. 4(c) shows a liquid crystal display comprising one optical compensatory sheet between a liquid crystal cell of an STN mode and an upper polarizing element, as is shown in FIG. 3(c).

FIG. 4(d) shows a liquid crystal display comprising two optical compensatory sheets between a liquid crystal cell of an STN mode and an upper polarizing element, as is shown in FIG. 3(d).

FIG. 4(e) shows a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 4, the line (X) means a standard direction (0°). The arrows shown in FIG. 4 have the same meanings as is described about FIG. 3. The transparent axis of the lower polarizing element (TAa) and the transparent axis of the upper polarizing element (TAb) can be replaced with each other.

Figure 5:
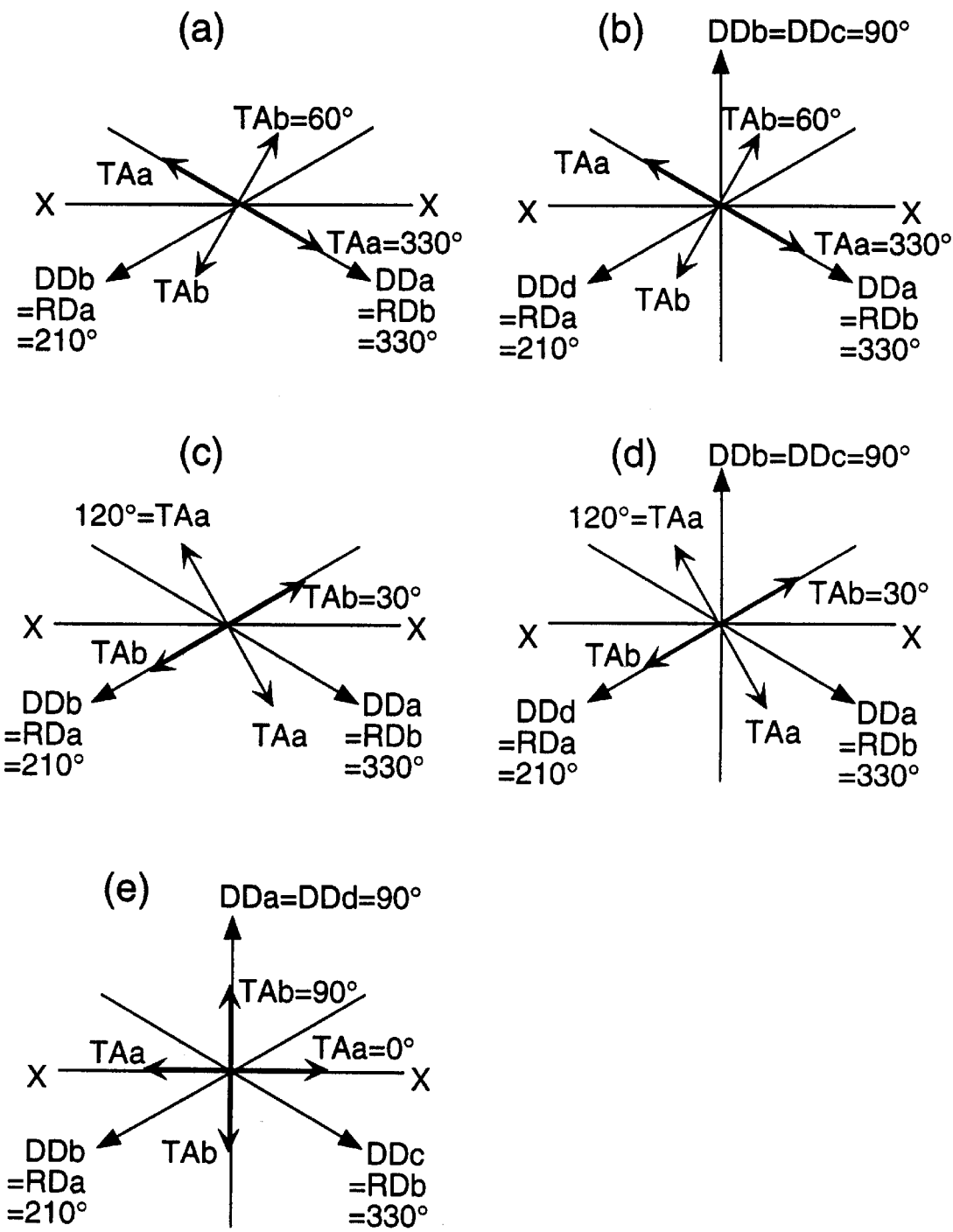
FIG. 5 is a plane view showing other preferred optical directions about elements of a liquid crystal display of an STN mode.

FIG. 5 is a plane view showing other preferred optical directions about elements of a liquid crystal display of an STN mode. FIG. 5 shows arrangements taking account of color of a displayed image.

FIG. 5(a) shows a liquid crystal display comprising one optical compensatory sheet between a lower polarizing element and a liquid crystal cell of an STN mode, as is shown in FIG. 3(a).

FIG. 5(b) shows a liquid crystal display comprising two optical compensatory sheets between a lower polarizing element and a liquid crystal cell of an STN mode, as is shown in FIG. 3(b).

FIG. 5(c) shows a liquid crystal display comprising one optical compensatory sheet between a liquid crystal cell of an STN mode and an upper polarizing element, as is shown in FIG. 3(c).

FIG. 5(d) shows a liquid crystal display comprising two optical compensatory sheets between a liquid crystal cell of an STN mode and an upper polarizing element, as is shown in FIG. 3(d).

FIG. 5(e) shows a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 5, the line (X) means a standard direction (0°). The arrows shown in FIG. 5 have the same meanings as is described about FIG. 3. The transparent axis of the lower polarizing element (TAa) and the transparent axis of the upper polarizing element (TAb) can be replaced with each other.

[Substrate]

The substrate is preferably made of a polymer film, which more preferably is transparent and optical isotropic. The term "transparent" means that light transmittance is not less than 80%. The term "optical isotropic" means that a retardation in plane (Re) of the film is not more than 20 nm, preferably not more than 10 nm, and more preferably not more than 5 nm. A retardation along a thickness direction (Rth) of the film is preferably not more than 100 nm, more preferably not more than 50 nm, and most preferably not more than 30 nm. The Re and Rth retardation values are defined by the following formulas.

$$Re = (nx - ny) \times d$$

$$Rth = [\{(nx + ny)/2\} - nz] \times d$$

in which each of nx and ny is a refractive index in plane of the transparent substrate; nz is a refractive index along a thickness direction of the transparent substrate; and d is a thickness of a transparent substrate.

Examples of the polymers include cellulose ester, polycarbonate, polysulfone, polyethersulfone, polyacrylate and polymethacrylate. Cellulose ester is preferred, cellulose acetate is more preferred, and cellulose triacetate is most preferred. The polymer film is formed preferably according to a solvent casting method.

The transparent substrate has a thickness preferably in the range of 20 to 500 µm, and more preferably in the range of 50 to 200 µm.

The transparent substrate can be subjected to a surface treatment (e.g., glow discharge treatment, corona discharge treatment, ultraviolet (UV) treatment, flame treatment) to improve adhesion to a layer formed on the substrate (e.g., adhesive layer, orientation layer, optically anisotropic layer). An adhesive layer (undercoating layer) can be provided on the transparent substrate.

[Orientation Layer]

The orientation layer contains an acrylic copolymer ($R^1$ in the formula (I) is hydrogen) or a methacrylic copolymer ($R^1$ in the formula (I) is methyl) comprising repeating units represented by the formula (I) and repeating units represented by the formula (II) or (III).

According to study of the present inventors, liquid crystal molecules (particularly discotic liquid crystal molecules) can be essentially vertically aligned by a function of a side chain (rather than a main chain) of a polymer contained in an orientation layer. A functional group of the side chain decreases a surface energy of the orientation layer to erect a liquid crystal molecule. A hydrocarbon group containing 10 to 100 carbon atoms can be effectively used as the functional group. Fluorine atom can also be effectively used as the functional group. Further, a cyclic group directly attached to a main chain can be effectively used as the functional group. The hydrocarbon group, the fluorine atom or the cyclic group is introduced into a side chain of a polymer to arrange the group or the atom on the surface of the orientation layer.

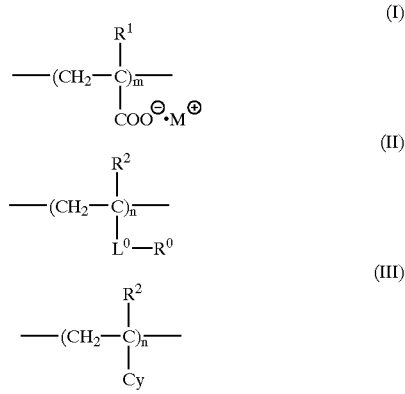

In the formula (I), $R^1$ is hydrogen (acrylic copolymer) or methyl (methacrylic copolymer).

In the formula (I), M is proton, an alkali metal ion (e.g., Na, K) or an ammonium ion. The ammonium group can be (primary to quaternary) substituted with an organic group (e.g., methyl). Examples of the ammonium groups include $NH_4$, $NH_3(CH_3)_2$, $NH_2(CH_3)_2$, $NH(CH_3)_3$ and $N(CH_3)_4$.

Since the group of COOM is hydrophilic, the (meth) acrylic copolymer is soluble in water. Accordingly, the orientation layer can be formed by using an aqueous medium.

In the formula (I), m is 10 to 99 mole %, preferably 10 to 95 mole %, and most preferably 25 to 90 mole %.

In the formula (II), $R^2$ is hydrogen, a halogen atom or an alkyl group having 1 to 6 carbon atoms. $R^2$ preferably is hydrogen or an alkyl group having 1 to 6 carbon atoms, more preferably is hydrogen, methyl or ethyl, and most preferably is hydrogen or methyl.

In the formula (II), $L^0$ is a divalent linking group selected from the group consisting of —O—, —CO—, —NH—, —SO$_2$—, an alkylene group, an alkenylene group, an arylene group and a combination thereof. $L^0$ preferably is —CO—$L^{00}$— (wherein —CO— is attached to the main chain, and $L^{00}$ is a divalent linking group selected from the group consisting of —O—, —CO—,—NH—, —SO$_2$—, an alkylene group, an alkenylene group, an arylene group and a combination thereof).

$L^0$ more preferably is —CO—O—, —CO—O-alkylene-, —CO—O-alkylene-alkenylene-, —CO—O-alkylene-arylene-, —CO—O-alkylene-O—, —CO—O-alkylene-O—CO—, —CO—O-alkylene-O—CO-arylene-, —CO—O-alkylene-O—CO-alkylene-O—, —CO—O-alkylene-CO—NH—, —CO—O-alkylene-NH—SO$_2$—, —CO—O-alkylene-NH—SO$_2$-arylene-O—, —CO—NH, —CO—NH-arylene-, —CO—NH-arylene-CO—O—, —CO—O-arylene-O—CO-alkylene-O-arylene-, —CO—O-arylene-, —CO—NH-arylene-NH—CO—, —CO—NH-arylene-O—, —CO—O-alkylene-CO—O—, —CO—O-alkylene-CO—, —CO—O-arylene-CO—O— or —CO—NH-alkylene-NH—CO—O—. $L^0$ further preferably is —CO—O—, —CO—O-alkylene-NH—SO$_2$-arylene-O—, —CO—NH—, —CO—NH-arylene-O—, —CO—O-alkylene-, —CO—O-alkylene-arylene- or —CO—O-alkylene-O—CO-arylene-. $L^0$ most preferably is —CO—O— or —CO—NH—. In the above-described linking groups, the left side is attached to the main chain, and the right side is attached to $R^0$.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The arylene group preferably is phenylene or naphthylene, more preferably is phenylene, and most preferably is p-phenylene. The arylene group can have a substituent group. Examples of the substituent groups include a halogen atom (F, Cl, Br), carboxyl, cyano, nitro, carbamoyl, sulfamoyl, an alkyl group, a cycloalkyl group, an alkoxy group, an alkylthio group, an acyl group, an acyloxy group, an alkylcarbamoyl group, an alkylsulfamoyl group, an amido group, a sulfonamido group and an alkylsulfonyl group.

In the formula (II), $R^0$ is a hydrocarbon group having 10 to 100 carbon atoms or a fluorine atom substituted hydrocarbon group having 1 to 100 carbon atoms.

The hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom. The hydrocarbon group contains 10 to 80 carbon atoms, preferably 10 to 60 carbon atoms, and more preferably 10 to 40 carbon atoms.

The hydrocarbon group preferably has a steroid structure. The steroid structure has an excluded volume effect as well as the function of decreasing a surface energy of the orientation layer. Liquid crystal molecules can be strongly elected by the combination of the excluded volume effect and the function of decreasing the surface energy. In the present specification, the steroid structure means a cyclopentanohydrophenanthrene ring or a ring obtained by replacing a single bond of the cyclopentanohydrophenanthrene ring with a double bond. The hydrocarbon group having the steroid structure preferably contains 18 to 100 carbon atoms, more preferably contains 19 to 60 carbon atoms, and most preferably contains 20 to 40 carbon atoms.

The hydrocarbon group also preferably contains two or more aromatic rings.

The hydrocarbon moiety of the fluorine atom substituted hydrocarbon group is an aliphatic group, an aromatic group or a combination thereof. The aliphatic group can have a branched or cyclic structure. The aliphatic group preferably is an alkyl group (including a cycloalkyl group) or an alkenyl group (including a cycloalkenyl group). The hydrocarbon group can have a substituent group that is not strongly hydrophilic, such as a halogen atom.

The fluorine atom substituted hydrocarbon group contains 5 to 80 carbon atoms, preferably 10to 60 carbon atoms, and more preferably 10 to 40 carbon atoms. The substitution ratio of hydrogen atoms in the hydrocarbon group substituted with fluorine atoms is preferably in the range of 50 to 100 mol %, more preferably in the range of 70 to 100 mol %, further preferably in the range of 80 to 100 mol %, and most preferably in the range of 90 to 100 mol %.

In the formula (II), n is 1 to 90 mole %, preferably is 5 to 80 mole %, and most preferably is 10 to 70 mole %.

Examples of the repeating units (HyC) represented by the formula (II) wherein $R^0$ is a hydrocarbon group having 10 to 100 carbon atoms (except hydrocarbon groups having two or more aromatic rings) are shown below.

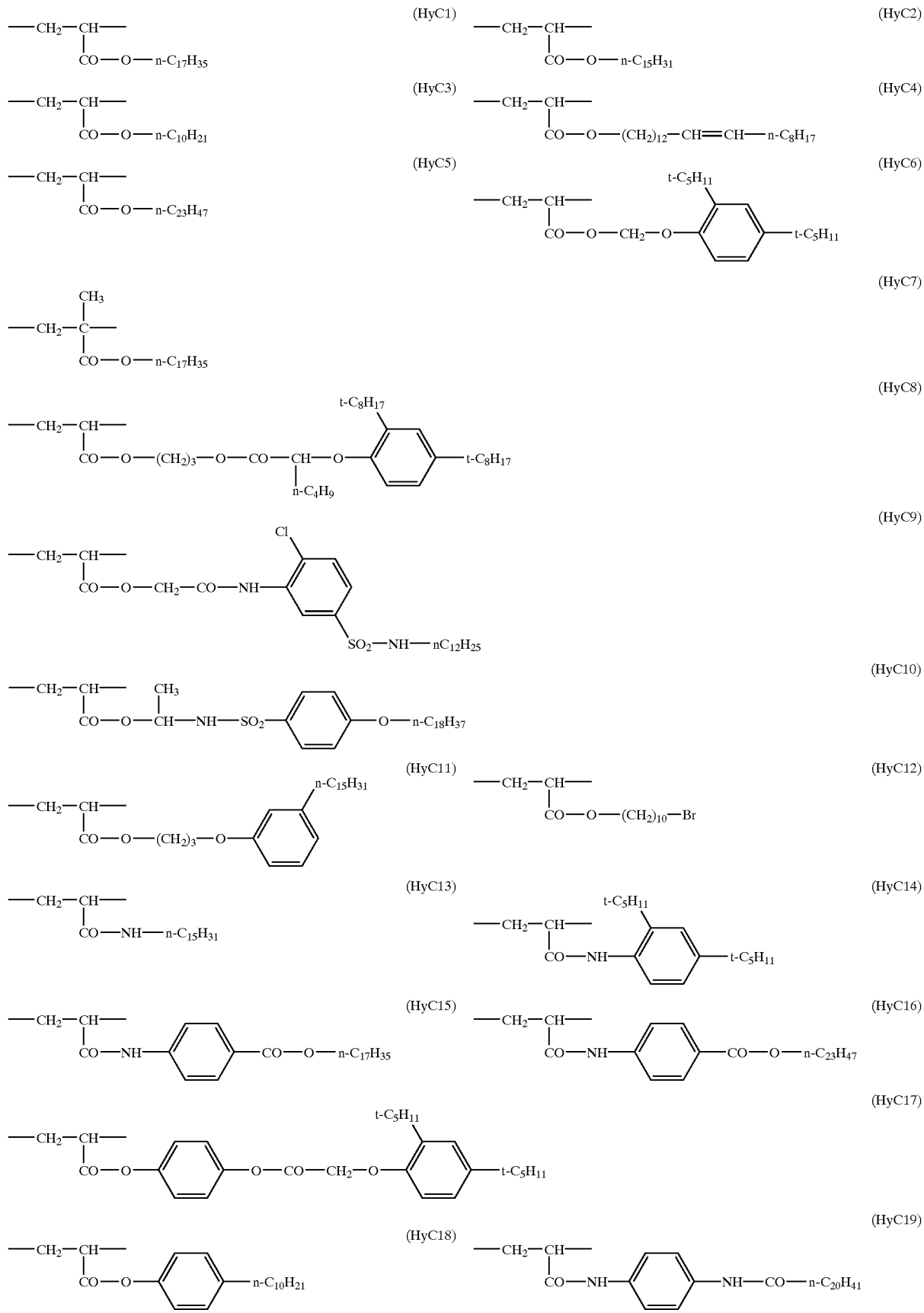

-continued
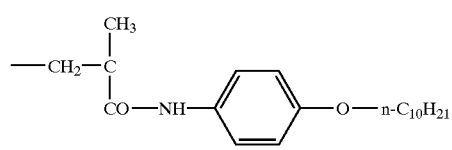 (HyC20)
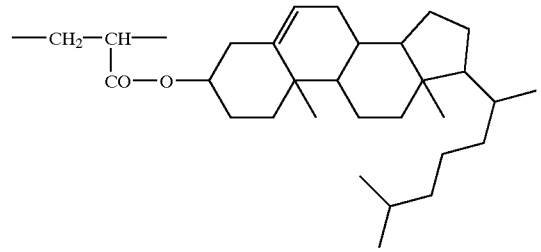 (HyC21)
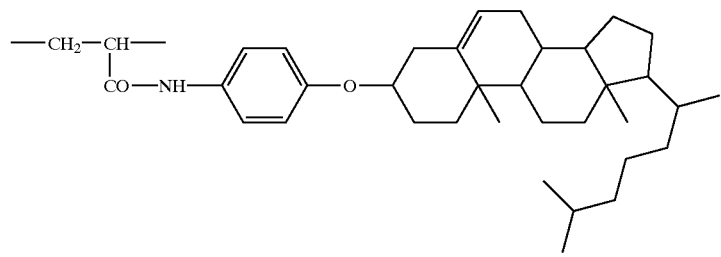 (HyC22)
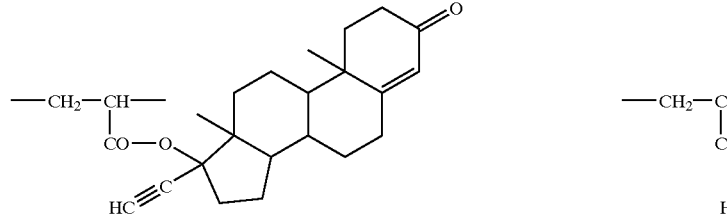 (HyC23)
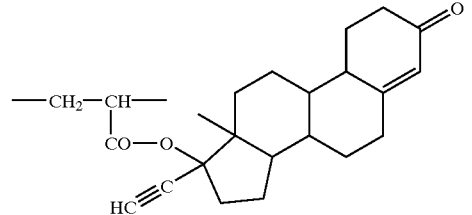 (HyC24)
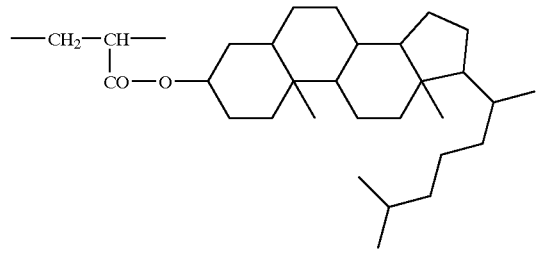 (HyC25)
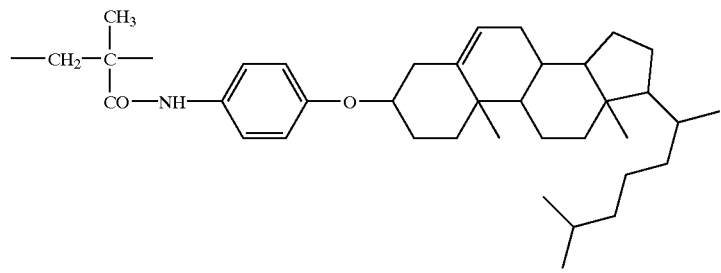 (HyC26)
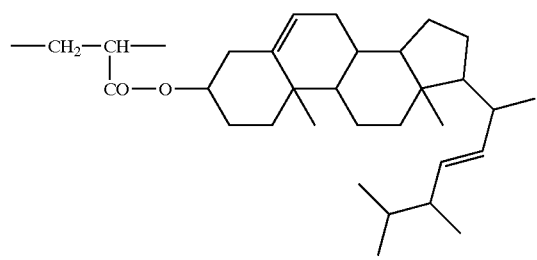 (HyC27)
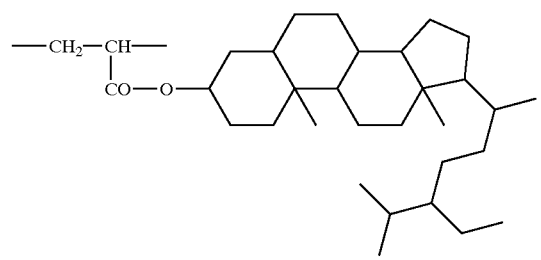 (HyC28)

-continued
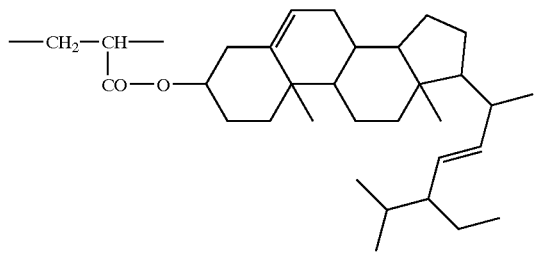
(HyC29)
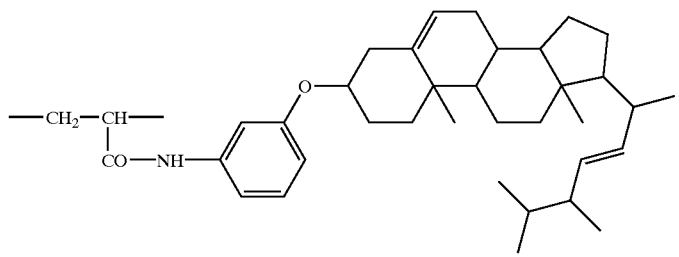
(HyC30)
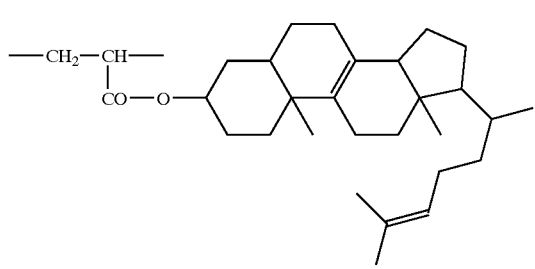
(HyC31)
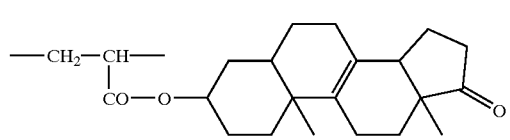
(HyC32)
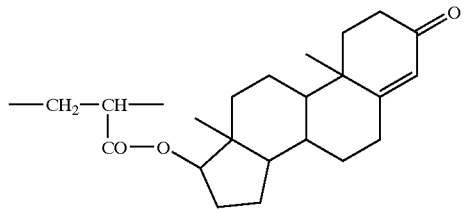
(HyC33)
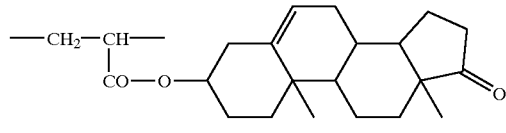
(HyC34)
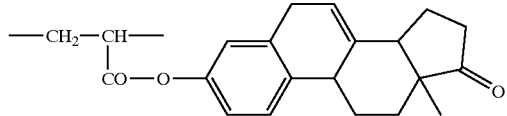
(HyC35)
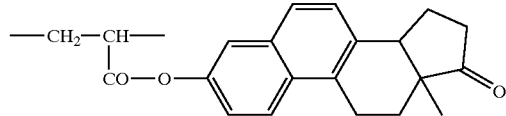
(HyC36)
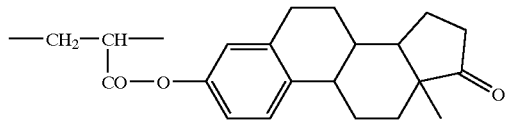
(HyC37)
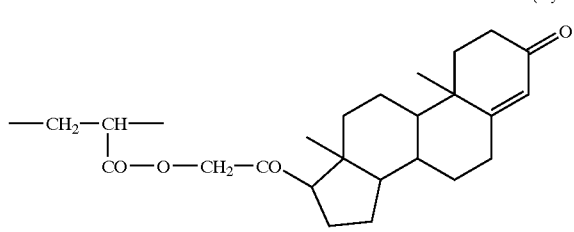
(HyC38)
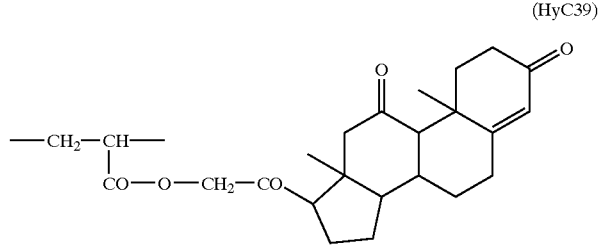
(HyC39)

-continued

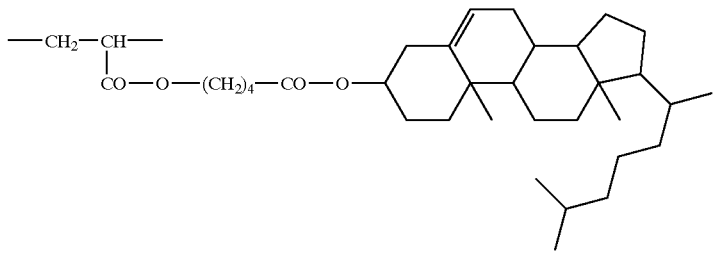
(HyC40)

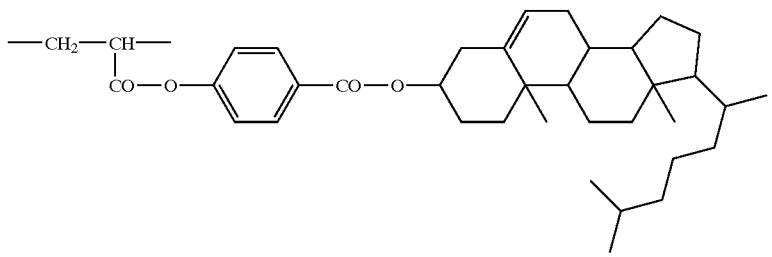
(HyC41)

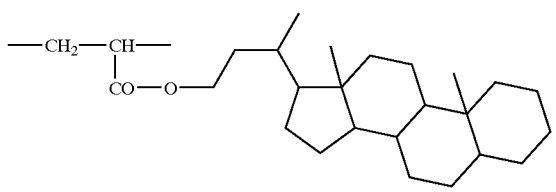
(HyC42)

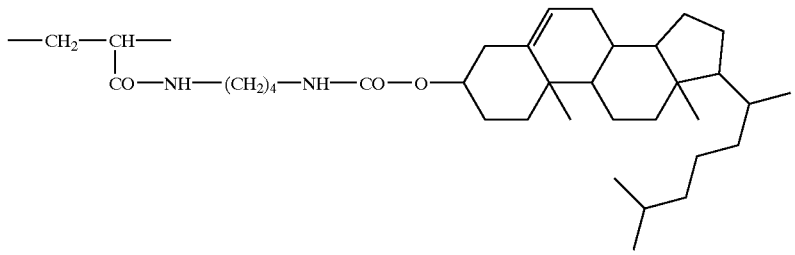
(HyC43)

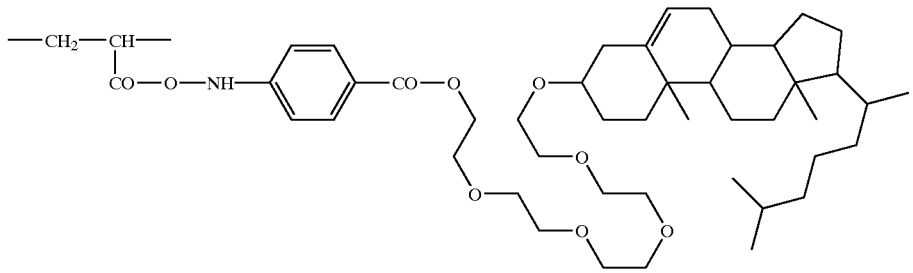
(HyC44)

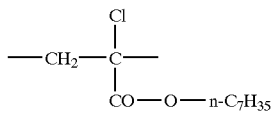
(HyC45)

Examples of the (meth)acrylic copolymers having the repeating units (HyC) represented by the formula (II) wherein $R^0$ is a hydrocarbon group having 10 to 100 carbon atoms (except hydrocarbon groups having two or more aromatic rings) are shown below. AA means a repeating unit derived from acrylic acid, and MA means a repeating unit derived from methacrylic acid. The ratio of the repeating unit means mol %.

| | |
|---|---|
| PA1: | —(AA)60—(HyC1)40— |
| PA2: | —(AA)70—(HyC1)30— |
| PA3: | —(AA)60—(HyC2)40— |
| PA4: | —(AA)75—(HyC2)25— |
| PA5: | —(AA)65—(HyC3)35— |
| PA6: | —(AA)80—(HyC3)30— |
| PA7: | —(AA)60—(HyC4)40— |

-continued

| | |
|---|---|
| PA8: | —(AA)70—(HyC4)30— |
| PA9: | —(AA)70—(HyC5)30— |
| PA10: | —(AA)80—(HyC5)20— |
| PA11: | —(AA)60—(HyC6)40— |
| PA12: | —(AA)70—(HyC6)30— |
| PA13: | —(AA)60—(HyC7)40— |
| PA14: | —(AA)70—(HyC7)30— |
| PA15: | —(AA)60—(HyC8)40— |
| PA16: | —(AA)85—(HyC8)15— |
| PA17: | —(AA)60—(HyC9)40— |
| PA18: | —(AA)70—(HyC9)30— |
| PA19: | —(AA)60—(HyC10)40— |
| PA20: | —(AA)70—(HyC10)30— |
| PA21: | —(AA)60—(HyC11)40— |
| PA22: | —(AA)85—(HyC11)15— |
| PA23: | —(AA)60—(HyC12)40— |
| PA24: | —(AA)50—(HyC12)50— |
| PA25: | —(AA)60—(HyC13)40— |
| PA26: | —(AA)50—(HyC13)50— |
| PA27: | —(AA)60—(HyC14)40— |
| PA28: | —(AA)70—(HyC14)30— |
| PA29: | —(AA)50—(HyC15)50— |
| PA30: | —(AA)60—(HyC15)40— |
| PA31: | —(AA)80—(HyC16)20— |
| PA32: | —(AA)70—(HyC16)30— |
| PA33: | —(AA)85—(HyC17)15— |
| PA34: | —(AA)70—(HyC17)30— |
| PA35: | —(AA)60—(HyC18)40— |
| PA36: | —(AA)70—(HyC18)30— |
| PA37: | —(AA)80—(HyC19)20— |
| PA38: | —(AA)70—(HyC19)30— |
| PA39: | —(AA)60—(HyC20)40— |
| PA40: | —(AA)70—(HyC20)30— |
| PA41: | —(AA)60—(HyC21)40— |
| PA42: | —(AA)70—(HyC21)30— |
| PA43: | —(AA)60—(HyC22)40— |
| PA44: | —(AA)70—(HyC22)30— |
| PA45: | —(AA)90—(HyC23)10— |
| PA46: | —(AA)80—(HyC23)20— |
| PA47: | —(AA)90—(HyC24)10— |
| PA48: | —(AA)80—(HyC24)20— |
| PA49: | —(AA)85—(HyC25)15— |
| PA50: | —(AA)70—(HyC25)30— |
| PA51: | —(AA)60—(HyC26)40— |
| PA52: | —(AA)70—(HyC26)30— |
| PA53: | —(AA)65—(HyC27)35— |
| PA54: | —(AA)60—(HyC27)40— |
| PA55: | —(AA)75—(HyC28)25— |
| PA56: | —(AA)60—(HyC28)40— |
| PA57: | —(AA)60—(HyC29)40— |
| PA58: | —(AA)70—(HyC29)30— |
| PA59: | —(AA)60—(HyC30)40— |
| PA60: | —(AA)70—(HyC30)30— |
| PA61: | —(AA)60—(HyC31)40— |
| PA62: | —(AA)70—(HyC31)30— |
| PA63: | —(AA)80—(HyC32)20— |
| PA64: | —(AA)70—(HyC32)30— |
| PA65: | —(AA)80—(HyC33)20— |
| PA66: | —(AA)70—(HyC33)30— |
| PA67: | —(AA)60—(HyC34)40— |
| PA68: | —(AA)70—(HyC34)30— |
| PA69: | —(AA)90—(HyC35)10— |
| PA70: | —(AA)80—(HyC35)20— |
| PA71: | —(AA)60—(HyC36)40— |
| PA72: | —(AA)50—(HyC36)50— |
| PA73: | —(AA)60—(HyC37)40— |
| PA74: | —(AA)70—(HyC37)30— |
| PA75: | —(AA)90—(HyC38)10— |
| PA76: | —(AA)80—(HyC38)20— |
| PA77: | —(AA)60—(HyC39)40— |
| PA78: | —(AA)70—(HyC39)30— |
| PA79: | —(AA)80—(HyC40)20— |
| PA80: | —(AA)70—(HyC40)30— |
| PA81: | —(AA)60—(HyC41)40— |
| PA82: | —(AA)70—(HyC41)30— |
| PA83: | —(AA)60—(HyC42)40— |
| PA84: | —(AA)70—(HyC42)30— |
| PA85: | —(MA)70—(HyC1)30— |
| PA86: | —(MA)60—(HyC2)40— |
| PA87: | —(MA)70—(HyC3)30— |
| PA88: | —(MA)60—(HyC4)40— |
| PA89: | —(MA)70—(HyC5)30— |
| PA90: | —(MA)60—(HyC6)40— |
| PA91: | —(MA)70—(HyC7)30— |
| PA92: | —(MA)60—(HyC8)40— |
| PA93: | —(MA)70—(HyC9)30— |
| PA94: | —(MA)60—(HyC10)40— |
| PA95: | —(MA)70—(HYC11)30— |
| PA96: | —(MA)60—(HYC12)40— |
| PA97: | —(MA)70—(HyC13)30— |
| PA98: | —(MA)60—(HyC14)40— |
| PA99: | —(MA)70—(HyC15)30— |
| PA100: | —(MA)60—(HyC16)40— |
| PA101: | —(MA)70—(HyC17)30— |
| PA102: | —(MA)60—(HyC18)40— |
| PA103: | —(MA)70—(HyC19)30— |
| PA104: | —(MA)60—(HyC20)40— |
| PA105: | —(MA)60—(HyC21)40— |
| PA106: | —(MA)60—(HyC22)40— |
| PA107: | —(MA)60—(HyC23)40— |
| PA108: | —(MA)60—(HyC24)40— |
| PA109: | —(MA)60—(HyC25)40— |
| PA110: | —(MA)60—(HyC26)40— |
| PA111: | —(MA)60—(HyC27)40— |
| PA112: | —(MA)60—(HyC28)40— |
| PA113: | —(MA)60—(HyC29)40— |
| PA114: | —(MA)60—(HyC30)40— |
| PA115: | —(MA)60—(HyC31)40— |
| PA116: | —(MA)60—(HyC32)40— |
| PA117: | —(MA)60—(HyC33)40— |
| PA118: | —(MA)60—(HyC34)40— |
| PA119: | —(MA)60—(HyC35)40— |
| PA120: | —(MA)60—(HyC36)40— |
| PA121: | —(MA)60—(HyC37)40— |
| PA122: | —(MA)60—(HyC38)40— |
| PA123: | —(MA)60—(HyC39)40— |
| PA124: | —(MA)60—(HyC40)40— |
| PA125: | —(MA)60—(HyC41)40— |
| PA126: | —(MA)60—(HyC42)40— |

Examples of the repeating units (FRU) represented by the formula (II) wherein $R^0$ is a fluorine atom substituted hydrocarbon group having 1 to 100 carbon atoms are shown below.

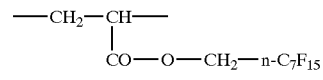

(FRU1)

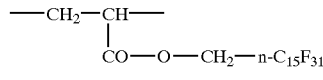

(FRU2)

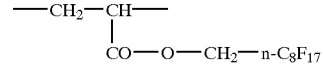

(FRU3)

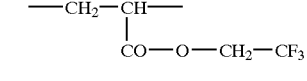

(FRU4)

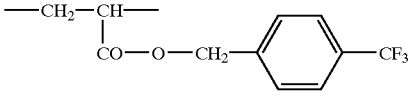

(FRU5)

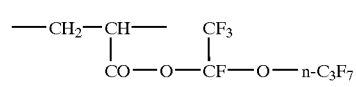

(FRU6)

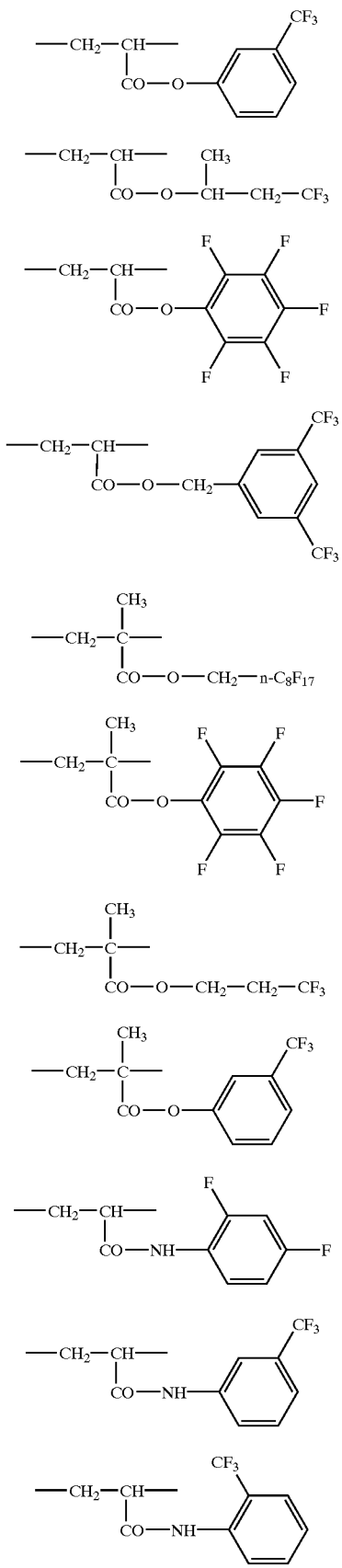

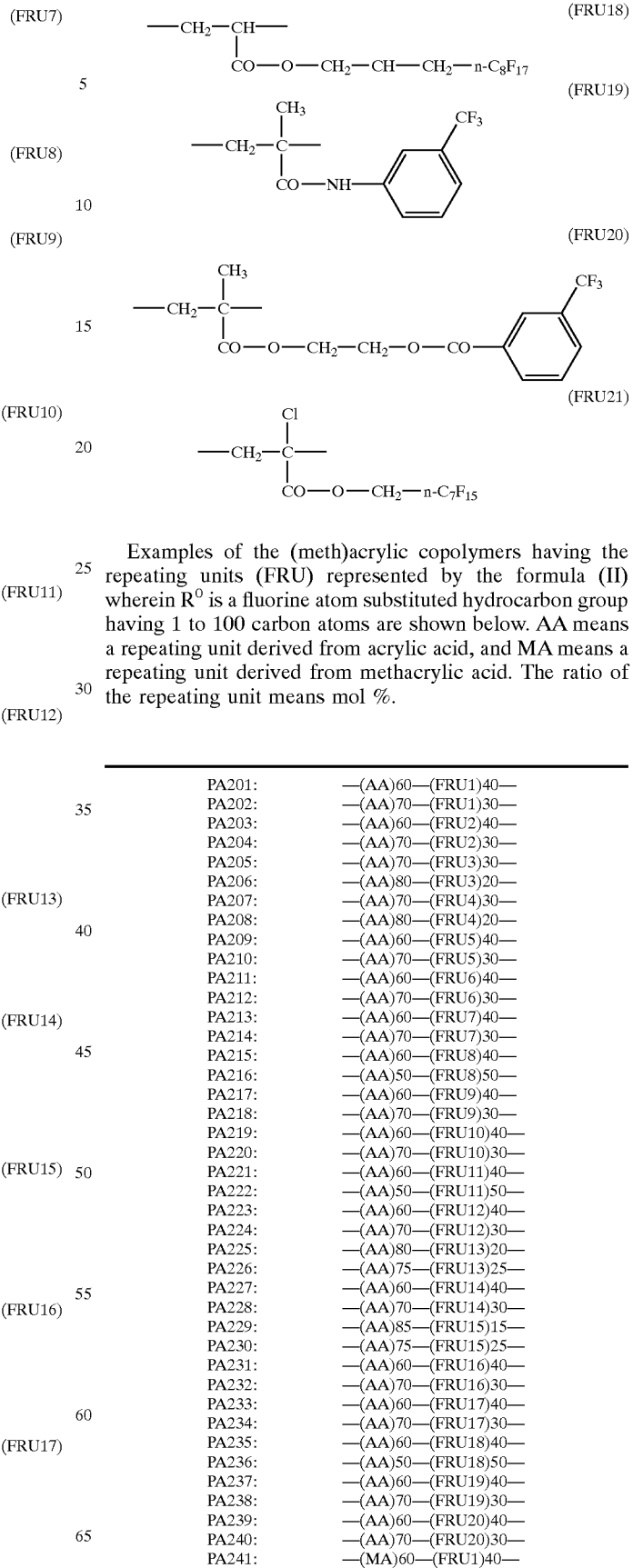

Examples of the (meth)acrylic copolymers having the repeating units (FRU) represented by the formula (II) wherein $R^0$ is a fluorine atom substituted hydrocarbon group having 1 to 100 carbon atoms are shown below. AA means a repeating unit derived from acrylic acid, and MA means a repeating unit derived from methacrylic acid. The ratio of the repeating unit means mol %.

| | |
|---|---|
| PA201: | —(AA)60—(FRU1)40— |
| PA202: | —(AA)70—(FRU1)30— |
| PA203: | —(AA)60—(FRU2)40— |
| PA204: | —(AA)70—(FRU2)30— |
| PA205: | —(AA)70—(FRU3)30— |
| PA206: | —(AA)80—(FRU3)20— |
| PA207: | —(AA)70—(FRU4)30— |
| PA208: | —(AA)80—(FRU4)20— |
| PA209: | —(AA)60—(FRU5)40— |
| PA210: | —(AA)70—(FRU5)30— |
| PA211: | —(AA)60—(FRU6)40— |
| PA212: | —(AA)70—(FRU6)30— |
| PA213: | —(AA)60—(FRU7)40— |
| PA214: | —(AA)70—(FRU7)30— |
| PA215: | —(AA)60—(FRU8)40— |
| PA216: | —(AA)50—(FRU8)50— |
| PA217: | —(AA)60—(FRU9)40— |
| PA218: | —(AA)70—(FRU9)30— |
| PA219: | —(AA)60—(FRU10)40— |
| PA220: | —(AA)70—(FRU10)30— |
| PA221: | —(AA)60—(FRU11)40— |
| PA222: | —(AA)50—(FRU11)50— |
| PA223: | —(AA)60—(FRU12)40— |
| PA224: | —(AA)70—(FRU12)30— |
| PA225: | —(AA)80—(FRU13)20— |
| PA226: | —(AA)75—(FRU13)25— |
| PA227: | —(AA)60—(FRU14)40— |
| PA228: | —(AA)70—(FRU14)30— |
| PA229: | —(AA)85—(FRU15)15— |
| PA230: | —(AA)75—(FRU15)25— |
| PA231: | —(AA)60—(FRU16)40— |
| PA232: | —(AA)70—(FRU16)30— |
| PA233: | —(AA)60—(FRU17)40— |
| PA234: | —(AA)70—(FRU17)30— |
| PA235: | —(AA)60—(FRU18)40— |
| PA236: | —(AA)50—(FRU18)50— |
| PA237: | —(AA)60—(FRU19)40— |
| PA238: | —(AA)70—(FRU19)30— |
| PA239: | —(AA)60—(FRU20)40— |
| PA240: | —(AA)70—(FRU20)30— |
| PA241: | —(MA)60—(FRU1)40— |

| | |
|---|---|
| PA242: | —(MA)60—(FRU2)40— |
| PA243: | —(MA)60—(FRU3)40— |
| PA244: | —(MA)60—(FRU4)40— |
| PA245: | —(MA)60—(FRU5)40— |
| PA246: | —(MA)60—(FRU6)40— |
| PA247: | —(MA)60—(FRU7)40— |
| PA248: | —(MA)60—(FRU8)40— |
| PA249: | —(MA)60—(FRU9)40— |
| PA250: | —(MA)60—(FRU10)40— |
| PA251: | —(MA)60—(FRU11)40— |
| PA252: | —(MA)60—(FRU12)40— |
| PA253: | —(MA)60—(FRU13)40— |
| PA254: | —(MA)60—(FRU14)40— |
| PA255: | —(MA)60—(FRU15)40— |
| PA256: | —(MA)60—(FRU16)40— |
| PA257: | —(MA)60—(FRU17)40— |
| PA258: | —(MA)60—(FRU18)40— |
| PA259: | —(MA)60—(FRU19)40— |
| PA260: | —(MA)60—(FRU20)40— |

The (meth)acrylic copolymer can have a polymerizable group. A copolymer having a polymerizable group is used in combination with a liquid crystal molecule having a polymerizable group to chemically bind the copolymer and the liquid crystal molecule along an interface between a liquid crystal layer (such as an optical anisotropic layer) and an orientation layer. The mechanical strength of a liquid crystal element (such as an optical compensatory sheet) can be improved by the chemical bond.

The polymerizable group of the (meth)acrylic copolymer is determined depending on the polymerizable group (Q) of the liquid crystal molecule (described below). The polymerizable group (Q) of the liquid crystal molecule preferably is an unsaturated polymerizable group (Q1 to Q7 in the examples described about liquid crystal molecule), an epoxy group (Q8) or an aziridinyl group (Q9), more preferably is an unsaturated polymerizable group, and most preferably is an ethylenically unsaturated group (Q1 to Q6). The polymerizable group of the (meth)acrylic copolymer is also preferably is an unsaturated polymerizable group, an aziridinyl group or an epoxy group, more preferably is an unsaturated polymerizable group, and most preferably is an ethylenically unsaturated group.

The polymerizable group is preferably not directly attached to the main chain of the (meth)acrylic copolymer. In other words, a linking group preferably intervenes between the main chain and the polymerizable group. Examples of the linking groups include —CO—, —CO—O—, —CO—NH—, —CO—NH-alkylene-, —CO—NH-alkylene-O—, —CO—NH-alkylene-CO—O—, —CO—NH-alkylene-O—CO—, —CO—NH-alkylene-CO—NH—, —CO-alkylene-O—CO—, —CO-arylene-O-alkylene-O—CO—, —CO-arylene-O-alkylene-O—, —CO-arylene-O-alkylene- and —CO-alkylene-O—CO—, in which the left side is attached to the main chain, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The arylene group preferably is phenylene or naphthylene, more preferably is phenylene, and most preferably is p-phenylene. The arylene group can have a substituent group. Examples of the substituent groups include a halogen atom (F, Cl, Br), carboxyl, cyano, nitro, carbamoyl, sulfamoyl, an alkyl group, a cycloalkyl group, an alkoxy group, an alkylthio group, an acyl group, an acyloxy group, an alkylcarbamoyl group, an alkylsulfamoyl group, an amido group, a sulfonamido group and an alkylsulfonyl group.

The alkyl group can have a branched structure. The alkyl group preferably contains 1 to 20 carbon atoms, more preferably contains 1 to 15 carbon atoms, further preferably contains 1 to 10 carbon atoms, and most preferably contains 1 to 6 carbon atoms.

The cycloalkyl group preferably is cyclohexyl.

The alkoxy group can have a branched structure. The alkoxy group preferably contains 1 to 20 carbon atoms, more preferably contains 1 to 15 carbon atoms, further preferably contains 1 to 10 carbon atoms, and most preferably contains 1 to 6 carbon atoms.

The alkylthio group can have a branched structure. The alkylthio group preferably contains 1 to 20 carbon atoms, more preferably contains 1 to 15 carbon atoms, further preferably contains 1 to 10 carbon atoms, and most preferably contains 1 to 6 carbon atoms.

The acyl group preferably contains 2 to 20 carbon atoms, more preferably contains 2 to 15 carbon atoms, further preferably contains 2 to 10 carbon atoms, and most preferably contains 2 to 6 carbon atoms.

The acyloxy group preferably contains 2 to 20 carbon atoms, more preferably contains 2 to 15 carbon atoms, further preferably contains 2 to 10 carbon atoms, and most preferably contains 2 to 6 carbon atoms.

The alkylcarbamoyl group preferably contains 2 to 20 carbon atoms, more preferably contains 2 to 15 carbon atoms, further preferably contains 2 to 10 carbon atoms, and most preferably contains 2 to 6 carbon atoms. The alkyl moiety of the alkylcarbamoyl group can further have a substituent group (e.g., an alkoxy group).

The alkylsulfamoyl group preferably contains 1 to 20 carbon atoms, more preferably contains 1 to 15 carbon atoms, further preferably contains 1 to 10 carbon atoms, and most preferably contains 1 to 6 carbon atoms. The alkyl moiety of the alkylsulfamoyl group can further have a substituent group (e.g., an alkoxy group).

The amido group preferably contains 2 to 20 carbon atoms, more preferably contains 2 to 15 carbon atoms, further preferably contains 2 to 10 carbon atoms, and most preferably contains 2 to 6 carbon atoms.

The sulfonamido group preferably contains 1 to 20 carbon atoms, more preferably contains 1 to 15 carbon atoms, further preferably contains 1 to 10 carbon atoms, and most preferably contains 1 to 6 carbon atoms.

The alkylsulfonyl group preferably contains 1 to 20 carbon atoms, more preferably contains 1 to 15 carbon atoms, further preferably contains 1 to 10 carbon atoms, and most preferably contains 1 to 6 carbon atoms. The alkyl moiety of the alkylsulfonyl group can further have a substituent group (e.g., an alkoxy group).

The side chain of the (meth)acrylic copolymer can have two or more polymerizable groups.

A repeating unit having the polymerizable group is preferably represented by the formula (IV).

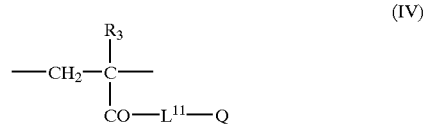

(IV)

In the formula (IV), $R^3$ is hydrogen or methyl.

In the formula (IV), $L^{11}$ is a divalent linking group selected from the group consisting of —NH-alkylene-O—

CO—, -alkylene-O—CO—, —O-alkylene-O—CO—, —O-arylene-O-alkylene-O—CO—, —O-arylene-O-alkylene-, —O-arylene-O— —NH-alkylene-O—CO—, —NH-alkylene-O— and —NH-alkylene. $L^{11}$ preferably is —NH-alkylene-O—CO—, -alkylene-O—CO—, —O-alkylene-O—CO—, —O—arylene-O-alkylene-O—CO— or —NH-alkylene-O—CO—, and more preferably is —NH-alkylene-O—CO—.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The arylene group preferably is phenylene or naphthylene, more preferably is phenylene, and most preferably is p-phenylene. The arylene group can have a substituent group. Examples of the substituent groups are the same as the above-described substituent groups.

In the formula (IV), Q is a polymerizable group. The polymerizable group of the (meth)acrylic copolymer is preferably analogous to the polymerizable group (Q) of the liquid crystal molecule, as is described above.

Examples of the repeating units having a polymerizable group are shown below.

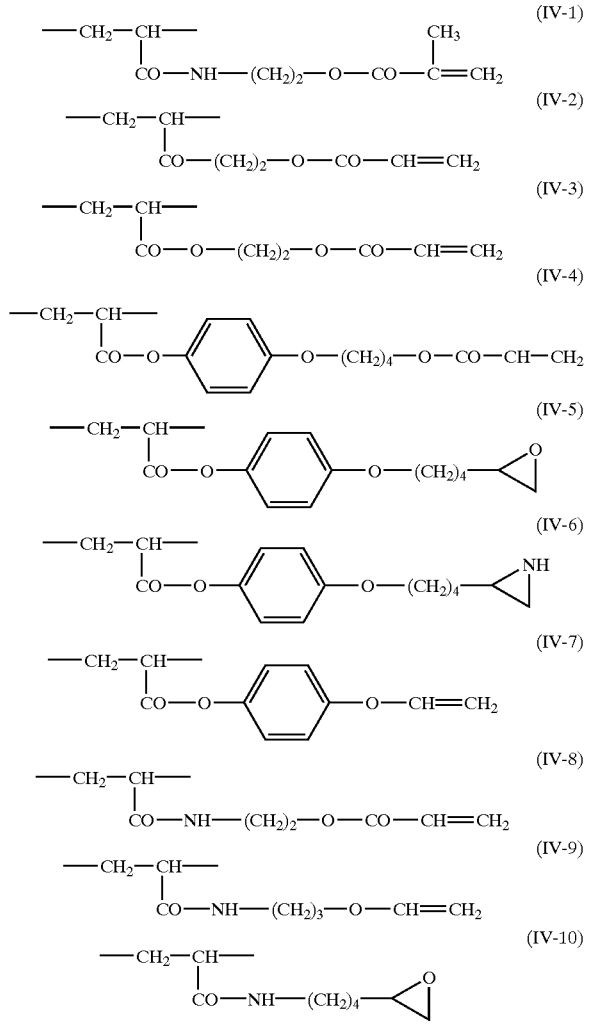

In the case that a repeating unit having a polymerizable group is introduced into a (meth)acrylic copolymer, the copolymer preferably contains the polymerizable repeating units in an amount of 0.1 to 10 mol %, and more preferably in an amount of 3 to 5 mol %.

The polymerizable group can be introduced into the repeating unit group having a hydrocarbon group containing 10 to 100 carbon atoms or the repeating unit containing fluorine atoms. The polymerizable group preferably is a substituent group of a hydrocarbon group or a hydrocarbon group substituted with fluorine atom, and more preferably is a substituent group of the hydrocarbon group (or the hydrocarbon group substituted with fluorine atom) positioned at the end of the side chain.

The polymerizable group is preferably not directly attached to the hydrocarbon group (or the hydrocarbon group substituted with fluorine atom). In other words, a linking group preferably intervenes between the hydrocarbon group and the polymerizable group. Examples of the linking groups include —O—, —CO—, —O—CO—, —CO—O—, —O—CO—O—, —CO—NH, —SO$_2$— NH—, —NH—CO—, —NH—CO—O—, —NH—SO$_2$—, -alkylene-, -alkenylene-, -alkynylene-, —O-alkylene- and -alkylene-O—, in which the left side is attached to the hydrocarbon group, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The alkynylene group can have a branched or cyclic structure. The alkynylene group contains preferably 2 to 30 carbon atoms, more preferably 2 to 20 carbon atoms, further preferably 2 to 15 carbon atoms, and most preferably 2 to 12 carbon atoms.

The hydrocarbon group (or the hydrocarbon group substituted with fluorine atom) can have two or more polymerizable groups.

A repeating unit having the polymerizable group and the hydrocarbon group is preferably represented by the formula (V).

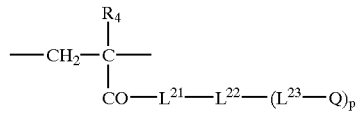

In the formula (V), $R^4$ is hydrogen or methyl.
In the formula (V), $L^{21}$ is a divalent linking group selected from the group consisting of —CO—, —SO$_2$—, —NH—, -alkylene-, -arylene- and a combination thereof. $L^{21}$ is the same as $L^0$ in the formula (II).

In the formula (V), $L^{22}$ is a divalent hydrocarbon group containing 10 to 100 carbon atoms or a divalent hydrocarbon group substituted with fluorine atom. $L^{22}$ is the same as $R^0$ in the formula (II), except that the groups of —$L^{23}$—Q are attached to the $L^{22}$.

In the formula (V), $L^{23}$ is a single bond or a divalent linking group selected from the group consisting of —O—, —CO—, —O—CO—, —CO—O—, —O—CO—O—, —CO—NH, —SO$_2$—NH—, —NH—CO—, —NH—CO—O—, —NH—SO$_2$—, -alkylene-, -alkenylene-, -alkynylene, —O-alkylene- and -alkylene-O—.

The alkylene group, the alkenylene group and the alkylene group are the same as those described above.

In the formula (V), Q is a polymerizable group. The polymerizable group of the (meth)acrylic copolymer is analogous to the polymerizable group (Q) of the liquid crystal molecule, as is described above.

In the formula (V), p is 1, 2 or 3, preferably is 1 or 2, and more preferably is 1.

In the case that a repeating unit having a hydrocarbon group (or a hydrocarbon group substituted with fluorine atom) and a polymerizable group is introduced into a (meth)acrylic copolymer, the copolymer preferably contains the polymerizable hydrocarbon repeating units in an amount of 2 to 80 mol %, and more preferably in an amount of 3 to 50 mol %.

A (meth)acrylic copolymer can have (1) a repeating unit having a hydrocarbon group (or a hydrocarbon group substituted with fluorine atom), and (2) a repeating unit having a polymerizable group.

A (meth)acrylic copolymer can also have (3) a repeating unit having a hydrocarbon group (or a hydrocarbon group substituted with fluorine atom) and a polymerizable group.

A (meth)acrylic copolymer can further have a combination of the above-described repeating units. Accordingly, the present invention can use a (meth)acrylic copolymer having the repeating units (1) and (3), a (meth)acrylic copolymer having the repeating units (2) and (3), or a (meth)acrylic copolymer having the repeating units (1), (2) and (3).

The (meth)acrylic copolymer can be prepared according to a conventional method. For example, a copolymer can be obtained by reacting carboxyl of poly(meth)acrylic acid with a hydroxyl group of an alcohol corresponding to a side chain to form an ester bond. A copolymer can also be obtained by reacting carboxyl of poly(meth)acrylic acid with an amino group of an amine corresponding to a side chain to form an amido bond.

The hydrocarbon group preferably contains two or more aromatic rings. The aromatic rings include an aromatic heterocyclic ring. The hydrocarbon group more preferably contains two, three or four aromatic rings. The hydrocarbon group more containing two, three or four aromatic rings is preferably represented by the formula (VI).

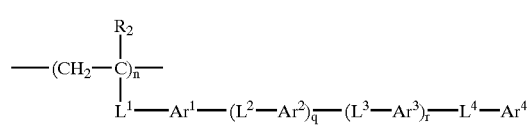

(VI)

In the formula (VI), $R^2$ is hydrogen, a halogen atom or an alkyl group having 1 to 6 carbon atoms. $R^2$ preferably is hydrogen or an alkyl group having 1 to 6 carbon atoms, more preferably is hydrogen, methyl or ethyl, and most preferably is hydrogen or methyl.

In the formula (VI), $L^1$ is a divalent linking group selected from the group consisting of —O—, —CO—, —NH—, an alkylene group and a combination thereof. $L^1$ preferably is —CO—$L^{10}$— (wherein —CO— is attached to the main chain, and $L^{10}$ is a divalent linking group selected from the group consisting of —O—, —CO—, —NH—, an alkylene group and a combination thereof).

$L^1$ more preferably is —CO—O—, —CO—O-alkylene-, —CO—O-alkylene-O— or —CO—O-alkylene-CO—O—, —CO—O-alkylene-CO—, —CO—O-arylene-CO—O— or —CO—NH-alkylene-NH—CO—O—, and most preferably is —CO—O— or —CO—NH—. $L^0$ most preferably is —CO—O— or —CO—NH—. In the above-described linking groups, the left side is attached to the main chain, and the right side is attached to $R^0$.

In the formula (VI), each of $L^2$, $L^3$ and $L^4$ independently is a single bond, -ethynylene-(—C≡C—), —CO—, —O—CO—, -alkylene-O—, —CO—NH—, —O—CO—O—, —NH—SO$_2$— or —NH—CO—O—. At least one of $L^2$, $L^3$ and $L^4$ preferably is a single bond or -ethynylene- (—C≡C—).

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

In the formula (VI), each of $Ar^1$, $Ar^2$, $Ar^3$ and $Ar^4$ independently is an aromatic ring (including an aromatic heterocyclic ring), which can have a substituent group.

The aromatic ring preferably is a hydrocarbon ring, more preferably is a hydrocarbon aromatic ring having 6 to 18 carbon atoms. Examples of the hydrocarbon aromatic rings include benzene ring, naphthalene ring, anthracene ring, phenanthrene ring, pyrene ring and naphthacene ring. Examples of the aromatic heterocyclic rings include pyridine ring and pyrimidine ring. Each of $Ar^1$, $Ar^2$, $Ar^3$ and $Ar^4$ preferably is benzene ring or naphthalene ring, and more preferably is benzene ring.

Examples of the substituent groups of the aromatic rings include a halogen atom, carboxyl, cyano, nitro, carbamoyl, sulfamoyl, an alkyl group, a cycloalkyl group, an alkoxy group, an alkylthio group, an acyl group, an acyloxy group, an alkylcarbamoyl group, an alkylsulfamoyl group, an amido group, a sulfonamido group and an alkylsulfonyl group.

In the formula (VI), each of q and r is 0 or 1. It is preferred that q is 0 or 1 and r is 0 (two or three aromatic rings). It is more preferred that each of q and r is 0 (two aromatic rings).

In the formula (VI), n is 1 to 90 mole %, preferably is 5 to 80 mole %, and more preferably is 10 to 70 mole %.

Examples of the repeating units represented by the formula (VI) (except that $L^2$, $L^3$ or $L^4$ is —C≡C—) are shown below

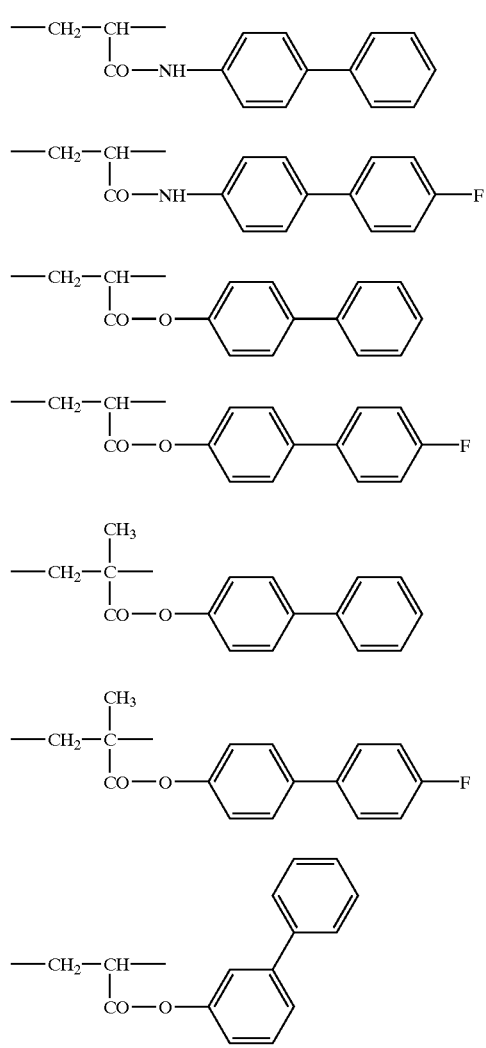
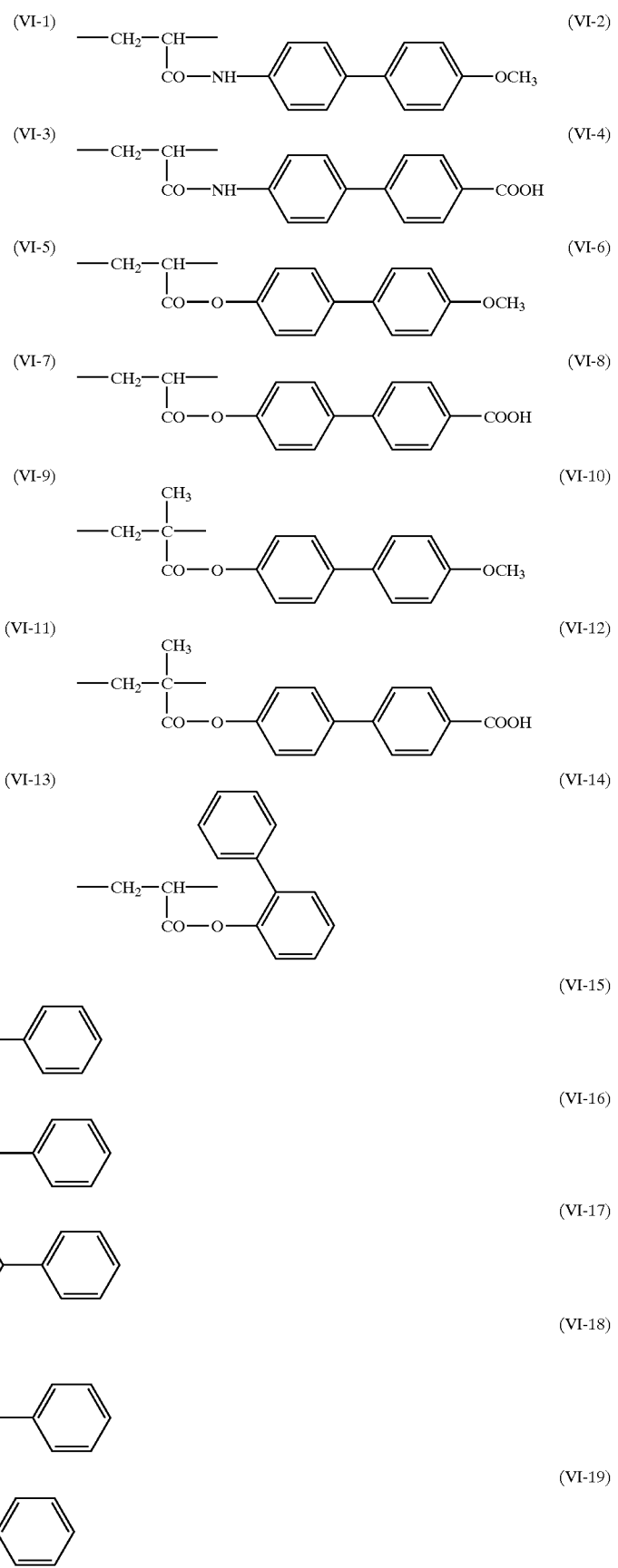

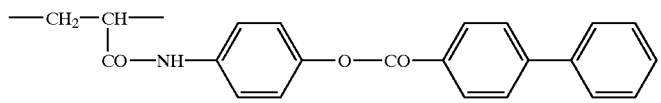 (VI-20)
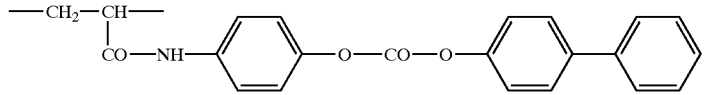 (VI-21)
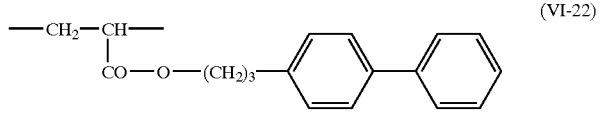 (VI-22)
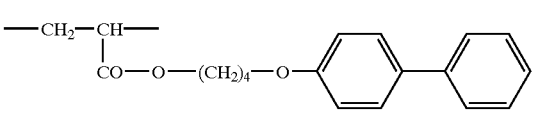 (VI-23)
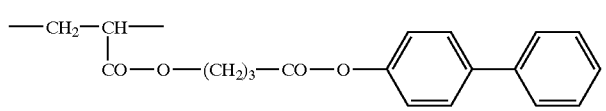 (VI-24)
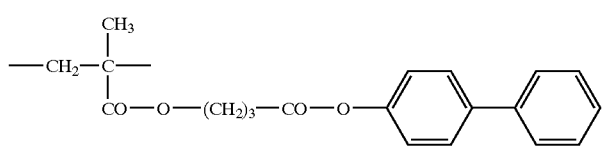 (VI-25)
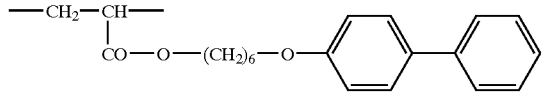 (VI-26)
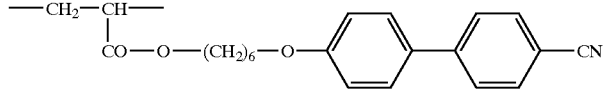 (VI-27)
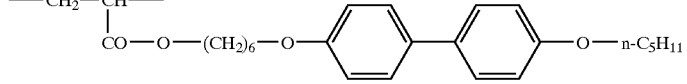 (VI-28)
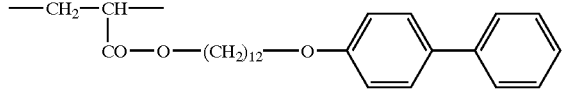 (VI-29)
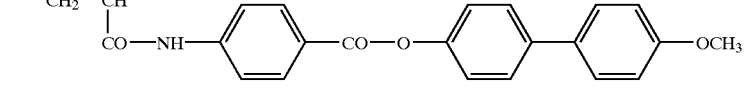 (VI-30)
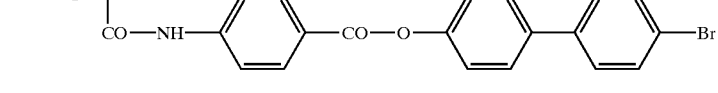 (VI-31)
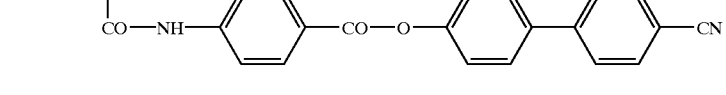 (VI-32)
(VI-33)

(VI-34)
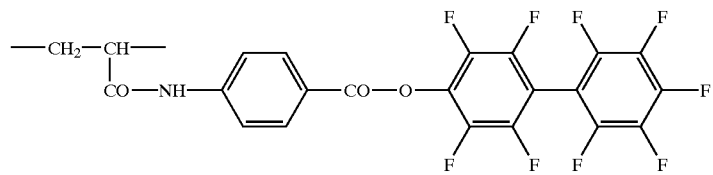
(VI-35)
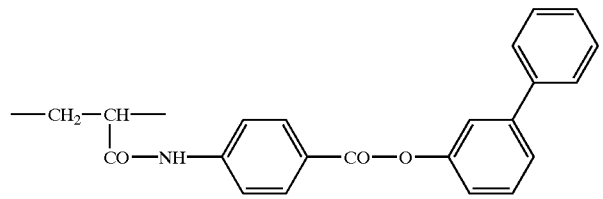
(VI-36)
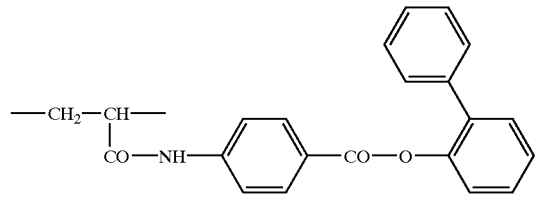
(VI-37)
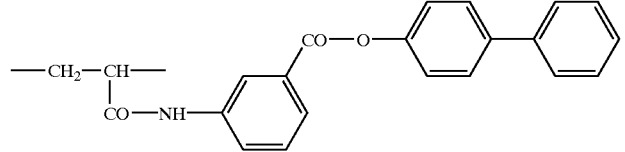
(VI-38)
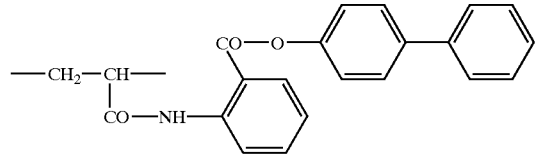
(VI-39)
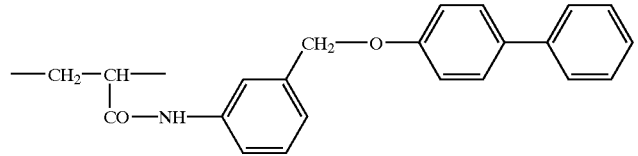
(VI-40)
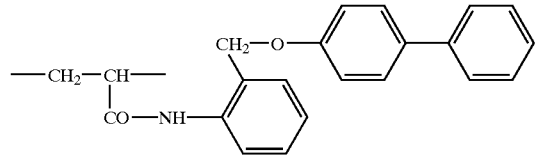
(VI-41)
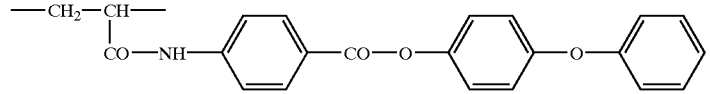
(VI-42)
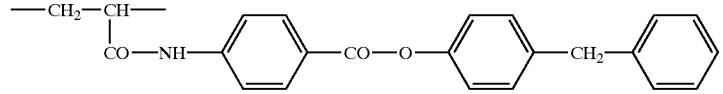
(VI-43)
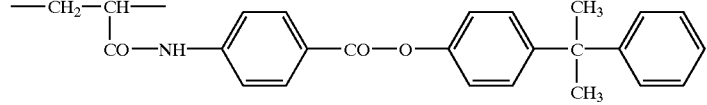

-continued
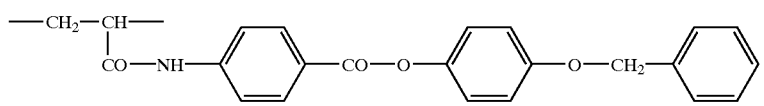
(VI-44)
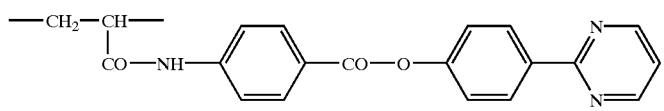
(VI-45)
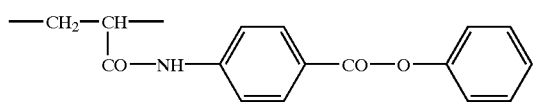
(VI-46)
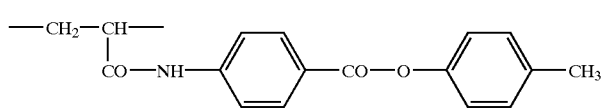
(VI-47)
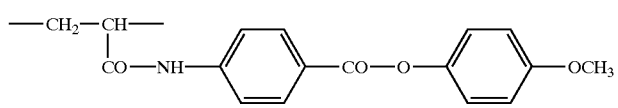
(VI-48)
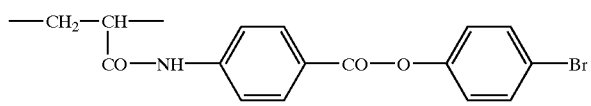
(VI-49)
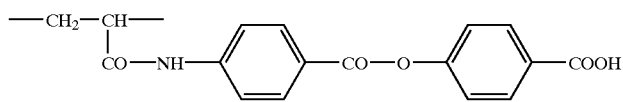
(VI-50)
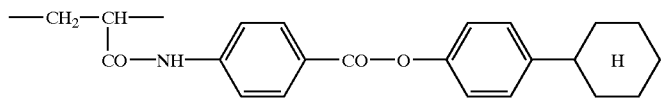
(VI-51)
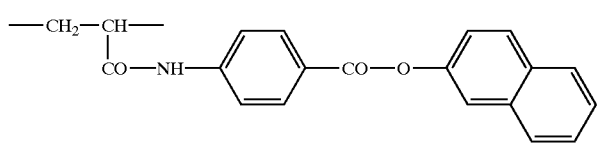
(VI-52)
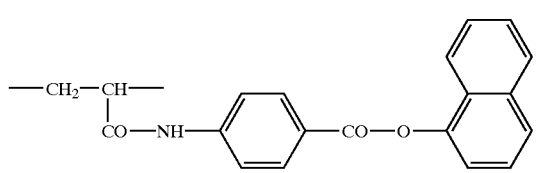
(VI-53)
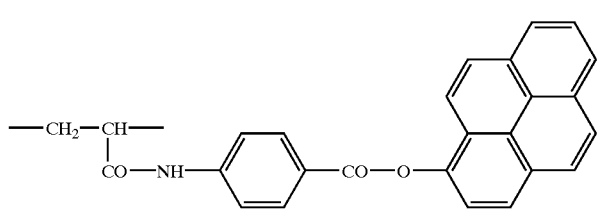
(VI-54)
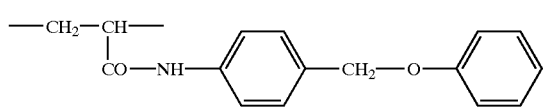
(VI-55)
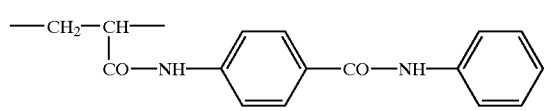
(VI-56)

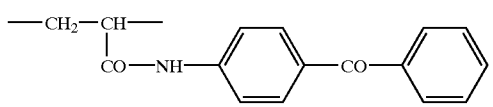
(VI-57)

Examples of the (meth)acrylic copolymers having the repeating units represented by the formula (VI) (except that $L^2$, $L^3$ or $L^4$ is —C≡C—) are shown below. AA means a repeating unit derived from acrylic acid, and MA means a repeating unit derived from methacrylic acid. The ratio of the repeating unit means mol %.

| PA301: | —(AA)60—(VI-1)40— |
|---|---|
| PA302: | —(AA)70—(VI-2)30— |
| PA303: | —(AA)60—(VI-5)40— |
| PA304: | —(AA)65—(VI-9)55— |
| PA305: | —(AA)70—(VI-11)30— |
| PA306: | —(AA)80—(VI-15)20— |
| PA307: | —(AA)70—(VI-15)30— |
| PA308: | —(AA)60—(VI-15)40— |
| PA309: | —(AA)70—(VI-16)30— |
| PA310: | —(AA)60—(VI-16)40— |
| PA311: | —(AA)50—(VI-16)50— |
| PA312: | —(AA)70—(VI-18)30— |
| PA313: | —(AA)60—(VI-18)40— |
| PA314: | —(AA)50—(VI-18)50— |
| PA315: | —(AA)60—(VI-23)40— |
| PA316: | —(AA)60—(VI-25)40— |
| PA317: | —(AA)60—(VI-32)40— |
| PA318: | —(AA)60—(VI-35)40— |
| PA319: | —(AA)60—(VI-37)40— |
| PA320: | —(AA)60—(VI-45)40— |
| PA321: | —(AA)60—(VI-55)40— |
| PA322: | —(MA)60—(VI-1)40— |
| PA323: | —(MA)70—(VI-2)30— |
| PA324: | —(MA)60—(VI-5)40— |
| PA325: | —(MA)65—(VI-9)35— |
| PA326: | —(MA)70—(VI-11)30— |
| PA327: | —(MA)80—(VI-15)20— |
| PA328: | —(MA)70—(VI-15)30— |
| PA329: | —(MA)60—(VI-15)40— |
| PA330: | —(MA)70—(VI-16)30— |
| PA331: | —(MA)60—(VI-16)40— |
| PA332: | —(MA)50—(VI-16)50— |
| PA333: | —(MA)70—(VI-18)30— |
| PA334: | —(MA)60—(VI-18)40— |
| PA335: | —(MA)60—(VI-18)40— |
| PA336: | —(MA)60—(VI-23)40— |
| PA337: | —(MA)60—(VI-25)40— |
| PA338: | —(MA)60—(VI-32)40— |
| PA339: | —(MA)60—(VI-35)40— |
| PA340: | —(MA)60—(VI-37)40— |
| PA341: | —(MA)60—(VI-45)40— |
| PA342: | —(MA)60—(VI-55)40— |

The repeating units represented by the formula (VI) preferably has a tolan structure (wherein $L^2$, $L^3$ or $L^4$ is —C≡C—, and the rings attached to both sides of —C≡C— are aromatic hydrocarbon rings).

Examples of the repeating units represented by the formula (VI) having tolan structures are shown below.

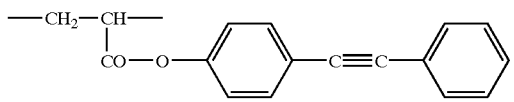
(VI-101)

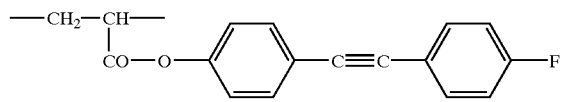
(VI-102)

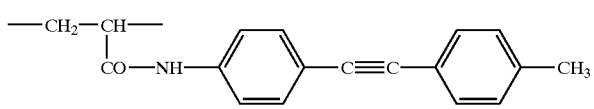
(VI-103)

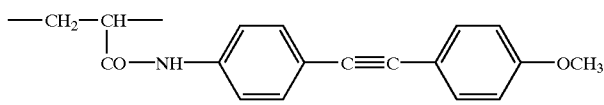
(VI-104)

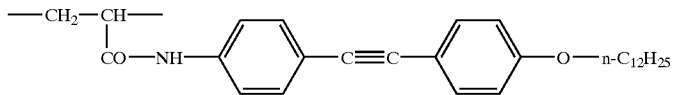
(VI-105)

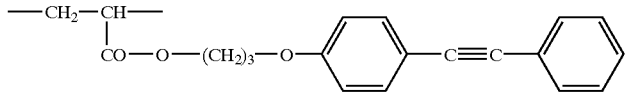
(VI-106)

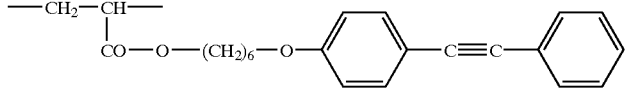
(VI-107)

-continued
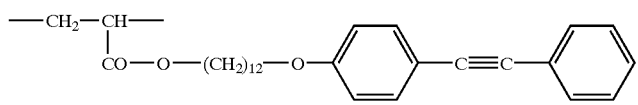
(VI-108)
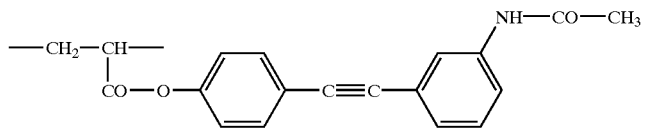
(VI-109)
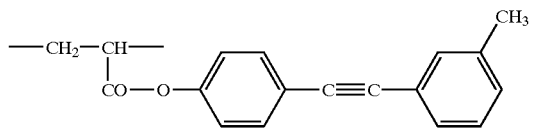
(VI-110)
(VI-111)
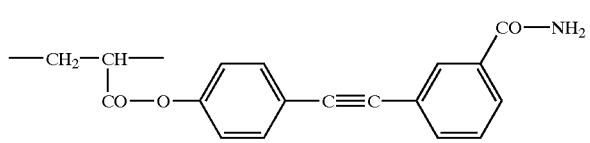
(VI-112)
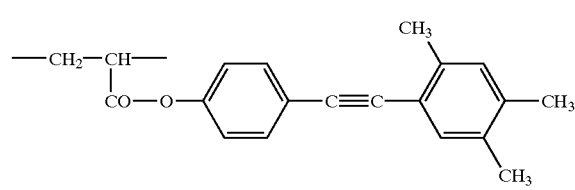
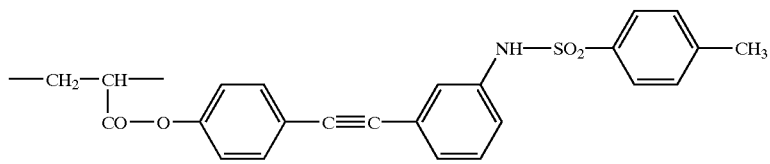
(VI-113)
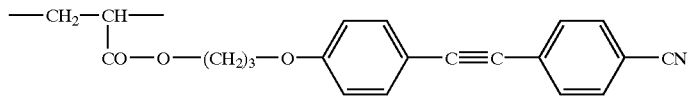
(VI-114)
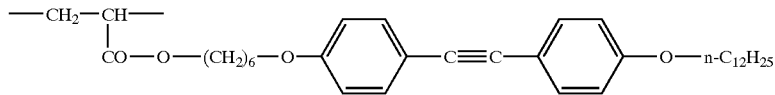
(VI-115)
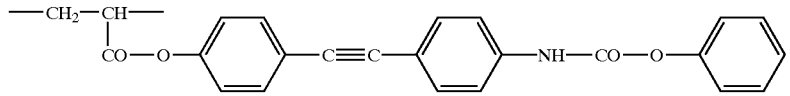
(VI-116)
(VI-117)
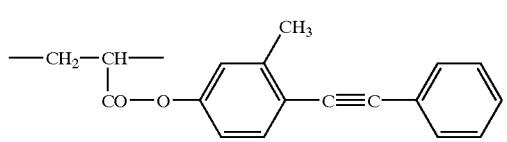
(VI-118)
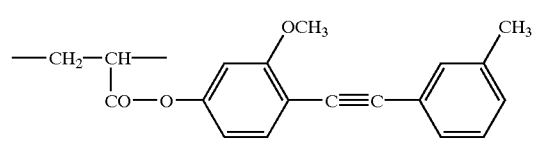
(VI-119)
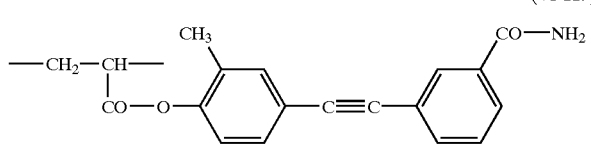
(VI-120)
(VI-121)
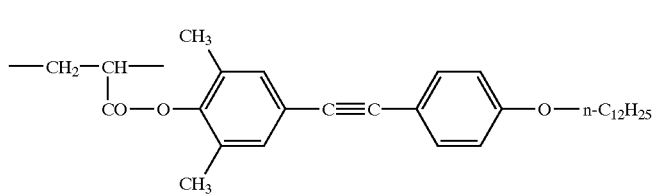

-continued
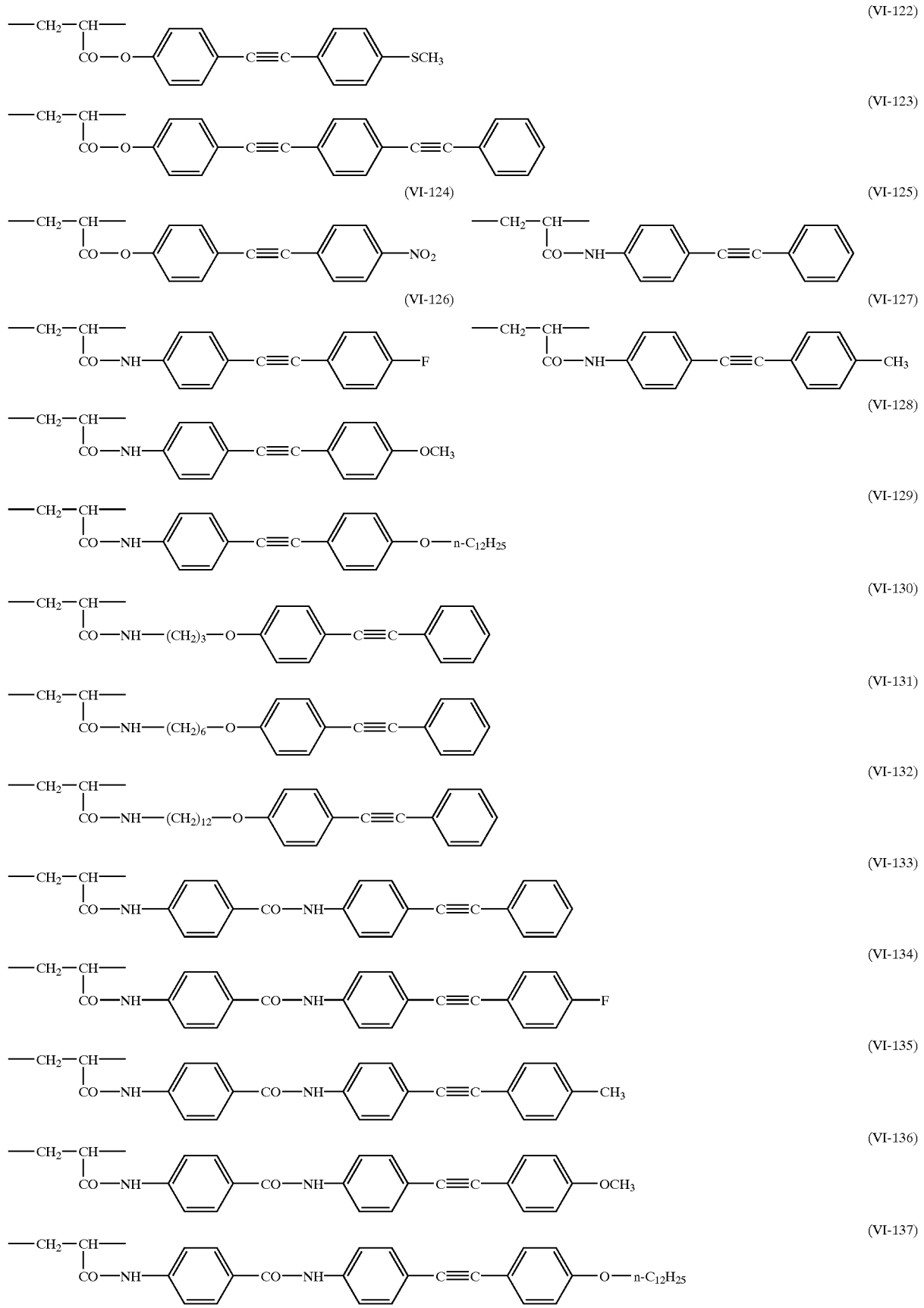

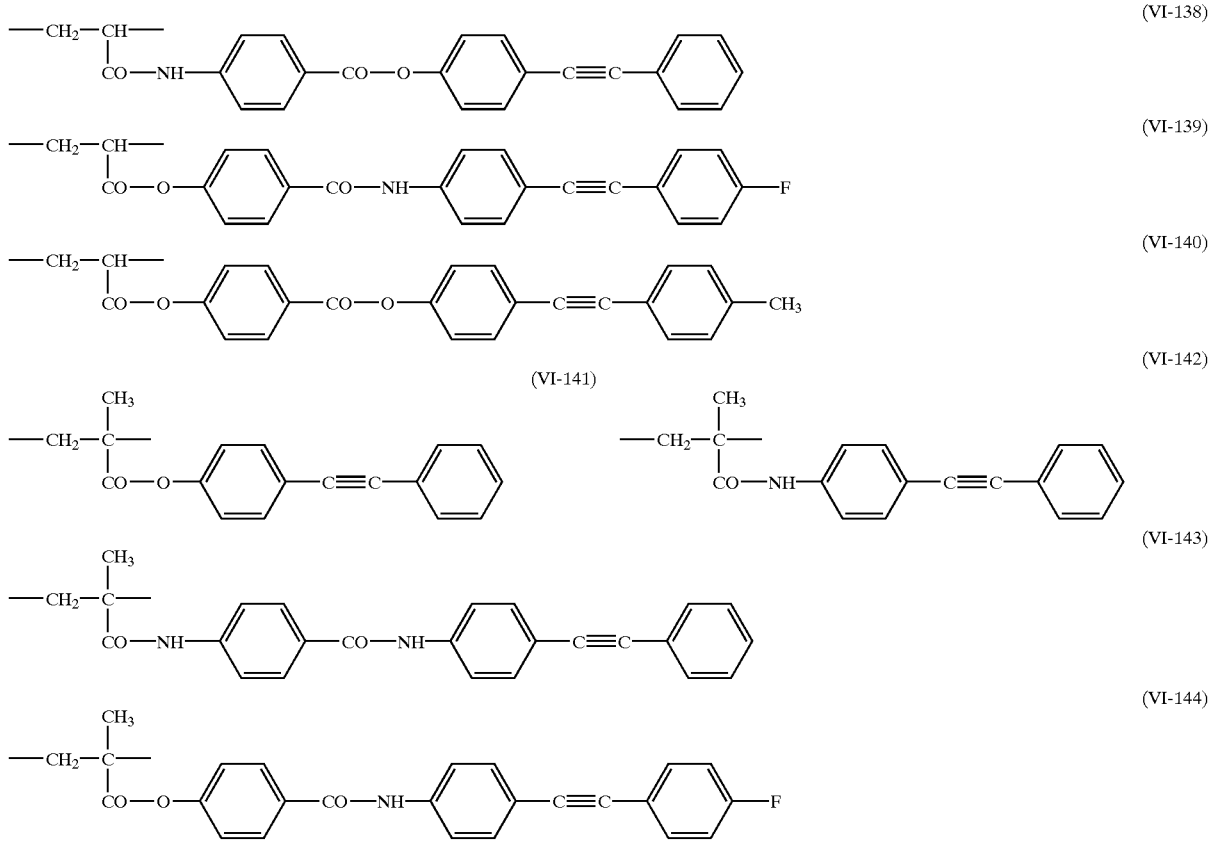

Examples of the (meth)acrylic copolymers having the repeating units represented by the formula (VI) (wherein $L^2$, $L^3$ or $L^4$ is —C≡C—) are shown below. AA means a repeating unit derived from acrylic acid, and MA means a repeating unit derived from methacrylic acid. The ratio of the repeating unit means mol %.

| | |
|---|---|
| PA401: | —(AA)60—(VI-101)40— |
| PA402: | —(AA)70—(VI-101)30— |
| PA403: | —(AA)60—(VI-102)40— |
| PA404: | —(AA)65—(VI-107)35— |
| PA405: | —(AA)70—(VI-111)30— |
| PA406: | —(AA)80—(VI-114)20— |
| PA407: | —(AA)70—(VI-120)30— |
| PA408: | —(AA)60—(VI-123)40— |
| PA409: | —(AA)70—(VI-125)30— |
| PA410: | —(AA)60—(VI-125)40— |
| PA411: | —(AA)50—(VI-125)50— |
| PA412: | —(AA)70—(VI-126)30— |
| PA413: | —(AA)60—(VI-128)40— |
| PA414: | —(AA)50—(VI-132)50— |
| PA415: | —(AA)70—(VI-133)30— |
| PA416: | —(AA)60—(VI-133)40— |
| PA417: | —(AA)70—(VI-138)30— |
| PA418: | —(AA)60—(VI-138)40— |
| PA419: | —(AA)60—(VI-139)40— |
| PA420: | —(AA)60—(VI-141)40— |
| PA421: | —(AA)60—(VI-143)40— |
| PA422: | —(MA)60—(VI-101)40— |
| PA423: | —(MA)70—(VI-101)30— |
| PA424: | —(MA)60—(VI-102)40— |
| PA425: | —(MA)65—(VI-107)35— |
| PA426: | —(MA)70—(VI-111)30— |
| PA427: | —(MA)80—(VI-114)20— |
| PA428: | —(MA)70—(VI-120)30— |
| PA429: | —(MA)60—(VI-123)40— |
| PA430: | —(MA)70—(VI-125)30— |
| PA431: | —(MA)60—(VI-125)40— |
| PA432: | —(MA)50—(VI-125)50— |
| PA433: | —(MA)70—(VI-126)30— |
| PA434: | —(MA)60—(VI-128)40— |
| PA435: | —(MA)50—(VI-132)50— |
| PA436: | —(MA)70—(VI-133)30— |
| PA437: | —(MA)60—(VI-133)40— |
| PA438: | —(MA)70—(VI-138)30— |
| PA439: | —(MA)60—(VI-138)40— |
| PA440: | —(MA)60—(VI-139)40— |
| PA441: | —(MA)60—(VI-141)40— |
| PA442: | —(MA)60—(VI-143)40— |

The polymerizable group can be introduced into the repeating unit having a hydrocarbon group containing two or more aromatic rings. The polymerizable group preferably is a substituent group of an aromatic ring, and more preferably is a substituent group of the aromatic ring positioned at the end of the side chain.

The polymerizable group is preferably not directly attached to the aromatic ring. In other words, a linking group preferably intervenes between the aromatic ring and the polymerizable group. Examples of the linking groups include —O—, —CO—, —O—CO—, —CO—O—, —O—CO—O—, —CO—NH, —SO₂—NH—, —NH—CO—, —NH—CO—O—, —NH—SO₂—, -alkylene-, -alkenylene-, -alkynylene-, —O-alkylene- and -alkylene-O—, in which the left side is attached to the hydrocarbon group, and the right side is attached to the polymerizable group.

The alkylene group can have a branched or cyclic structure. The alkylene group contains preferably 1 to 30 carbon atoms, more preferably 1 to 20 carbon atoms, further preferably 1 to 15 carbon atoms, and most preferably 1 to 12 carbon atoms.

The alkenylene group can have a branched or cyclic structure. The alkenylene group contains preferably 2 to 30 carbon atoms, more preferably 2 to 20 carbon atoms, further preferably 2 to 15 carbon atoms, and most preferably 2 to 12 carbon atoms.

The alkynylene group can have a branched or cyclic structure. The alkynylene group contains preferably 2 to 30 carbon atoms, more preferably 2 to 20 carbon atoms, further preferably 2 to 15 carbon atoms, and most preferably 2 to 12 carbon atoms.

The aromatic ring can have two or more polymerizable groups.

A repeating unit having the polymerizable group and two or more aromatic rings is preferably represented by the formula (VII).

atoms, more preferably 1 to 20 carbon atoms, further preferably 1 to 15 carbon atoms, and most preferably 1 to 12 carbon atoms.

In the formula (VII), each of $L^{22}$, $L^{23}$ and $L^{24}$ independently is a single bond, —O—, —CO—, —O—CO—, —CO—O—, —O—CO—O—, —CO—NH—, —SO$_2$—NH—, —NH—CO—, —NH—CO—O—, —NH—SO$_2$—, -alkylene-, -alkenylene-, -alkynylene-, —O-alkylene- or -alkylene-O—. At least one of $L^2$, $L^3$ and $L^4$ preferably is a single bond or -alkynylene-.

In the formula (VII), each of $Ar^{21}$, $Ar^{22}$, $Ar^{23}$ and $Ar^{24}$ independently is an aromatic ring (including an aromatic heterocyclic ring), and preferably is benzene ring. Each of $Ar^{21}$, $Ar^{22}$ and $Ar^{23}$ preferably is p-phenylene. The aromatic ring can have a substituent group. Examples of the substituent groups are the same as the examples of the substituent groups of the aromatic ring in the formula (VI).

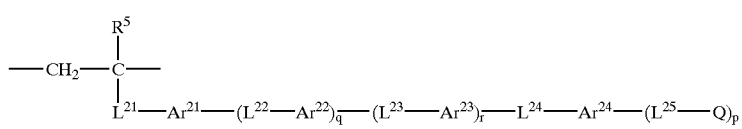

(VII)

In the formula (VII), $R^5$ is hydrogen or methyl.

In the formula (VII), $L^{21}$ is a divalent linking group selected from the group consisting of a single bond, —CO—, —CO—CO—, -alkylene-, —CO—NH-alkylene-, —CO—NH-alkylene-O—, —CO—NH-alkylene-CO—O— and —CO—NH-alkylene-CO—NH—, preferably is —CO—, —CO—NH— or -alkylene, and more preferably is —CO—NH—.

The alkylene group can have a branched or cyclic structure. The alkylene group contains preferably 1 to 30 carbon In the formula (VII), each of q and r is 0 or 1. It is preferred that q is 0 or 1 and r is 0 (two or three aromatic rings). It is more preferred that each of q and r is 0 (two aromatic rings).

In the formula (VII), p is 1, 2, or 3, preferably is 1 or 2, and more preferably is 1.

Examples of the repeating units having the polymerizable group and two or more aromatic rings are shown below.

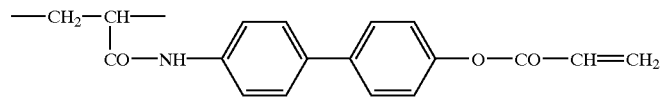

(VII-1)

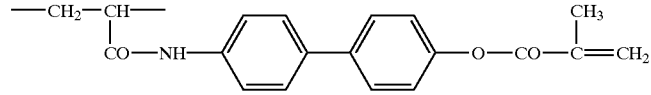

(VII-2)

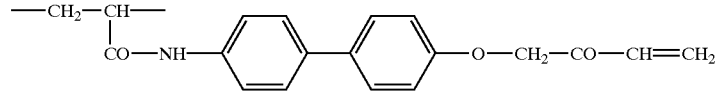

(VII-3)

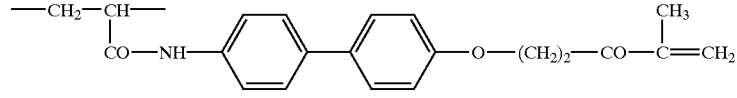

(VII-4)

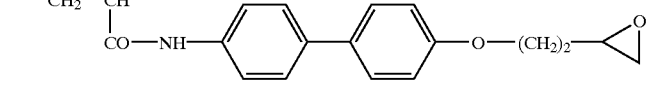

(VII-5)

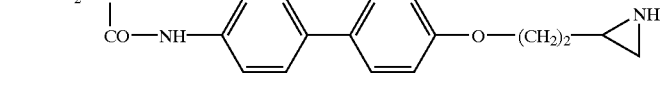

(VII-6)

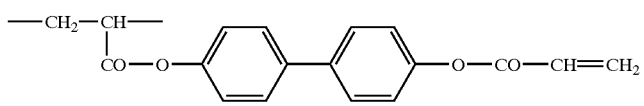
(VII-7)

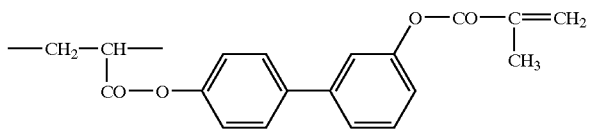
(VII-8)

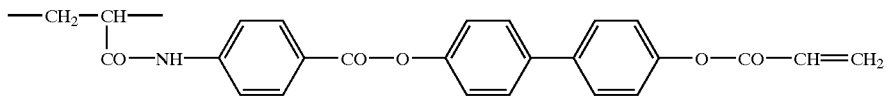
(VII-9)

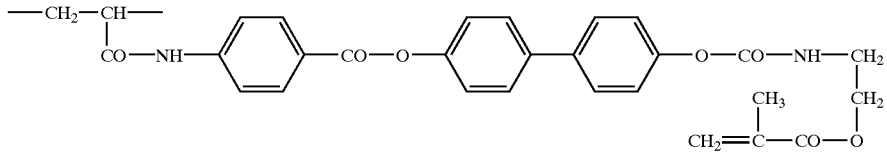
(VII-10)

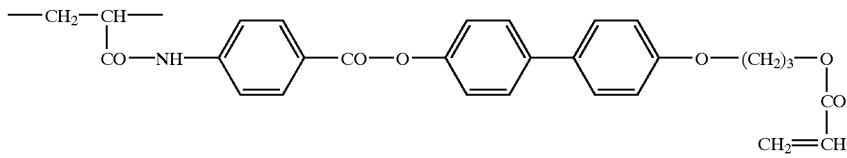
(VII-11)

In the formula (III), $R^2$ is hydrogen, a halogen atom or an alkyl group having 1 to 6 carbon atoms. $R^2$ preferably is hydrogen or an alkyl group having 1 to 6 carbon atoms, more preferably is hydrogen, methyl or ethyl, and most preferably is hydrogen or methyl.

In the formula (III), Cy is an alicyclic group, an aromatic group or a heterocyclic group.

The aliphatic ring of the alicyclic group preferably is a five-membered, six-membered or seven-membered ring, more preferably is a five-membered or six-membered ring, and most preferably is a six-membered ring. Examples of the aliphatic rings include cyclohexane ring, cyclohexene ring and bicyclo[2.2.1]hepta-2-ene ring. The aliphatic ring can be condensed with another aliphatic ring, an aromatic ring or a heterocyclic ring.

Examples of the aromatic rings of the aromatic groups include benzene ring, naphthalene ring, anthracene ring, phenanthrene ring, pyrene ring and naphthacene ring. The aromatic ring can be condensed with an aliphatic ring or a heterocyclic ring.

The heterocyclic ring of the heterocyclic group preferably is a five-membered, six-membered or seven-membered ring, and more preferably is a five-membered or six-membered ring. The heterocyclic ring preferably is aromatic. The aromatic heterocyclic ring is usually unsaturated, and preferably has the maximum number of double bonds. Examples of the heterocyclic rings include furan ring, thiophene ring, pyrrole ring, oxazole ring, isoxazole ring, isothiazole ring, imidazole ring, pyrazole ring, furazan ring, pyran ring, pyridine ring, pyridazine ring, pyrimidine ring and pyrazine ring. The heterocyclic ring can be condensed with another heterocyclic ring, an aliphatic ring or an aromatic ring.

The alicyclic group, the aromatic group or the heterocyclic group can have a substituent group. Examples of the substituent groups include an alkyl group (e.g., methyl, ethyl, t-butyl), a substituted alkyl group (e.g., chloromethyl, hydroxymethyl, chlorinated trimethylammonio), an alkoxy group (e.g., methoxy), a halogen atom (F, Cl, Br), carboxyl, an acyl group (e.g., formyl), amino, sulfo, an aryl group (e.g., phenyl), an aryloxy group (e.g., phenoxy) and oxo.

In the formula (III), n is 1 to 90 mole %, preferably is 5 to 80 mole %, and most preferably is 10 to 70 mole %.

Examples of the repeating units represented by the formula (III) are shown below.

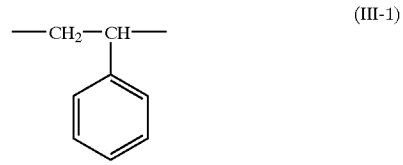
(III-1)

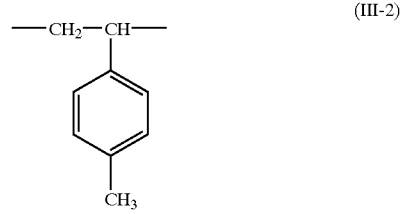
(III-2)

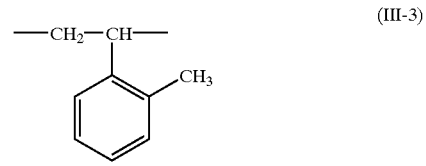
(III-3)

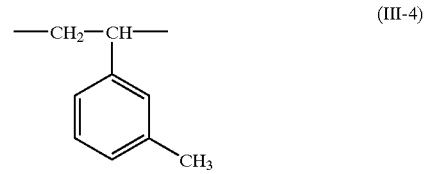
(III-4)

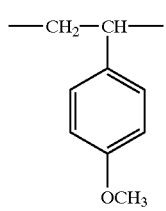 (III-5)
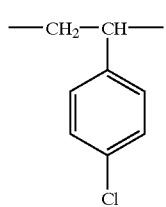 (III-6)
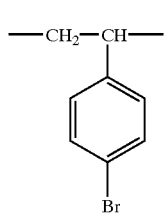 (III-7)
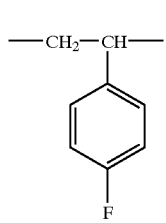 (III-8)
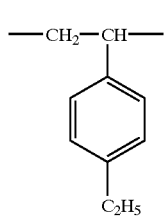 (III-9)
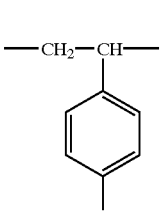 (III-10)
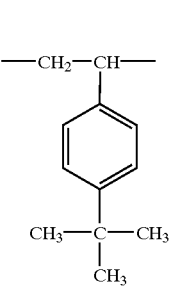 (III-11)
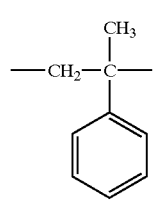 (III-12)
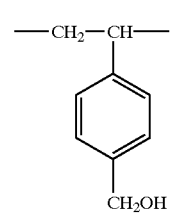 (III-13)
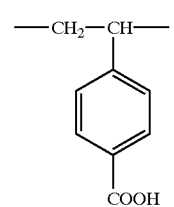 (III-14)
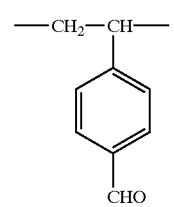 (III-15)
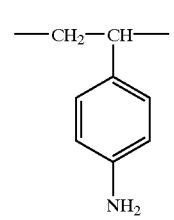 (III-16)
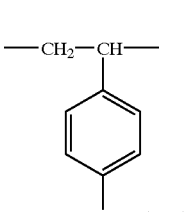 (III-17)
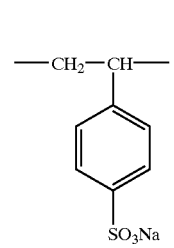 (III-18)

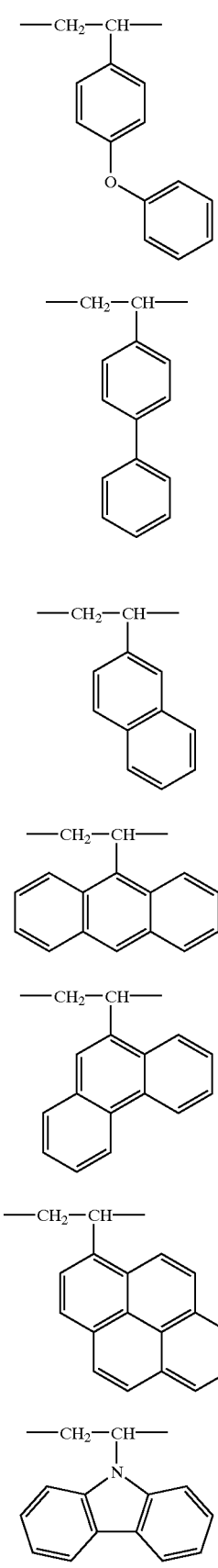
(III-19)
(III-20)
(III-21)
(III-22)
(III-23)
(III-24)
(III-25)
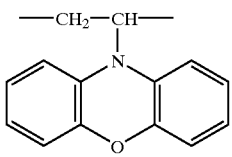
(III-26)
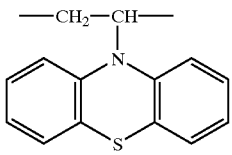
(III-27)
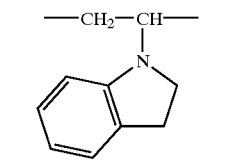
(III-28)
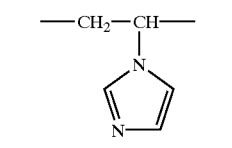
(III-29)
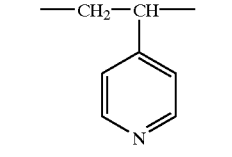
(III-30)
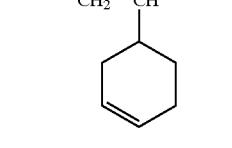
(III-31)
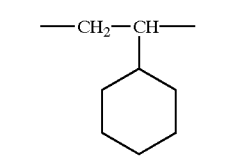
(III-32)
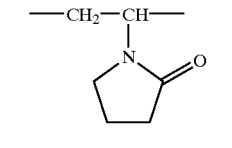
(III-33)
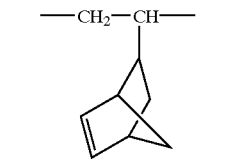
(III-34)
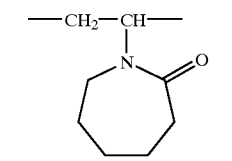
(III-35)

Examples of the (meth)acrylic copolymers having the repeating units represented by the formula (III) are shown below. AA means a repeating unit derived from acrylic acid, and MA means a repeating unit derived from methacrylic acid. The ratio of the repeating unit means mol %.

| | |
|---|---|
| PA501: | —(AA)70—(III-1)30— |
| PA502: | —(AA)60—(III-1)40— |
| PA503: | —(AA)50—(III-1)50— |
| PA504: | —(AA)40—(III-1)60— |
| PA505: | —(AA)60—(III-2)40— |
| PA506: | —(AA)60—(III-3)40— |
| PA507: | —(AA)60—(III-4)40— |
| PA508: | —(AA)60—(III-5)40— |
| PA509: | —(AA)40—(III-6)40— |
| PA510: | —(AA)50—(III-7)50— |
| PA511: | —(AA)70—(III-8)30— |
| PA512: | —(AA)60—(III-9)40— |
| PA513: | —(AA)60—(III-10)40— |
| PA514: | —(AA)60—(III-11)40— |
| PA515: | —(AA)50—(III-12)50— |
| PA516: | —(AA)50—(III-13)50— |
| PA517: | —(AA)70—(III-14)30— |
| PA518: | —(AA)50—(III-15)50— |
| PA519: | —(AA)60—(III-16)40— |
| PA520: | —(AA)60—(III-17)40— |
| PA521: | —(AA)60—(III-18)40— |
| PA522: | —(AA)60—(III-19)40— |
| PA523: | —(AA)75—(III-20)25— |
| PA524: | —(AA)60—(III-20)40— |
| PA525: | —(AA)70—(III-21)30— |
| PA526: | —(AA)80—(III-22)20— |
| PA527: | —(AA)70—(III-22)30— |
| PA528: | —(AA)60—(III-22)40— |
| PA529: | —(AA)70—(III-23)30— |
| PA530: | —(AA)70—(III-24)30— |
| PA531: | —(AA)80—(III-25)20— |
| PA532: | —(AA)70—(III-25)30— |
| PA533: | —(AA)60—(III-25)40— |
| PA534: | —(AA)60—(III-26)40— |
| PA535: | —(AA)70—(III-27)30— |
| PA536: | —(AA)80—(III-28)20— |
| PA537: | —(AA)70—(III-29)30— |
| PA538: | —(AA)60—(III-30)40— |
| PA539: | —(AA)70—(III-31)30— |
| PA540: | —(AA)70—(III-32)30— |
| PA541: | —(AA)60—(III-33)40— |
| PA542: | —(AA)70—(III-34)30— |
| PA543: | —(AA)70—(III-35)30— |
| PA601: | —(MA)70—(III-1)30— |
| PA602: | —(MA)60—(III-1)40— |
| PA603: | —(MA)50—(III-1)50— |
| PA604: | —(MA)40—(III-1)60— |
| PA605: | —(MA)60—(III-2)40— |
| PA606: | —(MA)60—(III-3)40— |
| PA607: | —(MA)60—(III-4)40— |
| PA608: | —(MA)60—(III-5)40— |
| PA609: | —(MA)40—(III-6)40— |
| PA610: | —(MA)50—(III-7)50— |
| PA611: | —(MA)70—(III-8)30— |
| PA612: | —(MA)60—(III-9)40— |
| PA613: | —(MA)60—(III-10)40— |
| PA614: | —(MA)60—(III-11)40— |
| PA615: | —(MA)50—(III-12)50— |
| PA616: | —(MA)50—(III-13)50— |
| PA617: | —(MA)70—(III-14)30— |
| PA618: | —(MA)50—(III-15)50— |
| PA619: | —(MA)60—(III-16)40— |
| PA620: | —(MA)60—(III-17)40— |
| PA621: | —(MA)60—(III-18)40— |
| PA622: | —(MA)60—(III-19)40— |
| PA623: | —(MA)75—(III-20)25— |
| PA624: | —(MA)60—(III-20)40— |
| PA625: | —(MA)70—(III-21)30— |
| PA626: | —(MA)80—(III-22)20— |
| PA627: | —(MA)70—(III-22)30— |
| PA628: | —(MA)60—(III-22)40— |
| PA629: | —(MA)70—(III-23)30— |
| PA630: | —(MA)70—(III-24)30— |
| PA631: | —(MA)80—(III-25)20— |
| PA632: | —(MA)70—(III-25)30— |
| PA633: | —(MA)60—(III-25)40— |
| PA634: | —(MA)60—(III-26)40— |
| PA635: | —(MA)70—(III-27)30— |
| PA636: | —(MA)80—(III-28)20— |
| PA637: | —(MA)70—(III-29)30— |
| PA638: | —(MA)60—(III-30)40— |
| PA639: | —(MA)70—(III-31)30— |
| PA640: | —(MA)70—(III-32)30— |
| PA641: | —(MA)60—(III-33)40— |
| PA642: | —(MA)70—(III-34)30— |
| PA643: | —(MA)70—(III-35)30— |

The polymerizable group can be introduced into the repeating unit represented by the formula (III).

The polymerizable group is preferably not directly attached to the cyclic structure of the alicyclic, aromatic group or heterocyclic group. In other words, a linking group preferably intervenes between the cyclic structure and the polymerizable group. Examples of the linking groups are the same as the examples of $L^{25}$ in the formula (VII).

Examples of the repeating units (VIII) formed by introducing the polymerizable group into the repeating unit of the formula (III) are shown below.

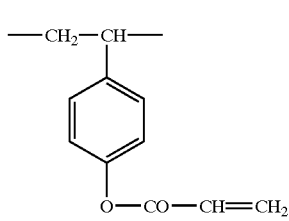

-continued
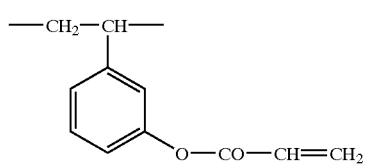 (VIII-3)
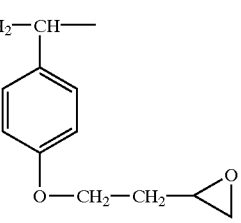 (VIII-4)
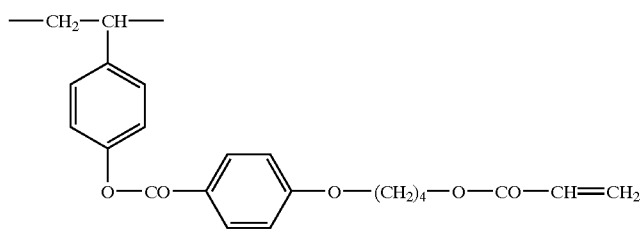 (VIII-5)
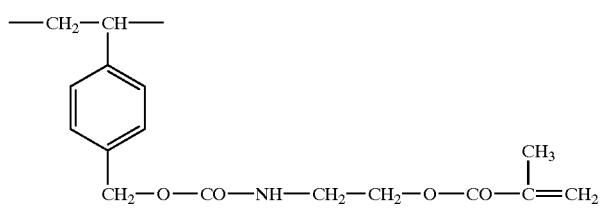 (VIII-6)
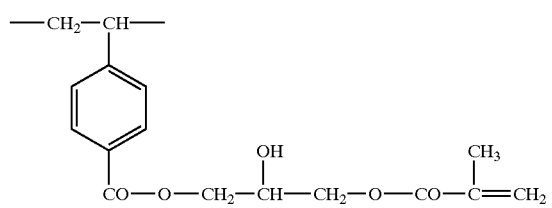 (VIII-7)
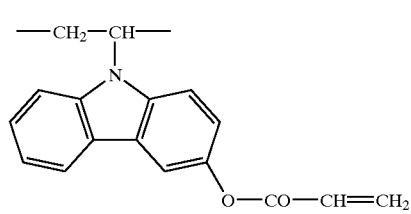 (VIII-8)
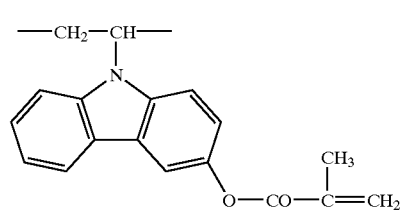 (VIII-9)
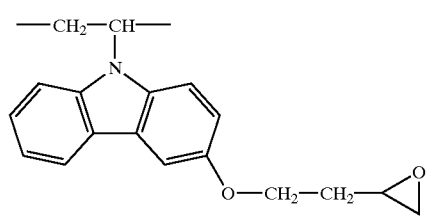 (VIII-10)
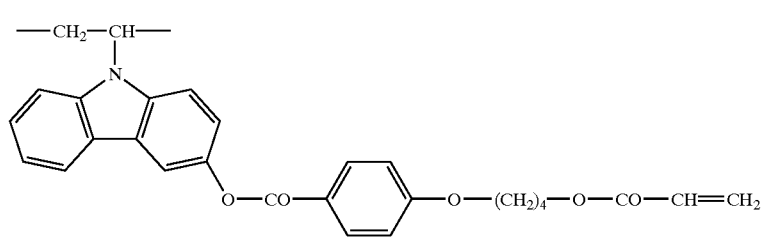 (VIII-11)
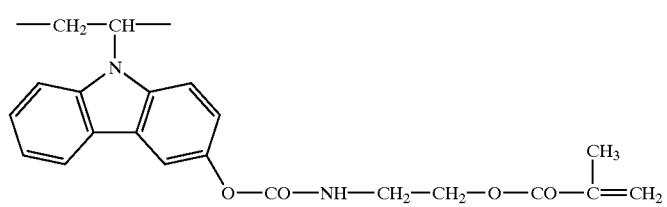 (VIII-12)

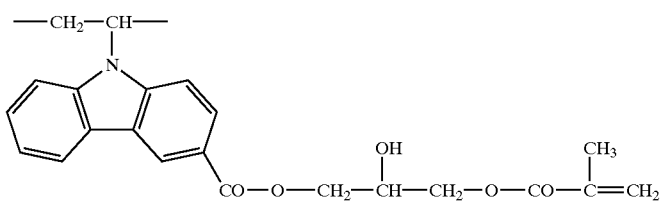

(VIII-13)

Examples of the (meth)acrylic copolymers having the repeating units represented by the formula (III) and a polymerizable group are shown below. AA means a repeating unit derived from acrylic acid, and MA means a repeating unit derived from methacrylic acid. The ratio of the repeating unit means mol %.

| | |
|---|---|
| PA701: | —(AA)70—(III-1)25—(IV-12)5— |
| PA702: | —(AA)70—(III-1)25—(IV-1)5— |
| PA703: | —(AA)50—(III-1)40—(IV-12)10— |
| PA704: | —(AA)40—(III-1)55—(IV-12)5— |
| PA705: | —(AA)60—(III-2)35—(IV-12)5— |
| PA706: | —(AA)60—(III-3)35—(IV-12)5— |
| PA707: | —(AA)60—(III-4)35—(IV-12)5— |
| PA708: | —(AA)60—(III-5)35—(IV-12)5— |
| PA709: | —(AA)60—(III-6)35—(IV-12)5— |
| PA710: | —(AA)50—(III-7)45—(IV-12)5— |
| PA711: | —(AA)70—(III-8)25—(IV-12)5— |
| PA712: | —(AA)60—(III-9)35—(IV-1)5— |
| PA713: | —(AA)60—(III-10)35—(IV-3)5— |
| PA714: | —(AA)60—(III-11)35—(IV-4)5— |
| PA715: | —(AA)50—(III-12)47—(IV-8)3— |
| PA716: | —(AA)50—(III-13)40—(VIII-6)10— |
| PA717: | —(AA)70—(III-14)25—(VIII-7)5— |
| PA718: | —(AA)50—(III-15)45—(IV-12)5— |
| PA719: | —(AA)60—(III-16)35—(IV-12)5— |
| PA720: | —(AA)60—(III-17)35—(IV-12)5— |
| PA721: | —(AA)60—(III-18)35—(IV-12)5— |
| PA722: | —(AA)60—(III-19)35—(IV-1)5— |
| PA723: | —(AA)70—(III-20)25—(IV-12)5— |
| PA724: | —(AA)50—(III-20)40—(IV-12)10— |
| PA725: | —(AA)70—(III-21)25—(IV-12)5— |
| PA726: | —(AA)75—(III-22)20—(IV-12)5— |
| PA727: | —(AA)70—(III-22)25—(IV-12)5— |
| PA728: | —(AA)60—(III-22)35—(IV-12)5— |
| PA729: | —(AA)70—(III-23)25—(IV-12)5— |
| PA730: | —(AA)70—(III-24)25—(IV-12)5— |
| PA731: | —(AA)70—(III-25)25—(IV-1)5— |
| PA732: | —(AA)70—(III-25)25—(IV-12)5— |
| PA733: | —(AA)60—(III-25)40—(IV-12)10— |
| PA734: | —(AA)60—(III-26)35—(IV-12)5— |
| PA735: | —(AA)70—(III-27)25—(IV-12)5— |
| PA736: | —(AA)75—(III-28)20—(IV-12)5— |
| PA737: | —(AA)70—(III-29)25—(IV-1)5— |
| PA738: | —(AA)60—(III-30)35—(IV-2)5— |
| PA739: | —(AA)70—(III-31)25—(IV-3)5— |
| PA740: | —(AA)70—(III-32)25—(IV-4)5— |
| PA741: | —(AA)60—(III-33)35—(IV-7)5— |
| PA742: | —(AA)70—(III-34)25—(IV-8)5— |
| PA743: | —(AA)70—(III-35)25—(IV-9)5— |
| PA801: | —(MA)70—(III-1)25—(IV-12)5— |
| PA802: | —(MA)60—(III-1)35—(IV-1)5— |
| PA803: | —(MA)50—(III-1)40—(IV-12)10— |
| PA804: | —(MA)40—(III-1)55—(IV-12)5— |
| PA805: | —(MA)60—(III-2)35—(IV-12)5— |
| PA806: | —(MA)60—(III-3)35—(IV-12)5— |
| PA807: | —(MA)60—(III-4)35—(IV-12)5— |
| PA808: | —(MA)60—(III-5)35—(IV-12)5— |
| PA809: | —(MA)60—(III-6)35—(IV-12)5— |
| PA810: | —(MA)50—(III-7)45—(IV-12)5— |
| PA811: | —(MA)70—(III-8)25—(IV-12)5— |
| PA812: | —(MA)60—(III-9)35—(IV-1)5— |
| PA813: | —(MA)60—(III-10)35—(IV-3)5— |
| PA814: | —(MA)60—(III-11)35—(IV-4)5— |
| PA815: | —(MA)50—(III-12)47—(IV-8)3— |
| PA816: | —(MA)50—(III-13)40—(VIII-6)10— |
| PA817: | —(MA)70—(III-14)25—(VIII-7)5— |
| PA818: | —(MA)50—(III-15)45—(IV-12)5— |
| PA819: | —(MA)60—(III-16)35—(IV-12)5— |
| PA820: | —(MA)60—(III-17)35—(IV-12)5— |
| PA821: | —(MA)60—(III-18)35—(IV-12)5— |
| PA822: | —(MA)60—(III-19)35—(IV-1)5— |
| PA823: | —(MA)70—(III-20)25—(IV-12)5— |
| PA824: | —(MA)50—(III-20)40—(IV-12)10— |
| PA825: | —(MA)70—(III-21)25—(IV-12)5— |
| PA826: | —(MA)75—(III-22)20—(IV-12)5— |
| PA827: | —(MA)70—(III-22)25—(IV-12)5— |
| PA828: | —(MA)60—(III-22)35—(IV-12)5— |
| PA829: | —(MA)70—(III-23)25—(IV-12)5— |
| PA830: | —(MA)70—(III-24)25—(IV-12)5— |
| PA831: | —(MA)70—(III-25)25—(IV-1)5— |
| PA832: | —(MA)70—(III-25)25—(IV-12)5— |
| PA833: | —(MA)60—(III-25)30—(IV-12)10— |
| PA834: | —(MA)60—(III-26)35—(IV-12)5— |
| PA835: | —(MA)70—(III-27)25—(IV-12)5— |
| PA836: | —(MA)75—(III-28)20—(IV-12)5— |
| PA837: | —(MA)70—(III-29)25—(IV-1)5— |
| PA838: | —(MA)60—(III-30)35—(IV-2)5— |
| PA839: | —(MA)70—(III-31)25—(IV-3)5— |
| PA840: | —(MA)70—(III-32)25—(IV-4)5— |
| PA841: | —(MA)60—(III-33)35—(IV-7)5— |
| PA842: | —(MA)70—(III-34)25—(IV-8)5— |
| PA843: | —(MA)70—(III-35)25—(IV-9)5— |

The (meth)acrylic copolymer has a polymerization degree preferably in the range of 200 to 5,000, and more preferably in the range of 300 to 3,000. The (meth)acrylic copolymer has a molecular weight preferably in the range of 9,000 to 200,000, and more preferably in the range of 13,000 to 130,000.

Two or more (meth)acrylic copolymers can be used in combination.

The (meth)acrylic copolymer can have a cross-linked structure. A cross-linking reaction is preferably conducted simultaneously with or after coating a solution of the orientation layer on a substrate.

The (meth)acrylic copolymer can be cross-linked by a cross-linking reaction of carboxyl group of a (meth)acrylic copolymer by using a cross-linking agent, which is described in "Cross-linking Agent Handbook, Shinzo Yamashita and Tosuke Kaneko, Taiseisha (written in Japanese). Examples of the cross-linking agents include a methylol phenol resin, an amino resin (e.g., a resin of an addition reaction product of melamine, benzoquanamine or urea with formaldehyde or alcohol), an amine compound, a triazine compound, an isocyanate compound, an epoxy compound, a metal oxide, a metal halide compound, an organic metal halide compound, a metal salt of an organic acid, a metal alkoxide, and a compound having an oxazoline group.

The coating amount of the cross-linking agent is preferably in the range of 0.1 to 20 wt. %, and more preferably in the range of 0.5 to 15 wt. %, based on the total coating amount of the orientation layer. The amount of the remaining (not reacted) cross-linking agent is preferably not more than 1.0 wt. %, and more preferably not more than 0.5 wt. %, based on the coating amount of the orientation layer.

The orientation layer is preferably formed by rubbing the coated polymer. The rubbing treatment can be conducted by rubbing a layer containing the (meth)acrylic copolymer with a paper or cloth several times along a certain (usually longitudinal) direction.

A precursor of a (meth)acrylic copolymer can be coated, and then heated to cause a condensation reaction to form a copolymer before the rubbing treatment.

The orientation layer has a thickness preferably in the range of 0.1 to 10 μm, more preferably in the range of 0.05 to 5 μm, and most preferably in the range of 0.1 to 1 μm.

After aligning liquid crystal molecules by the orientation layer, the alignment of the liquid crystal molecules can be kept without the orientation layer. For examples, an aligned optically anisotropic layer (without the orientation layer) can be transferred on a transparent substrate to prepare an optical compensatory sheet. The orientation layer of the present invention is particularly effective in aligning discotic liquid crystal molecules.

The orientation layer is preferably formed by a process which comprises the steps of: coating a solution of the (meth)acrylic copolymer on a substrate to form a coated layer; drying the coated layer; rubbing a surface of the coated layer; and heating the coated layer at 50 to 300° C. in this order.

The coated layer is heated more preferably at 50 to 250° C., and most preferably at 100 to 250° C.

The coated layer can be heated by attaching the layer on a substrate to a surface of a heating medium, placing the layer on a substrate in a heated vessel, splaying a hated air to the layer on a substrate along a rubbing direction. The heating medium preferably is a plate. The heating time depends on the heating temperature. Where the heating temperature is 100° C., the heating time is preferably in the range of 1 to 30 minutes. Where the heating temperature is 130° C., the heating time is preferably in the range of 30 seconds to 10 minutes. Where the heating temperature is 160° C., the heating time is preferably in the range of 10 seconds to 3 minutes. The interval between the rubbing treatment and the heating treatment is preferably not longer than 1 week, more preferably not longer than 3 days, and most preferably not longer than 3 hours.

The coated layer is most preferably heated by attaching the layer to a surface of a plate heated at 100 to 250° C.

The heat treatment after the rubbing treatment has (1) an effect on alignment of discotic liquid crystal molecules in an optical anisotropic layer and (2) a physical effect on the orientation layer itself.

The effect (1) on alignment of discotic liquid crystal molecules in an optical anisotropic layer can influence on an average inclined angle of the discotic liquid crystal molecule to the plane of the substrate. Further, the effect (1) shows an aligning force on discotic liquid crystal molecule. The discotic liquid crystal molecules can be aligned uniformly (mono domain alignment) by the aligning force. The alignment defects along the interface between different domains (which degrades optical characteristics) can be reduced in the mono domain alignment. The alignment defects are scarcely found in the orientation layer prepared according to the heating treatment described above. Further, the discotic liquid crystal molecules can be essentially vertically aligned at a low temperature or for a short time.

The intermolecular (or intramolecular) reaction is increased by the heat treatment to cause the physical effect (2) on the orientation layer itself. The intermolecular (or intramolecular) reaction increases the hardness of the molecular chain to enhance the mechanical strength of the orientation layer. The heat treatment has another effect of eliminating ions remaining from the orientation layer.

[Liquid Crystal Layer]

The liquid crystal molecules are contained in a liquid crystal layer to be aligned by using the above-described orientation layer. The orientation layer has a function of aligning the liquid crystal molecule essentially vertically (at an average inclined angle in the range of 50° to 90°).

The liquid crystal molecule preferably is a rod-like liquid crystal molecule or a discotic liquid crystal molecule. The inclined angle of the rod-like liquid crystal molecule means an angle between a long axis of a rod-like liquid crystal molecule and a surface of a substrate (or a surface of an orientation layer). The inclined angle of the discotic liquid crystal molecule means an angle between a discotic plane of a discotic liquid crystal molecule and a surface of a substrate (or a surface of an orientation layer).

In the case that a liquid crystal element is used as a liquid crystal cell, rod-like liquid crystal molecules are preferably used.

Examples of the rod-like liquid crystal molecules include azomethines, azoxys, cyanobiphenyls, cyanophenyl esters, benzoic esters, phenyl cyclohexanecarboxylates, cyanophenylcyclohexanes, cyanophenylpyridines, alkoxylphenylpyridines, alkoxyphenylpyrimidines, phenyldioxanes, tolanes and alkenylcyclohexylbenzonitriles.

A representative liquid crystal cell containing vertically aligned rod-like liquid crystal molecules is a liquid crystal cell of a vertically aligned (VA) mode. A liquid crystal display having the cell of the VA mode is described in Nikkei Microdevice No. 136, page 147 (written in Japanese, 1996), Japanese Patent Provisional Publication No. 2(1990)-176625 and Japanese Patent No. 2,866,372.

[Optically Anisotropic Layer]

In the case that the liquid crystal element is used as an optical compensatory sheet, the liquid crystal layer functions as an optical anisotropic layer. The optically anisotropic layer preferably comprises rod-like liquid crystal molecules or discotic liquid crystal molecules, and more preferably comprises discotic liquid crystal molecules.

In the optically anisotropic layer, discotic planes of discotic liquid crystal molecules are aligned essentially vertically to the orientation layer (at an average inclined angle in the range of 50° to 90°). The discotic liquid crystal molecules are preferably fixed in the optical anisotropic layer while keeping the vertical (homogeneous) alignment. The discotic liquid crystal molecules are preferably fixed by a polymerization reaction.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

A polymerizable group should be bound to a discotic core of the discotic liquid crystal molecule to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal molecule having a polymerizable group (polymerizable discotic liquid crystal molecule) preferably is a compound represented by the following formula.

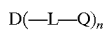

in which D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).

(D1)
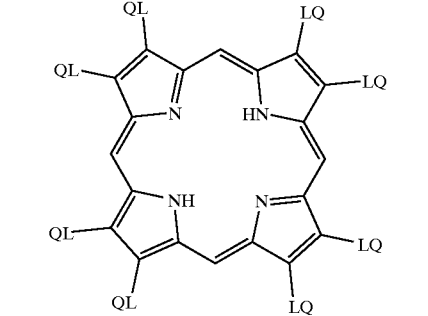

(D2)
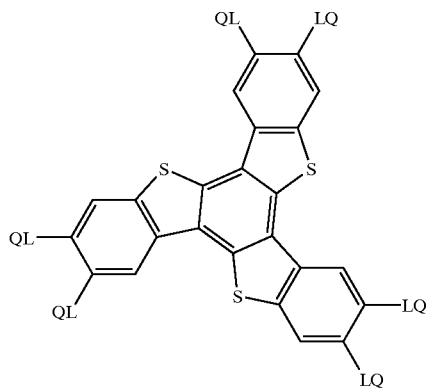

(D3)
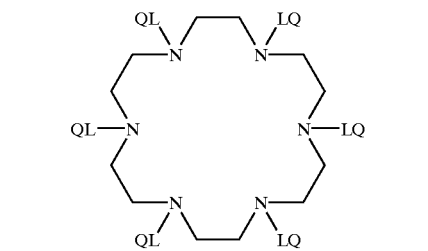

(D4)
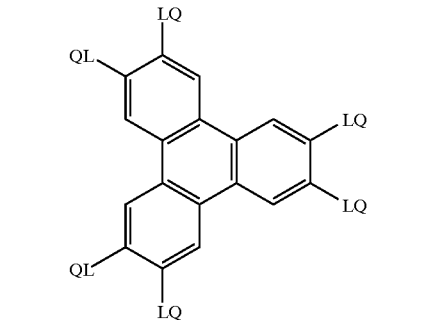

-continued (D5)
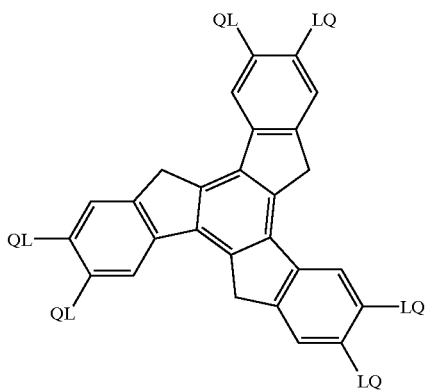

(D6)
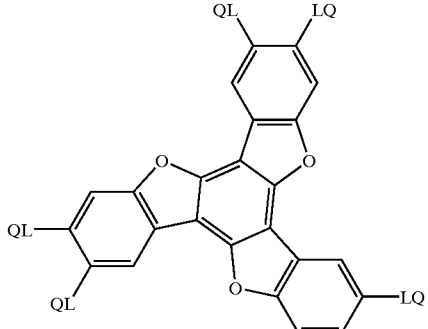

(D7)
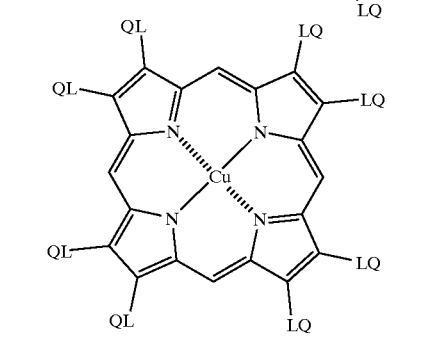

(D8)
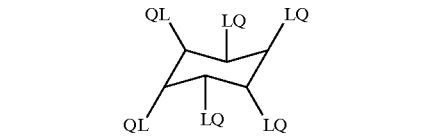

(D9)
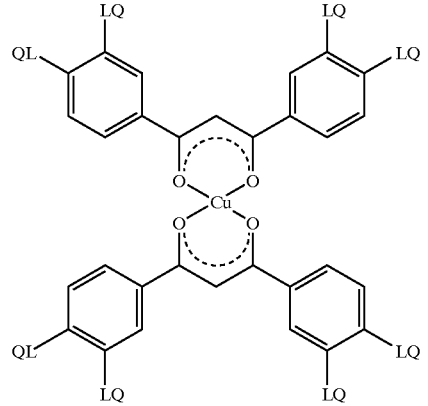

-continued

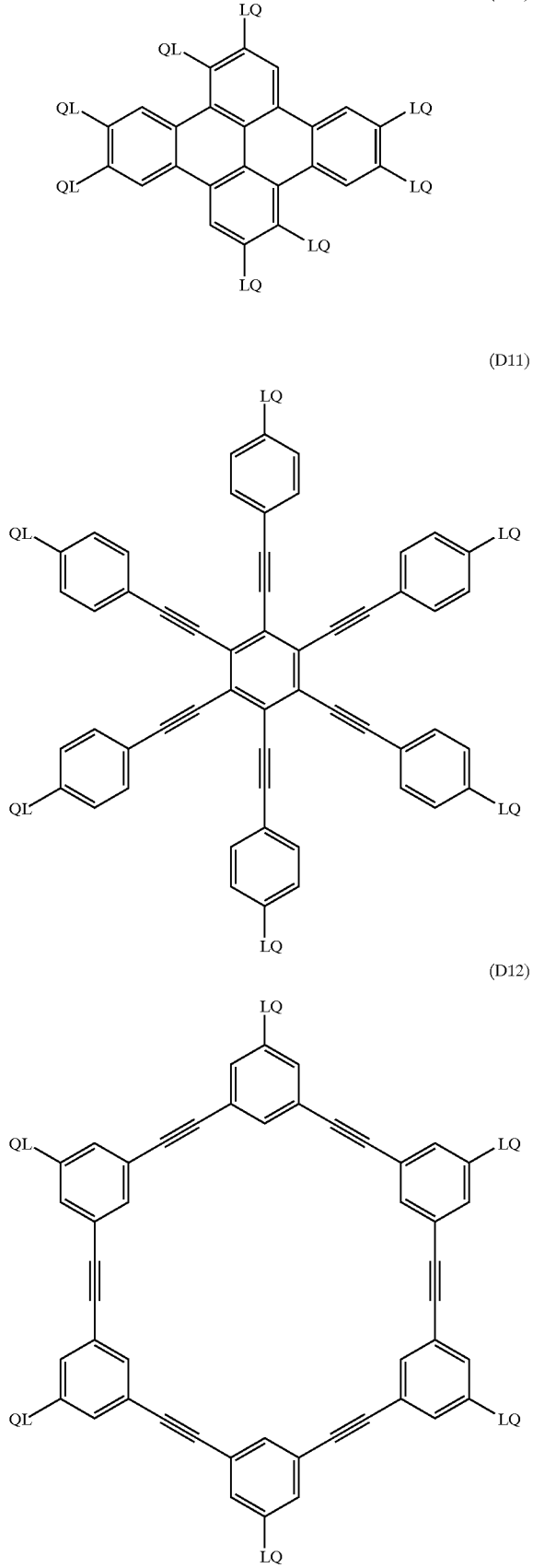

(D10)

(D11)

(D12)

-continued

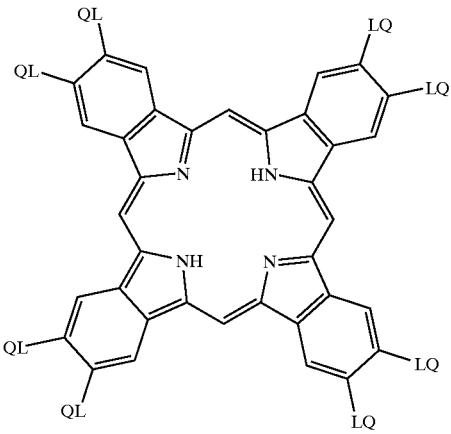

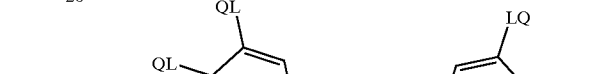

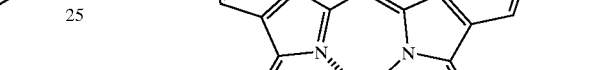

(D13)

(D14)

(D15)

In the formula, the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below. In the examples, the left side is attached to the discotic core (D), and the right side is attached to the polymerizable group (Q). The AL means an alkylene group or ail alkenylene group. The AR means an arylene group.

| | |
|---|---|
| L1: | —AL—CO—O—AL—O—CO— |
| L2: | —AL—CO—O—AL—O— |
| L3: | —AL—CO—O—AL—O—AL— |
| L4: | —AL—CO—O—AL—O—CO— |
| L5: | —CO—AR—O—AL— |
| L6: | —CO—AR—O—AL—O— |
| L7: | —CO—AR—O—AL—O—CO— |
| L8: | —CO—NH—AL— |
| L9: | —NH—AL—O— |
| L10: | —NH—AL—O—CO— |
| L11: | —O—AL— |
| L12: | —O—AL—O— |
| L13: | —O—AL—O—CO— |
| L14: | —O—AL—O—CO—NH—AL— |
| L15: | —O—AL—S—AL— |
| L16: | —O—CO—AL—AR—O—AL—O—CO— |
| L17: | —O—CO—AR—O—AL—CO— |
| L18: | —O—CO—AR—O—AL—O—CO— |
| L19: | —O—CO—AR—O—AL—O—AL—O—CO— |
| L20: | —O—CO—AR—O—AL—O—AL—O—AL—O—CO— |
| L21: | —S—AL— |
| L22: | —S—AL—O— |
| L23: | —S—AL—O—CO— |
| L24: | —S—AL—S—AL— |
| L25: | —S—AR—AL— |

The discotic liquid crystal molecules can be spirally twisted by introducting asymmetric carbon atom into the molecules, preferably into AL (an alkylene group or an alkenylene group) of the divalent linking group (L). Examples of AL* containing asymmetric carbon atoms are shown below. In the examples, the left side is adjacent to the discotic core (D), and the right side is adjacent to the polymerizable group (Q). The carbon atom (C) with the mark (*) is the asymmetric carbon atom. The optical activity can be S or R.

| | |
|---|---|
| AL*1: | —CH$_2$CH$_2$—C*HCH$_3$—CH$_2$CH$_2$CH$_2$— |
| AL*2: | —CH$_2$CH$_2$CH$_2$—C*HCH$_3$—CH$_2$CH$_2$— |
| AL*3: | —CH$_2$C*HCH$_3$—CH$_2$CH$_2$CH$_2$CH$_2$— |
| AL*4: | —C*HCH$_3$—CH$_2$CH$_2$CH$_2$CH$_2$CH$_2$— |
| AL*5: | —CH$_2$CH$_2$CH$_2$CH$_2$—C*HCH$_3$CH$_2$— |
| AL*6: | —CH$_2$CH$_2$CH$_2$CH$_2$CH$_2$—C*HCH$_3$— |
| AL*7: | —C*HCH$_3$—CH$_2$CH$_2$CH$_2$CH$_2$— |
| AL*8: | —CH$_2$—C*HCH$_3$—CH$_2$CH$_2$CH$_2$— |
| AL*9: | —CH$_2$CH$_2$—C*HCH$_3$—CH$_2$CH$_2$— |
| AL*10: | —CH$_2$CH$_2$CH$_2$—C*HCH$_3$—CH$_2$— |
| AL*11: | —CH$_2$CH$_2$CH$_2$CH$_2$—C*HCH$_3$— |
| AL*12: | —C*HCH$_3$—CH$_2$CH$_2$CH$_2$— |
| AL*13: | —CH$_2$—C*HCH$_3$—CH$_2$CH$_2$— |
| AL*14: | —CH$_2$CH$_2$—C*HCH$_3$—CH$_2$— |
| AL*15: | —CH$_2$CH$_2$CH$_2$—C*HCH$_3$— |
| AL*16: | —CH$_2$—C*HCH$_3$— |
| AL*17: | —C*HCH$_3$—CH$_2$— |
| AL*18: | —C*HCH$_3$—CH$_2$CH$_2$CH$_2$CH$_2$CH$_2$CH$_2$— |
| AL*19: | —CH$_2$—C*HCH$_3$—CH$_2$CH$_2$CH$_2$CH$_2$CH$_2$— |
| AL*20: | —CH$_2$CH$_2$—C*HCH$_3$—CH$_2$CH$_2$CH$_2$CH$_2$— |
| AL*21: | —CH$_2$CH$_2$CH$_2$—C*HCH$_3$—CH$_2$CH$_2$CH$_2$— |
| AL*22: | —C*HCH$_3$—CH$_2$CH$_2$CH$_2$CH$_2$CH$_2$CH$_2$CH$_2$— |
| AL*23: | —CH$_2$—C*HCH$_3$—CH$_2$CH$_2$CH$_2$CH$_2$CH$_2$CH$_2$— |
| AL*24: | —CH$_2$CH$_2$—C*HCH$_3$—CH$_2$CH$_2$CH$_2$CH$_2$CH$_2$— |
| AL*25: | —CH$_2$CH$_2$CH$_2$—C*HCH$_3$—CH$_2$CH$_2$CH$_2$CH$_2$— |
| AL*26: | —C*HCH$_3$—CH$_2$CH$_2$CH$_2$CH$_2$CH$_2$CH$_2$CH$_2$CH$_2$— |
| AL*27: | —CH$_2$—C*HCH$_3$—CH$_2$CH$_2$CH$_2$CH$_2$CH$_2$CH$_2$CH$_2$— |
| AL*28: | —CH$_2$—C*HCH$_2$CH$_3$— |
| AL*29: | —CH$_2$—C*HCH$_2$CH$_3$—CH$_2$— |
| AL*30: | —CH$_2$—C*HCH$_2$CH$_3$—CH$_2$CH$_2$— |
| AL*31: | —CH$_2$—C*HCH$_2$CH$_3$—CH$_2$CH$_2$CH$_2$CH$_2$— |
| AL*32: | —CH$_2$—C*H(n-C$_3$H$_7$)—CH$_2$CH$_2$— |
| AL*33: | —CH$_2$—C*H(n-C$_3$H$_7$)—CH$_2$CH$_2$CH$_2$CH$_2$— |
| AL*34: | —CH$_2$—C*H(OCOCH$_3$)—CH$_2$CH$_2$— |
| AL*35: | —CH$_2$—C*H(OCOCH$_3$)—CH$_2$CH$_2$CH$_2$CH$_2$— |
| AL*36: | —CH$_2$—C*HF—CH$_2$CH$_2$— |
| AL*37: | —CH$_2$—C*HF—CH$_2$CH$_2$CH$_2$CH$_2$— |
| AL*38: | —CH$_2$—C*HCl—CH$_2$CH$_2$— |
| AL*39: | —CH$_2$—C*HCl—CH$_2$CH$_2$CH$_2$CH$_2$— |
| AL*40: | —CH$_2$—C*HOCH$_3$—CH$_2$CH$_2$— |
| AL*41: | —CH$_2$—C*HOCH$_3$—CH$_2$CH$_2$CH$_2$CH$_2$— |
| AL*42: | —CH$_2$—C*HCN—CH$_2$CH$_2$— |
| AL*43: | —CH$_2$—C*HCN—CH$_2$CH$_2$CH$_2$CH$_2$— |
| AL*44: | —CH$_2$—C*HCF$_3$—CH$_2$CH$_2$— |
| AL*45: | —CH$_2$—C*HCF$_3$—CH$_2$CH$_2$CH$_2$CH$_2$— |

The polymerizable group (Q) is determined by the polymerization reaction. Examples of the polymerizable groups (Q) are shown below.

$$—CH{=}CH_2 \quad (Q1)$$

$$—CH{=}CH—CH_3 \quad (Q2)$$

$$—CH{=}CH—C_2H_5 \quad (Q3)$$

$$—CH{=}CH—n\text{-}C_3H_7 \quad (Q4)$$

$$—\underset{\underset{CH_3}{|}}{C}{=}CH_2 \quad (Q5)$$

$$—CH{=}\underset{\underset{CH_3}{|}}{C}—CH_3 \quad (Q6)$$

$$—C{\equiv}CH \quad (Q7)$$

$$—\overset{O}{\overset{/\backslash}{CH{-}CH_2}} \quad (Q8)$$

$$—\overset{H}{\overset{N}{\overset{/\backslash}{CH{-}CH_2}}} \quad (Q9)$$

$$—SH \quad (Q10)$$

$$—CHO \quad (Q11)$$

$$—OH \quad (Q12)$$

$$—CO_2H \quad (Q13)$$

$$—N{=}C{=}O \quad (Q14)$$

$$—NH_2 \quad (Q15)$$

$$—SO_3H \quad (Q16)$$

$$—N{=}C{=}S \quad (Q17)$$

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula, n is an integer of 4 to 12, which is determined by the chemical structure of the discotic core (D). The 4 to 12 combinations of L and Q can be different from each other. However, the combinations are preferably identical.

Two or more discotic liquid crystal molecules can be used in combination. For example, a molecule containing asymmetric carbon atom in the divalent linking group (L) can be used in combination with a molecule containing no asymmetric carbon atom. Further, a molecule having a polymerizable group (Q) can be used in combination with a molecule having no polymerizable group. A molecule containing asymmetric carbon atom and having no polymerizable group is preferably used in combination with a molecule having a polymerizable group and containing no asymmetric carbon atom. The last combination can also be considered that only a molecule having a polymerizable group and containing no asymmetric carbon atom functions as a discotic liquid crystal molecule, while a molecule containing asymmetric carbon atom and having no polymerizable group functions as a chiral agent (described below).

The discotic liquid crystal molecule having no polymerizable group is obtained by replacing the polymerizable group (Q) of the above-described polymerizable discotic liquid crystal molecule with hydrogen or an alkyl group. Accordingly, the discotic liquid crystal molecule having no polymerizable group preferably is a compound represented by the following formula.

$$D(-L-R)_n$$

in which D is a discotic core; L is a divalent linking group; R is hydrogen or an alkyl group; and n is an integer of 4 to 12.

Examples of the discotic cores are the same as the examples of the cores in the polymerizable discotic liquid crystal molecule, except that LQ or QL is replaced with LR or RL.

Examples of the divalent linking groups are also the same as the examples of the linking groups in the polymerizable discotic liquid crystal molecule.

The alkyl group of R contains preferably 1 to 40 carbon atoms, and more preferably 1 to 30 carbon atoms. An alkyl group preferably has a chain structure rather than a cyclic structure. An alkyl group having a straight chain (normal alkyl group) is preferred to a branched alkyl group. R preferably is hydrogen or a normal alkyl group having 1 to 30 carbon atoms.

In place of introducing asymmetric carbon atom into the divalent linking group of the discotic liquid crystal molecule, the discotic liquid crystal molecules can also be spirally twisted by adding an optical active compound containing asymmetric carbon atom (chiral agent) into the optically anisotropic layer. Various natural or synthetic optical active compounds can be used as the chiral agent. The chiral agent can have a polymerizable group, which is the same as or similar to the polymerizable group of the discotic liquid crystal compound. The discotic liquid crystal molecules are fixed in the optically anisotropic layer by a polymerization reaction after the molecules are essentially vertically (homogeneously) aligned. The chiral agent having a polymerizable group can also be fixed by the same or a similar polymerization reaction.

The optically anisotropic layer can further contain a fluorine containing surface active agent or a cellulose ester, which has a function of uniformly and essentially vertically (homogeneously) aligning discotic liquid crystal molecules placed near an interface between the layer and the air.

The fluorine containing surface active agent comprises a hydrophobic group containing fluorine, a nonionic, anionic, cationic or amphoteric hydrophilic group and an optional linking group.

The fluorine containing surface active agent comprising one hydrophobic group and one hydrophilic group is represented by the following formula.

$$Rf-L^5-Hy$$

in which Rf is a monovalent hydrocarbon group substituted with fluorine; $L^5$ is a single bond or divalent linking group; and Hy is a hydrophobic group.

Rf in the formula functions as a hydrophobic group. The hydrocarbon group preferably is an alkyl group or an aryl group. The alkyl group preferably has 3 to 30 carbon atoms. The aryl group preferably has 6 to 30 carbon atoms.

All or a part of hydrogen atoms contained in the hydrocarbon group is substituted with fluorine. At least 50% of hydrogen atomss are preferably substituted with fluorine. More preferably at least 60%, further preferably at least 70%, and most preferably at least 80% of hydrogen atoms are substituted with fluorine.

The other hydrogens may be substituted with other halogen atoms (e.g., chlorine, bromine).

Examples of Rf are shown below.

| Rf1: | $n\text{-}C_8F_{17}-$ |
|---|---|
| Rf2: | $n\text{-}C_6F_{13}-$ |
| Rf3: | $Cl-(CF_2-CFCl)_3-CF_2-$ |
| Rf4: | $H-(CF_2)_8-$ |
| Rf5: | $H-(CF_2)_{10}-$ |
| Rf6: | $n\text{-}C_9F_{19}-$ |
| Rf7: | Pentafluorophenyl |
| Rf8: | $n\text{-}C_7F_{15}-$ |
| Rf9: | $Cl-(CF_2-CFCl)_2-CF_2-$ |
| Rf10: | $H-(CF_2)_4-$ |
| Rf11: | $H-(CF_2)_6-$ |
| Rf12: | $Cl-(CF_2)_6-$ |
| Rf13: | $C_3F_7-$ |

In the formula, the divalent linking group is preferably selected from the group consisting of an alkylene group, an arylene group, a divalent heterocyclic group, —CO—, —NR— (in which R is hydrogen or an alkyl group having 1 to 5 carbon atoms), —O—, —SO$_2$— and a combination thereof.

Examples of $L^4$ in the formula are shown below. In the following examples, the left side is attached to a hydrophobic group (Rf) and the right side is attached to a hydrophilic group (Hy). AL means an alkylene group, AR means an arylene group, and Hc means a heterocyclic group. The alkylene group, the arylene group and the heterocyclic group may have a substituent group (e.g., an alkyl group).

| L0: | a single bond |
|---|---|
| L51: | $-SO_2-NR-$ |
| L52: | $-AL-O-$ |
| L53: | $-CO-NR-$ |
| L54: | $-AR-O-$ |
| L55: | $-SO_2-NR-AL-CO-O-$ |
| L56: | $-CO-O-$ |
| L57: | $-SO_2-NR-AL-O-$ |
| L58: | $-SO_2-NR-AL-$ |
| L59: | $-CO-NR-AL-$ |
| L60: | $-AL^1-O-AL^2-$ |
| L61: | $-Hc-AL-$ |
| L62: | $-SO_2-NR-AL^1-O-AL^2-$ |
| L63: | $-AR-$ |

-continued

| | |
|---|---|
| L64: | —O—AR—SO$_2$—NR—AL— |
| L65: | —O—AR—SO$_2$—NR— |
| L66: | —O—AR—O— |

Hy in the formula is a nonionic hydrophilic group, an anionic hydrophilic group, a cationic hydrophilic group or a combination thereof (an amphoteric hydrophilic group). A nonionic hydrophilic group is particularly preferred.

Examples of Hy are shown below.

Hy1: —(CH$_2$CH$_2$O)$_n$—H (n: an integer of 5 to 30)

Hy2: —(CH$_2$CH$_2$O)$_n$—R$^1$ (n: an integer of 5 to 30, R$^1$: an alkyl group having 1 to 6 carbon atoms)

Hy3: —(CH$_2$CHOHCH$_2$)$_n$—H (n: an integer of 5 to 30)

Hy4: —COOM (M: hydrogen, an alkali metal atom or dissociated)

Hy5: —SO$_3$M (M: hydrogen, an alkali metal atom or dissociated)

Hy6: —(CH$_2$CH$_2$O)$_n$—CH$_2$CH$_2$CH$_2$—SO$_3$M (n: an integer of 5 to 30, M; hydrogen or an alkali metal atom)

Hy7: —OPO(OH)$_2$

Hy8: —N$^+$(CH$_3$)$_3$.X$^-$ (X: a halogen atom)

Hy9: —COONH$_4$

The nonionic hydrophilic groups (Hy1, Hy2, Hy3) are preferred, and the hydrophilic group consisting of polyethylene oxide (Hy1) is particularly preferred.

The fluorine containing surface active agent may have two or more hydrophobic groups containing fluorine or two or more hydrophilic groups. Two or more fluorine containing surface active agents can be used in combination.

The surface active agents are described in various documents, such as Hiroshi Horiguchi, New Surface Active Agents, Sankyo Shuppan, 1975 (written in Japanese), M. J. Schick, Nonionic Surfactants, Marcell Dekker Inc., New York, 1967 and Japanese Patent Provisional Publication No. 7(1995)-13293.

The fluorine containing surface active agent is used in an amount of 0.01 to 30 wt. % based on the amount of the discotic liquid crystal molecules. The amount is preferably in the range of 0.05 to 10 wt. %, and more preferably in the range of 0.1 to 5 wt. %.

The cellulose ester preferably is a cellulose ester of a lower fatty acid.

The term "lower fatty acid" of the cellulose ester means a fatty acid having 1 to 6 carbon atoms. The lower fatty acid preferably has 2 to 5 carbon atoms, and more preferably has 2 to 4 carbon atoms. The fatty acid may have a substituent group (e.g., hydroxyl). Two or more fatty acids may form an ester with cellulose acetate. Examples of the cellulose esters of the lower fatty acids include cellulose acetate, cellulose propionate, cellulose butyrate, cellulose hydroxypropionate, cellulose acetate propionate and cellulose acetate butyrate. Cellulose acetate butyrate is particularly preferred. Butyric acid content of the cellulose acetate butyrate is preferably not less than 30%, more preferably in the range of 30 to 80%. Acetic acid content of the cellulose acetate butyrate is preferably less than 30%, and more preferably in the range of 1 to 30%.

The coating amount of the cellulose ester is preferably in the range of 0.005 to 0.5 g per m$^2$, more preferably in the range of 0.01 to 0.45 g per m$^2$, further preferably in the range of 0.02 to 0.4 g per m$^2$, and most preferably in the range of 0.03 to 0.35 g per m$^2$. The amount of the cellulose ester is also preferably in the range of 0.1 to 5 wt. % based on the amount of the discotic liquid crystal molecule.

An optically anisotropic layer can be formed by coating a solution containing the discotic liquid crystal molecule and optional components such as the chiral agent, the above-mentioned additive (a fluorine containing surface active agent, a cellulose ester), a polymerization initiator (described below) on an orientation layer.

A solvent for the preparation of the solution preferably is an organic solvent. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as an extrusion coating method, a direct gravure coating method, a reverse gravure coating method, a die coating method or a bar coating method.

The aligned discotic liquid crystal molecules are preferably fixed while keeping the essentially vertical (homogeneous) alignment. The discotic liquid crystal molecules are fixed preferably by a polymerization reaction of the polymerizable groups (Q) in the molecules. The polymerization reaction can be classified a thermal reaction using a thermal polymerization initiator and a photo reaction using a photo polymerization initiator. A photo polymerization reaction is preferred.

Examples of the photo polymerization initiators include (α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray.

The exposure energy is preferably in the range of 20 to 5,000 mJ per cm$^2$, and more preferably in the range of 100 to 800 mJ per cm$^2$. The light irradiation can be conducted while heating the layer to accelerate the photo polymerization reaction.

The optically anisotropic layer has a thickness preferably in the range of 0.1 to 50 μm, more preferably 1 to 30 μm, and most preferably in the range of 5 to 20 μm. In the case that two optical compensatory sheets are used in a liquid crystal display, the preferred thickness of the layer is half of the preferred thickness (described above) in the case that one optical compensatory sheet is used in a liquid crystal display.

The discotic liquid crystal molecules in the optically anisotropic layer are aligned at an average inclined angle in the range of 50° to 90°. The inclined angle is preferably uniform. However, the inclined angle can be changed if the angle is continuously changed along the thickness of the optical anisotropic layer.

The twist angle of the discotic liquid crystal molecules is preferably similar to a twist angle of a liquid crystal cell of an STN mode, which is usually in the range of 180° to 360°, and preferably in the range of 180° to 270°. The difference between the twist angles is preferably not larger than 10°. In the case that one optical compensatory sheet is used in a liquid crystal display, the twist angle of the discotic liquid crystal molecules is preferably in the range of 180° to 360°. In the case that two optical compensatory sheets are used in a liquid crystal display, the twist angle of the discotic liquid crystal molecules is preferably in the range of 90° to 180°. In a liquid crystal display of an STN mode, a wavelength dependency of the birefringence ($\Delta n(\lambda)$) of an optically anisotropic layer is preferably similar to a wavelength dependency of the birefringence of a liquid crystal cell of an STN mode.

[Liquid Crystal Display]

The present invention is particularly effective in a liquid crystal display of an STN mode.

The liquid crystal display of an STN mode comprises a liquid crystal cell of an STN mode, two polarizing elements arranged on each side of the liquid crystal cell, and one or two optical compensatory sheets arranged between the liquid crystal cell and the polarizing element.

The alignment of rod-like liquid crystal molecule in the liquid crystal cell and the alignment of the discotic liquid crystal molecules in the optical compensatory sheet is preferably so adjusted that a director of a rod-like liquid crystal molecule adjacent to the optical compnesatory sheet is the essentially same direction of a director of the discotic liquid crystal molecule adjacent to the liquid crystal cell. The director of the rod-like liquid crystal molecule means the direction of the long axis of the rod-like molecule. The director of the discotic liquid crystal molecule means the direction of a normal line of the discotic core plane. The essentially same direction means that the angle between the directors viewed along a normal line of the liquid crystal cell.

The transparent substrate of the optical compensatory sheet can be used as a protective film of a polarizing plate (on the side facing the liquid crystal cell). In this case, a slow axis (direction showing the maximum refractive index) of the transparent substrate is preferably so arranged that the slow axis is essentially perpendicular or parallel to the transmission axis (direction showing the maximum transmittance) of the polarizing plate. The term "essentially perpendicular or parallel" means that a margin for error based on the exact angle is in the range of ±10°.

EXAMPLE 1

A triacetyl cellulose film (thickness: 100 μm, size: 270 mm×100 mm, Fuji Tac, Fuji Photo Film Co., Ltd.) was used as a transparent substrate.

The acrylic copolymer (PA1) and triethylamine (20 wt. % of the copolymer) were dissolved in a mixture of methanol and water (volume ratio: 30/70) to prepare a 5 wt. % solution. The solution was coated on the transparent substrate by using a bar coater (thickness: 1 μm), and air-dried at 100° C. for 5 minutes. The surface was subjected to a rubbing treatment to form an orientation layer.

Acrylic copolymer (PA1)

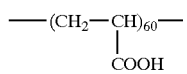

-continued

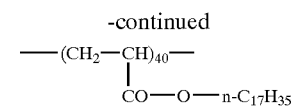

The following coating solution was coated on the orientation layer according to an extrusion method.

| Coating solution for optically anisotropic layer | |
|---|---|
| The following discotic liquid crystal compound (1) | 80 weight parts |
| The following discotic liquid crystal compound (2) | 20 weight parts |
| The following fluorine atom containing surface active agent | 0.1 weight part |
| A photopolymerization initiator (Irgacure 907, Ciba-Geigy) | 0.2 weight part |
| Methyl ethyl ketone | 185 weight parts |

Discotic liquid crystal compound (1)

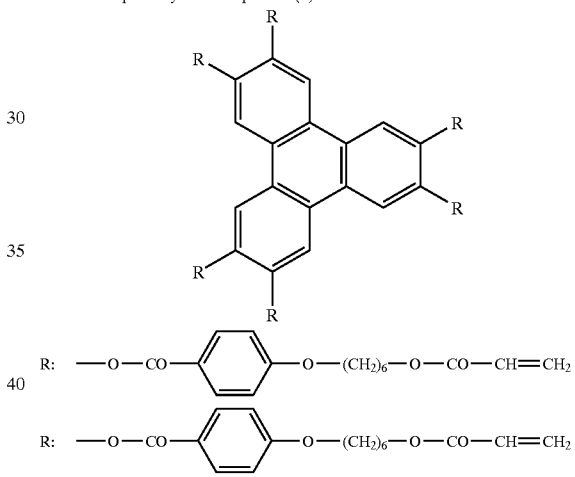

Discotic liquid crystal compound (2)

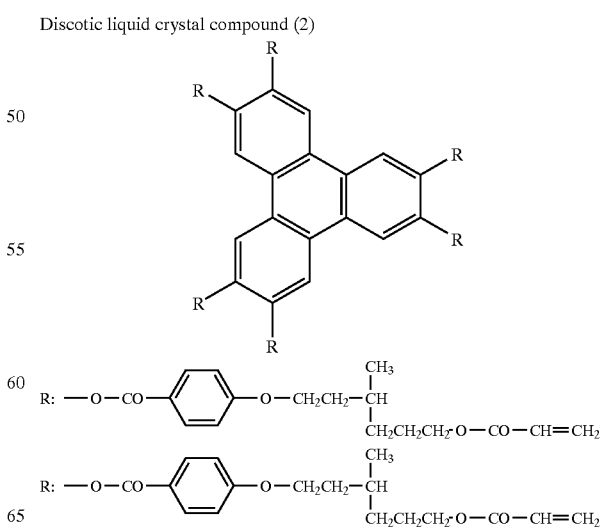

Fluorine atom containing surface active agent

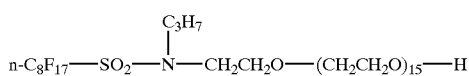

The coated layer was heated at 130° C. to essentially vertically align the discotic liquid crystal compound. The layer was irradiated with an ultraviolet ray for 4 seconds to polymerize the discotic liquid crystal compound and to fix the alignment. Thus an optical compensatory sheet was prepared. In the optically anisotropic layer, the discotic liquid crystal molecules are twisted, and are essentially vertically aligned.

Polarized light was incident on the transparent substrate of the optical compensatory sheet along a direction of 45° based on the rubbing direction of the orientation layer. Polarization of transmitted light was analyzed (Multi Chanel Photo Analizer, Ohtsuka Electronics Co., Ltd.). As a result, the twist angle was in the range of 230° to 250°.

Another optical compensatory sheet was prepared in the same manner except that the discotic liquid crystal compound (2), which functions as a chiral agent, was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 80° to 85°.

Further, an antiparallel cell was prepared by using a horizontal orientation layer. The discotic liquid crystal compounds (1) and (2) were inserted into the antiparallel cell. The retardation in plane (Re) of the obtained liquid crystal cell was measured by using an ellipsometer. The retardation was divided by the thickness of the cell to determine Δn of 0.07.

EXAMPLE 2

An optical compensatory sheet was prepared and evaluated in the same manner as in Example 1, except that the acrylic copolymer (PA20) was used in place of the acrylic copolymer (PA1). The average inclined angle of the discotic liquid crystal molecules was 75°.

Acrylic copolymer (PA20)

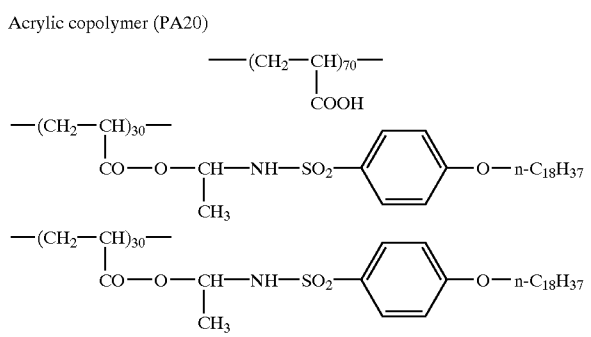

EXAMPLE 3

An optical compensatory sheet was prepared and evaluated in the same manner as in Example 1, except that the acrylic copolymer (PA40) was used in place of the acrylic copolymer (PA1). The average inclined angle of the discotic liquid crystal molecules was 70°.

Acrylic copolymer (PA40)

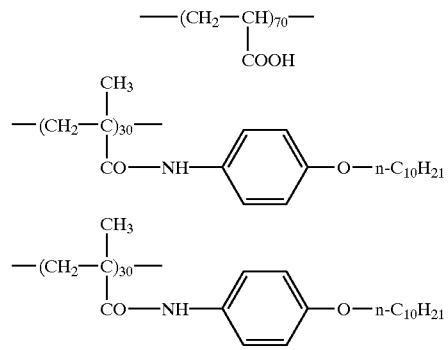

EXAMPLE 4

An optical compensatory sheet was prepared and evaluated in the same manner as in Example 1, except that the acrylic copolymer (PA50) was used in place of the acrylic copolymer (PA1). The average inclined angle of the discotic liquid crystal molecules was 70°.

Acrylic copolymer (PA50)

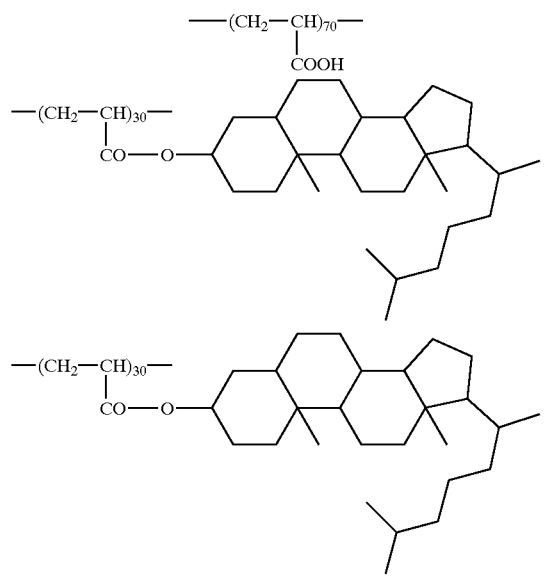

EXAMPLE 5

A liquid crystal display of an STN mode shown in FIG. 3(e) was prepared by using an optical compensatory sheet prepared in Example 1. Along the interface between the liquid crystal cell and the optical compensatory sheet, the director of the discotic liquid crystal molecule of the sheet was arranged at the same direction of the director of the rod-like liquid crystal molecule of the cell. The angle between the absorbing axis of the upper polarizing plate and the director of the rod-like liquid crystal molecule adjacent to the upper orientation layer was adjusted to 45°. The absorbing axis of the upper polarizing plate was perpendicular to the absorbing axis of the lower polarizing plate.

A voltage was applied to the obtained liquid crystal display of an STN mode to display an image of a normally black mode. The viewing angle showing a contrast ratio of

EXAMPLE 6

An optical compensatory sheet was prepared and evaluated in the same manner as in Example 1, except that the following coating solution for the optically anisotropic layer was used. The results were the same as the results of Example 1.

| Coating solution for optically anisotropic layer | |
| --- | --- |
| The following discotic liquid crystal compound (3) | 63 weight parts |
| The discotic liquid crystal compound (2) used in Example 1 | 27 weight parts |
| The following polymerizable plasticizer | 10 weight parts |
| A photopolymerization initiator (Irgacure 907, Ciba-Geigy) | 1 weight part |
| Cellulose acetate butyrate (CAB551-0.2, Eastman Chemical) | 0.5 weight part |
| Methyl ethyl ketone | 184.5 weight parts |

Discotic liquid crystal compound (3)
get,0001
get,0002
Polymerizable plasticizer
get,0003

EXAMPLE 7

A triacetyl cellulose film (thickness: 100 μm, size: 270 mm×100 mm, Fuji Tac, Fuji Photo Film Co., Ltd.) was used as a transparent substrate.

The acrylic copolymer (PA41) and triethylamine (20 wt. % of the copolymer) were dissolved in a mixture of methanol and water (volume ratio: 30/50) to prepare a 5 wt. % solution. The solution was coated on the transparent substrate by using a bar coater (thickness: 1 μm), and air-dried at 100° C. for 5 minutes. The surface was subjected to a rubbing treatment to form an orientation layer.

Acrylic copolymer (PA41)

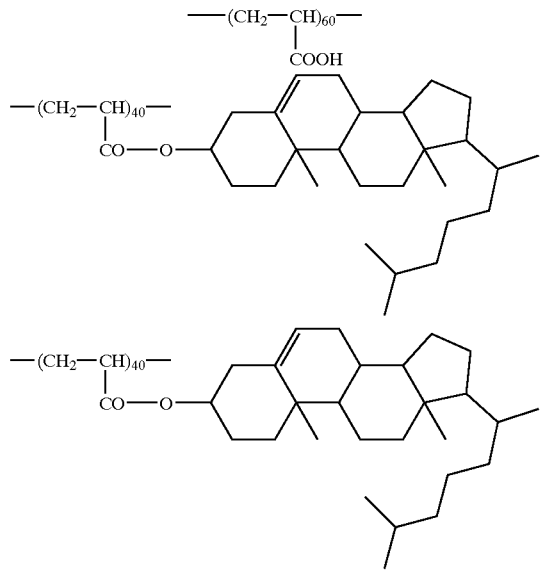

An optically anisotropic layer was formed on the orientation layer in the same manner as in Example 1 to prepare an optical compensatory sheet.

Polarized light was incident on the transparent substrate of the optical compensatory sheet along a direction of 45° based on the rubbing direction of the orientation layer. Polarization of transmitted light was analyzed (Multi Chanel Photo Analizer, Ohtsuka Electronics Co., Ltd.). As a result, the twist angle was in the range of 230° to 250°.

Another optical compensatory sheet was prepared in the same manner except that the discotic liquid crystal compound (2), which functions as a chiral agent was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 80° to 85°.

Further, an antiparallel cell was prepared by using a horizontal orientation layer. The discotic liquid crystal compounds (1) and (2) were inserted into the antiparallel cell. The retardation in plane (Re) of the obtained liquid crystal cell was measured by using an ellipsometer. The retardation was divided by the thickness of the cell to determine Δn of 0.07.

EXAMPLE 8

An optical compensatory sheet was prepared and evaluated in the same manner as in Example 7, except that the acrylic copolymer (PA51) was used in place of the acrylic copolymer (PA41). The average inclined angle of the discotic liquid crystal molecules was 75°.

Acrylic copolymer (PA51)

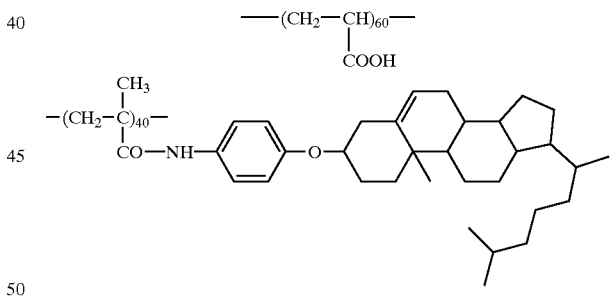

EXAMPLE 9

An optical compensatory sheet was prepared and evaluated in the same manner as in Example 7, except that the acrylic copolymer (PA60) was used in place of the (meth) acrylic copolymer (PA41). The average inclined angle of the discotic liquid crystal molecules was 70°.

Acrylic copolymer (PA60)

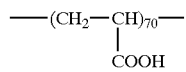

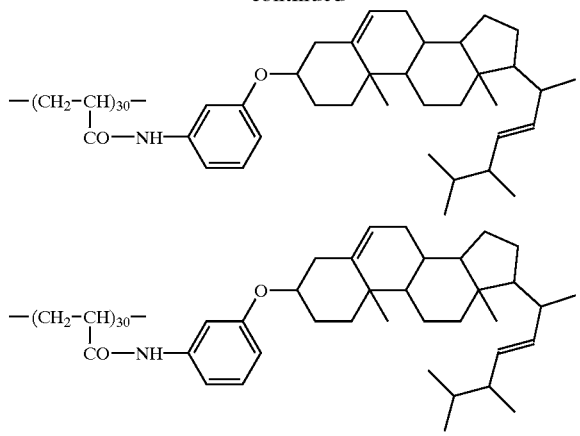

EXAMPLE 10

An optical compensatory sheet was prepared and evaluated in the same manner as in Example 7, except that the acrylic copolymer (PA71) was used in place of the acrylic copolymer (PA41). The average inclined angle of the discotic liquid crystal molecules was 80°.

Acrylic copolymer (PA71)

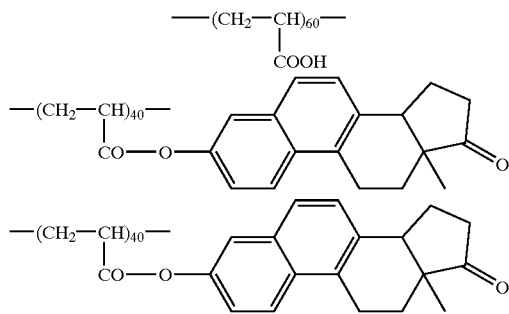

EXAMPLE 11

A liquid crystal display of an STN mode shown in FIG. 3(e) was prepared by using an optical compensatory sheet prepared in Example 7. Along the interface between the liquid crystal cell and the optical compensatory sheet, the director of the discotic liquid crystal molecule of the sheet was arranged at the same direction of the director of the rod-like liquid crystal molecule of the cell. The angle between the absorbing axis of the upper polarizing plate and the director of the rod-like liquid crystal molecule adjacent to the upper orientation layer was adjusted to 45°. The absorbing axis of the upper polarizing plate was perpendicular to the absorbing axis of the lower polarizing plate.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more.

EXAMPLE 12

An optical compensatory sheet was prepared and evaluated in the same manner as in Example 7, except that the following coating solution optically anisotropic layer was used. The results were the same as the results of Example 7.

| Coating solution for optically anisotropic layer | |
|---|---|
| The discotic liquid crystal compound (3) used in Example 6 | 63 weight parts |
| The discotic liquid crystal compound (2) used in Example 1 | 22 weight parts |
| The polymerizable plasticizer used in Example 6 | 10 weight parts |
| A photopolymerization initiator (Irgacure 907, Ciba-Geigy) | 1 weight part |
| Cellulose acetate butyrate (CAB551-0.2, Eastman Chemical) | 0.5 weight part |
| Methyl ethyl ketone | 184.5 weight parts |

EXAMPLE 13

A triacetyl cellulose film (thickness: 100 μm, size: 270 mm×100 mm, Fuji Tac, Fuji Photo Film Co., Ltd.) was used as a transparent substrate.

The acrylic copolymer (PA201) and triethylamine (20 wt. % of the copolymer) were dissolved in a mixture of methanol and water (volume ratio: 30/70) to prepare a 5 wt. % solution. The solution was coated on the transparent substrate by using a bar coater (thickness: 1 μm), and air-dried at 100° C. for 5 minutes. The surface was subjected to a rubbing treatment to form an orientation layer.

Acrylic copolymer (PA201)

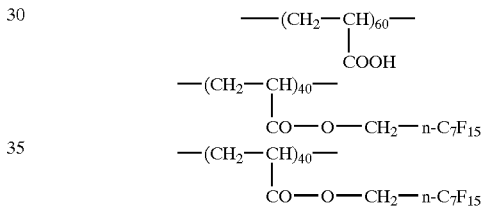

An optically anisotropic layer was formed on the orientation layer in the same manner as in Example 1 to prepare an optical compensatory sheet.

Polarized light was incident on the transparent substrate of the optical compensatory sheet along a direction of 45° based on the rubbing direction of the orientation layer. Polarization of transmitted light was analyzed (Multi Chanel Photo Analizer, Ohtsuka Electronics Co., Ltd.). As a result, the twist angle was in the range of 230° to 250°.

Another optical compensatory sheet was prepared in the same manner except that the discotic liquid crystal compound (2), which functions as a chiral agent was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 80° to 85°.

Further, an antiparallel cell was prepared by using a horizontal orientation layer. The discotic liquid crystal compounds (1) and (2) were inserted into the antiparallel cell. The retardation in plane (Re) of the obtained liquid crystal cell was measured by using an ellipsometer. The retardation was divided by the thickness of the cell to determine Δn of 0.07.

EXAMPLE 14

An optical compensatory sheet was prepared and evaluated in the same manner as in Example 13, except that the acrylic copolymer (PA210) was used in place of the (meth) acrylic copolymer (PA201). The average inclined angle of the discotic liquid crystal molecules was 70°.

Acrylic copolymer (PA210)

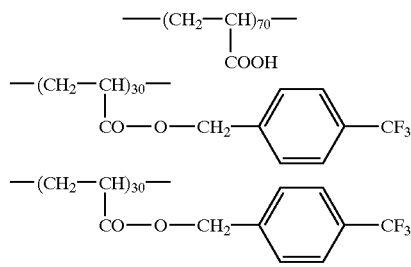

EXAMPLE 15

An optical compensatory sheet was prepared and evaluated in the same manner as in Example 13, except that the acrylic copolymer (PA225) was used in place of the acrylic copolymer (PA201). The average inclined angle of the discotic liquid crystal molecules was 60°.

Acrylic copolymer (PA225)

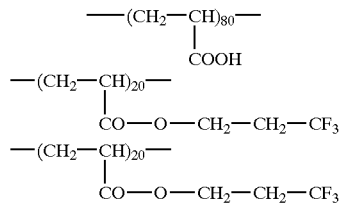

EXAMPLE 16

An optical compensatory sheet was prepared and evaluated in the same manner as in Example 13, except that the acrylic copolymer (PA240) was used in place of the acrylic copolymer (PA201). The average inclined angle of the discotic liquid crystal molecules was 75°.

Acrylic copolymer (PA240)

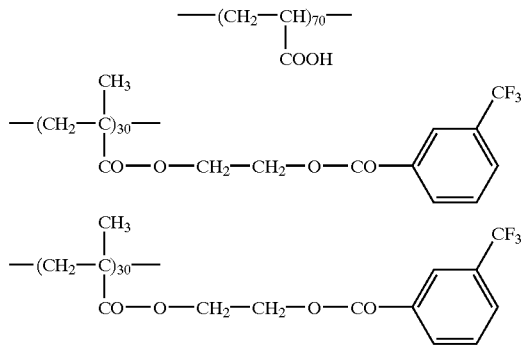

EXAMPLE 17

A liquid crystal display of an STN mode shown in FIG. 3(e) was prepared by using an optical compensatory sheet prepared in Example 13. Along the interface between the liquid crystal cell and the optical compensatory sheet, the director of the discotic liquid crystal molecule of the sheet was arranged at the same direction of the director of the rod-like liquid crystal molecule of the cell. The angle between the absorbing axis of the upper polarizing plate and the director of the rod-like liquid crystal molecule adjacent to the upper orientation layer was adjusted to 45°. The absorbing axis of the upper polarizing plate was perpendicular to the absorbing axis of the lower polarizing plate.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more.

EXAMPLE 18

An optical compensatory sheet was prepared and evaluated in the same manner as in Example 13, except that the following coating solution optically anisotropic layer was used. The results were the same as the results of Example 13.

| Coating solution for optically anisotropic layer | |
| --- | --- |
| The discotic liquid crystal compound (3) used in Example 6 | 63 weight parts |
| The discotic liquid crystal compound (2) used in Example 1 | 27 weight parts |
| The polymerizable plasticizer used in Example 6 | 10 weight parts |
| A photopolymerization initiator (Irgacure 907, Ciba-Geigy) | 1 weight part |
| Cellulose acetate butyrate (CAB551-0.2, Eastman Chemical) | 0.5 weight part |
| Methyl ethyl ketone | 184.5 weight parts |

EXAMPLE 19

A triacetyl cellulose film (thickness: 100 μm, size: 270 mm×100 mm, Fuji Tac, Fuji Photo Film Co., Ltd.) was used as a transparent substrate.

The acrylic copolymer (PA310) and triethylamine (20 wt. % of the copolymer) were dissolved in a mixture of methanol and water (volume ratio: 30/70) to prepare a 5 wt. % solution. The solution was coated on the transparent substrate by using a bar coater (thickness: 1 μm), and air-dried at 100° C. for 5 minutes. The surface was subjected to a rubbing treatment to form an orientation layer.

Acrylic copolymer (PA310)

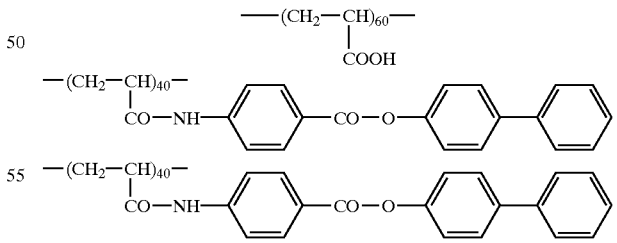

An optically anisotropic layer was formed on the orientation layer in the same manner as in Example 1 to prepare an optical compensatory sheet.

The Δnd of the optical compensatory sheet measured at the wavelength of 550 nm was 440 nm. The twist angle of the discotic liquid crystal compound was 120°.

Another optical compensatory sheet was prepared in the same manner except that the discotic liquid crystal compound (2) was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 85° to 90°.

EXAMPLE 20

An optical compensatory sheet was prepared and evaluated in the same manner as in Example 19, except that the following coating solution for the optically anisotropic layer was used.

| Coating solution for optically anisotropic layer | |
|---|---|
| The following discotic liquid crystal compound (4) | 91 weight parts |
| The following chiral agent | 2.0 weight parts |
| Cellulose acetate butyrate (CAB551-0.2, Eastman Chemical, acetic acid content: 2.0%, butyric acid content: 52.0%, number average molecular weight: 30,000) | 0.25 weight part |
| Cellulose acetate butyrate (CAB531-1, Eastman Chemical, acetic acid content: 3.0%, butyric acid content: 50.0%, number average molecular weight: 40,000) | 0.25 weight part |
| Trimethylolpropane triacrylate denatured with ethylene oxide (V#360, Osaka Organic Chemicals Co;, Ltd.) | 9 weight parts |
| A photopolymerization initiator (Irgacure 369, Ciba-Geigy) | 3 weight parts |
| Methyl ethyl ketone | 120 weight parts |

Discotic liquid crystal compound (4)

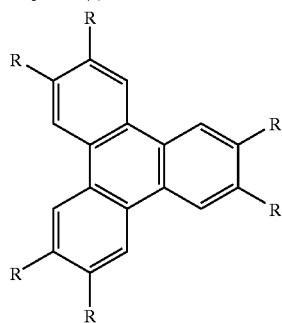

R: 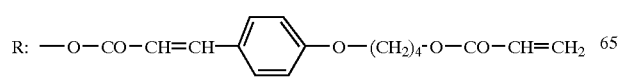

Chiral agent

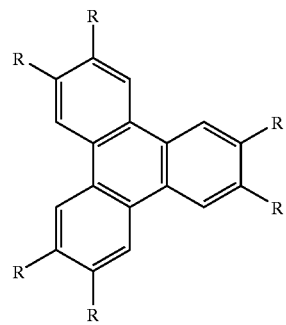

R: 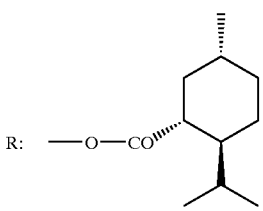

The Δnd of the optical compensatory sheet measured at the wavelength of 550 nm was 880 nm. The twist angle of the discotic liquid crystal compound was 240°.

The alignment of the discotic liquid crystal compound was observed with a polarizing microscope. As a result, all molecules were uniformly aligned (mono domain alignment).

Another optical compensatory sheet was prepared in the same manner except that the chiral agent was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 85° to 90°.

EXAMPLE 21

An optical compensatory sheet was prepared and evaluated in the same manner as in Example 20, except that the acrylic copolymer (PA313) was used in place of the acrylic copolymer (PA310). The average inclined angle of the discotic liquid crystal molecules was 85°.

Acrylic copolymer (PA313)

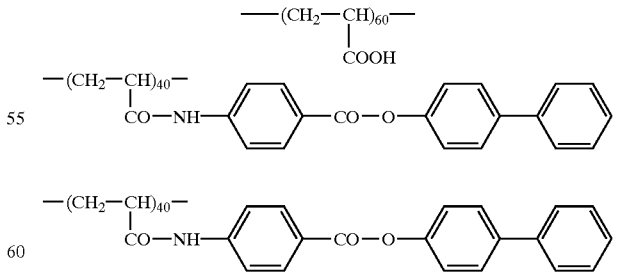

EXAMPLE 22

An optical compensatory sheet was prepared and evaluated in the same manner as in Example 20, except that the acrylic copolymer (PA319) was used in place of the acrylic copolymer (PA310). The average inclined angle of the discotic liquid crystal molecules was 85°.

Acrylic copolymer (PA319)

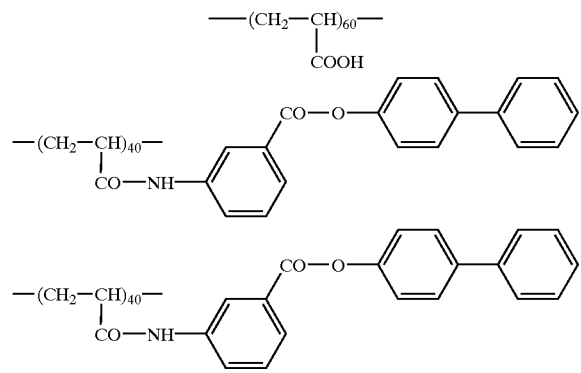

EXAMPLE 23

An optical compensatory sheet was prepared and evaluated in the same manner as in Example 20, except that the methacrylic copolymer (PA331) was used in place of the acrylic copolymer (PA310). The average inclined angle of the discotic liquid crystal molecules was 80°.

Methacrylic copolymer (PA313)

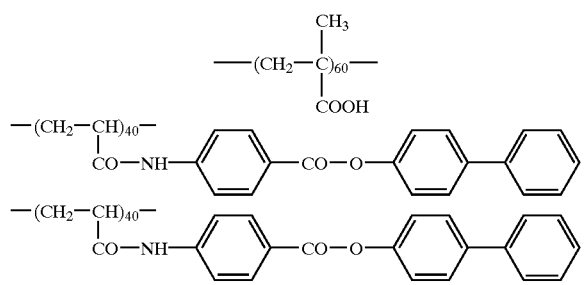

EXAMPLE 24

Two optical compensatory sheets prepared in Example 19 were attached to a lower side of a liquid crystal cell of an STN mode, which had a twist angle of 240° and Δnd of 880 nm. Two optical compensatory sheets were so arranged that the optically anisotropic layer faces to the cell, and that the director of the discotic liquid crystal molecule (the direction of the normal line of the discotic plane) of one optical compensatory sheet was directed to the same direction as the other sheet. Along the interface between the liquid crystal cell and the optical compensatory sheet, the director of the discotic liquid crystal molecule of the sheet was arranged at the same direction of the director of the rod-like liquid crystal molecule of the cell. Further, two polarizing plates were arranged on both sides according to a crossed Nicols arrangement to prepare a liquid crystal display of an STN mode.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more.

EXAMPLE 25

One optical compensatory sheet prepared in Example 20 were attached to a lower side of a liquid crystal cell of an STN mode, which had a twist angle of 240° and Δnd of 880 nm. The optical compensatory sheet was so arranged that the optically anisotropic layer faces to the cell. Along the interface between the liquid crystal cell and the optical compensatory sheet, the director of the discotic liquid crystal molecule of the sheet was arranged at the same direction of the director of the rod-like liquid crystal molecule of the cell. Further, two polarizing plates were arranged on both sides according to a crossed Nicols arrangement to prepare a liquid crystal display of an STN mode.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more.

EXAMPLE 26

A triacetyl cellulose film (thickness: 100 μm, size: 270 mm×100 mm, Fuji Tac, Fuji Photo Film Co., Ltd.) was used as a transparent substrate.

The acrylic copolymer (PA410) and triethylamine (20 wt. % of the copolymer) were dissolved in a mixture of methanol and water (volume ratio: 30/70) to prepare a 5 wt. % solution. The solution was coated on the transparent substrate by using a bar coater (thickness: 1 μm), and air-dried at 100° C. for 5 minutes. The surface was subjected to a rubbing treatment to form an orientation layer.

Acrylic copolymer (PA410)

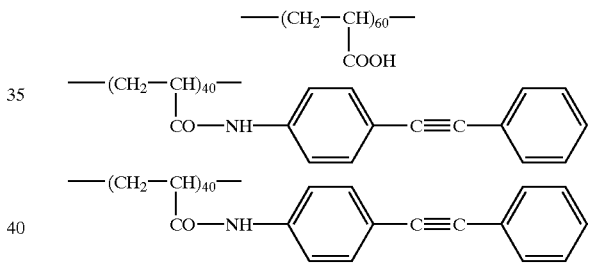

An optically anisotropic layer was formed on the orientation layer in the same manner as in Example 1 to prepare an optical compensatory sheet.

A polarizing light was incident on the transparent substrate of the optical compensatory sheet at the angle of 45° from the rubbing direction of the orientation layer to measure the twist angle. As a result, the twist angle of the discotic liquid crystal compound was 120°.

Another optical compensatory sheet was prepared in the same manner except that the discotic liquid crystal compound (2) was not used. In the optically anisotropic layer, the discotic liquid crystal molecules are not twisted, but are essentially vertically aligned. The retardation in plane (Re) of the sheet was measured to determine dependency of birefringence on a viewing angle. The average inclined angle was obtained by the dependency of birefringence. As a result, the average inclined angle was in the range of 85° to 90°.

EXAMPLE 27

An optical compensatory sheet was prepared and evaluated in the same manner as in Example 26, except that the acrylic copolymer (PA416) was used in place of the acrylic copolymer (PA410).

Acrylic copolymer (PA416)

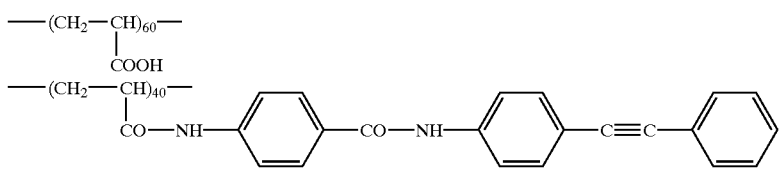

The Δnd of the optical compensatory sheet measured at the wavelength of 550 nm was 880 nm. The twist angle of the discotic liquid crystal compound was 240°. The average inclined angle of the discotic liquid crystal molecules was 80°.

EXAMPLE 28

An optical compensatory sheet was prepared and evaluated in the same manner as in Example 27, except that the acrylic copolymer (PA420) was used in place of the acrylic copolymer (PA416). The average inclined angle of the discotic liquid crystal molecules was 80°.

Acrylic copolymer (PA420)

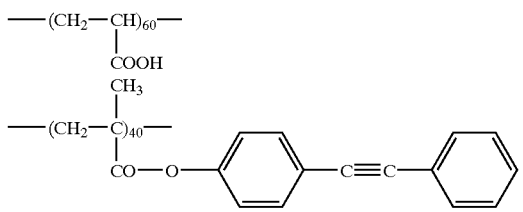

EXAMPLE 29

An optical compensatory sheet was prepared and evaluated in the same manner as in Example 27, except that the methacrylic copolymer (PA441) was used in place of the acrylic copolymer (PA416). The average inclined angle of the discotic liquid crystal molecules was 85° to 90°.

Methacrylic copolymer (PA441)

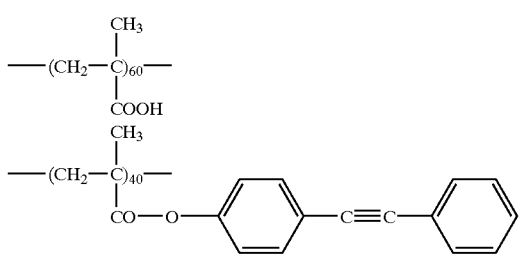

EXAMPLE 30

Two optical compensatory sheets prepared in Example 26 were attached to a lower side of a liquid crystal cell of an STN mode, which had a twist angle of 240° and Δnd of 880 nm. Two optical compensatory sheets were so arranged that the optically anisotropic layer faces to the cell, and that the director of the discotic liquid crystal molecule (the direction of the normal line of the discotic plane) of one optical compensatory sheet was directed to the same direction as the other sheet. Along the interface between the liquid crystal cell and the optical compensatory sheet, the director of the discotic liquid crystal molecule of the sheet was arranged at the same direction of the director of the rod-like liquid crystal molecule of the cell. Further, two polarizing plates were arranged on both sides according to a crossed Nicols arrangement to prepare a liquid crystal display of an STN mode.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more.

EXAMPLE 31

One optical compensatory sheet prepared in Example 27 were attached to a lower side of a liquid crystal cell of an STN mode, which had a twist angle of 240° and Δnd of 880 nm. The optical compensatory sheet was so arranged that the optically anisotropic layer faces to the cell. Along the interface between the liquid crystal cell and the optical compensatory sheet, the director of the discotic liquid crystal molecule of the sheet was arranged at the same direction of the director of the rod-like liquid crystal molecule of the cell. Further, two polarizing plates were arranged on both sides according to a crossed Nicols arrangement to prepare a liquid crystal display of an STN mode.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more.

EXAMPLE 32

Preparation of Orientation Layer

A triacetyl cellulose film (thickness: 100 μm, size: 270 mm×100 mm, Fuji Tac, Fuji Photo Film Co., Ltd.) was used as a transparent substrate.

The acrylic copolymer (PA310) used in Example 19 and triethylamine (20 wt. % of the copolymer) were dissolved in a mixture of methanol and water (volume ratio: 30/70) to prepare a 5 wt. % solution. The solution was coated on the transparent substrate by using a bar coater (thickness: 1 μm), and air-dried at 100° C. for 5 minutes. The surface was subjected to a rubbing treatment along a longitudinal direction. Immediately after the rubbing treatment, the layer was placed on a plate heated at 130° C. for 5 minutes to form an orientation layer.

Preparation of Optical Compensatory Sheet

To 1.0 g of the discotic liquid crystal compound (4) used in Example 20, 10 mg of cellulose acetate butyrate (CAB551-0.2, Eastman Chemical, acetic acid content: 2.0%, butyric acid content: 52.0%, number average molecular weight: 30,000), 100 mg of the polymerizable plasticizer used in Example 20, 20 mg of the chiral agent used in Example 20 and 30 mg of the following photopolymerization initiator were added. The mixture was dissolved in methyl ethyl ketone to prepare a coating solution of an optically anisotropic layer (solid content: 30 wt. %).

Photopolymerization initiator

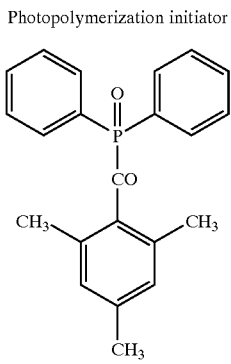

The coating solution was coated on the orientation layer by using a bar coater to form a coated layer of the discotic liquid crystal compound. The coated layer was placed on a metal roller having the surface temperature of 125° C. for 5 minutes, and then on a metal roller having the surface temperature of 30° C. for 1 minute to align the discotic liquid crystal compound essentially vertically. The layer was irradiated with an ultraviolet ray for 10 seconds by using an ultraviolet irradiating device (UVL-58 (16W), URUTOTA-VIOLET PRODUCTS) to form an optically anisotropic layer. The layer was observed with a polarizing microscope. As a result, a mono domain alignment of the discotic liquid crystal compound was observed. The retardation in plane ($\Delta$nd) of the optical compensatory sheet measured at the wavelength of 550 nm was 820 nm. The twist angle of the discotic liquid crystal compound was 240°. The thickness (d) was 6.7 $\mu$m.

EXAMPLE 33

A liquid crystal display of an STN mode shown in FIG. 3(e) was prepared by using an optical compensatory sheet prepared in Example 32. Along the interface between the liquid crystal cell and the optical compensatory sheet, the director of the discotic liquid crystal molecule of the sheet was arranged at the same direction of the director of the rod-like liquid crystal molecule of the cell. The angle between the absorbing axis of the upper polarizing plate and the director of the rod-like liquid crystal molecule adjacent to the upper orientation layer was adjusted to 45°. The absorbing axis of the upper polarizing plate was perpendicular to the absorbing axis of the lower polarizing plate.

A voltage was applied to the obtained liquid crystal display of an STN mode to display an image of a normally black mode. The viewing angle showing a contrast ratio of not less than 5 was measured. As a result, leftward and rightward viewing angle was 120° or more, and upward and downward viewing angle was 150° or more.

EXAMPLES 34–40

Orientation layers, optical compensatory sheets and liquid crystal displays were prepared and evaluated in the same manner as in Examples 32 & 33, except that the acrylic copolymers (PA505), (PA523), (PA532), (PA701), (PA727), (PA731) and (PA732) were used respectively in place of the acrylic copolymer (PA310). The results were the same as the results of Examples 32 & 33.

Acrylic copolymer (PA505)

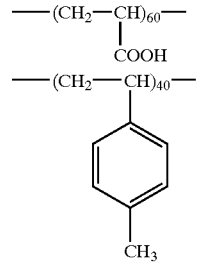

Acrylic copolymer (PA523)

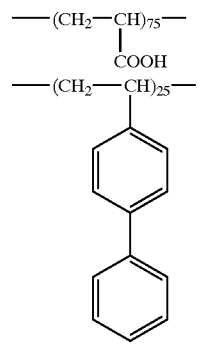

Acrylic copolymer (PA532)

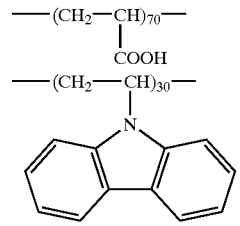

Acrylic copolymer (PA701)

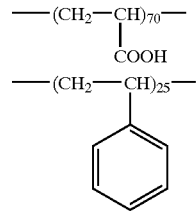

Acrylic copolymer (PA727)

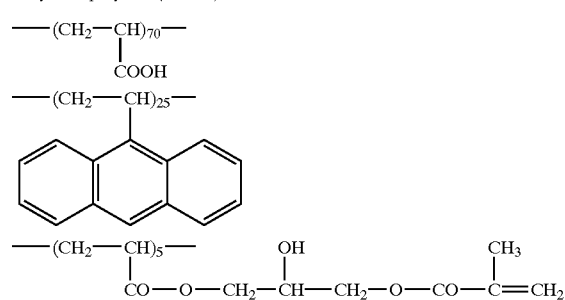

-continued

Acrylic copolymer (PA731)

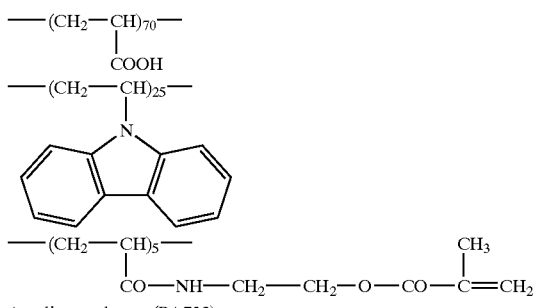

Acrylic copolymer (PA732)

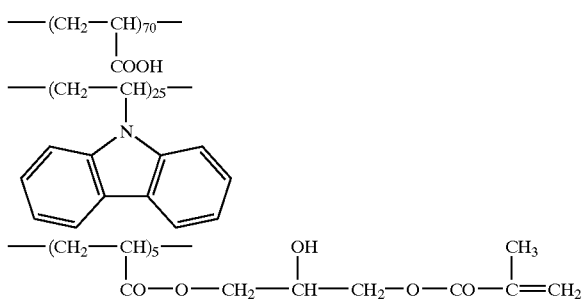

What is claimed is:

1. An orientation layer for aligning liquid crystal molecules provided on a substrate, wherein the orientation layer contains an acrylic copolymer or a methacrylic copolymer comprising repeating units represented by the formula (I) and repeating units represented by the formula (II) or (III):

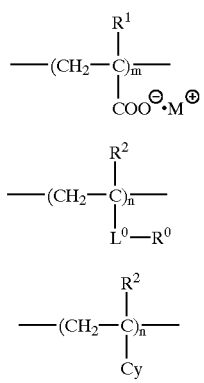

in which $R^1$ is hydrogen or methyl; $R^2$ is hydrogen, a halogen atom or an alkyl group having 1 to 6 carbon atoms; M is proton, an alkali metal ion or an ammonium ion; $L^0$ is a divalent linking group selected from the group consisting of —O—, —CO—, —NH—, —SO$_2$—, an alkylene group, an alkenylene group, an arylene group and a combination thereof; $R^0$ is a hydrocarbon group having 10 to 100 carbon atoms or a fluorine atom substituted hydrocarbon group having 1 to 100 carbon atoms; Cy is an alicyclic group, an aromatic group or a heterocyclic group; m is 10 to 99 mole %; and n is 1 to 90 mole %.

2. The orientation layer as defined in claim 1, wherein the acrylic copolymer or the methacrylic copolymer comprises the repeating units represented by the formula (I) and the repeating units represented by the formula (II), and wherein $R^0$ in the formula (II) is a hydrocarbon group having 10 to 100 carbon atoms containing at least two aromatic rings.

3. A process for the preparation of an orientation layer which comprises the steps of: coating a solution of an acrylic copolymer or a methacrylic copolymer comprising repeating units represented by the formula (I) and repeating units represented by the formula (II) or (III) on a substrate to form a coated layer; drying the coated layer; rubbing a surface of the coated layer; and heating the coated layer at 50 to 300° C. in this order:

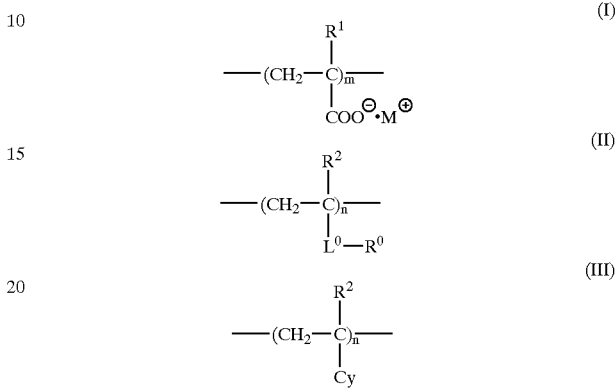

in which $R^1$ is hydrogen or methyl; $R^2$ is hydrogen, a halogen atom or an alkyl group having 1 to 6 carbon atoms; M is proton, an alkali metal ion or an ammonium ion; $L^0$ is a divalent linking group selected from the group consisting of —O—, —CO—, —NH—, —SO$_2$—, an alkylene group, an alkenylene group, an arylene group and a combination thereof; $R^0$ is a hydrocarbon group having 10 to 100 carbon atoms or a fluorine atom substituted hydrocarbon group having 1 to 100 carbon atoms; Cy is an alicyclic group, an aromatic group or a heterocyclic group; m is 10 to 99 mole %; and n is 1 to 90 mole %.

4. The process as defined in claim 3, wherein the coated layer is heated by attaching the layer to a surface of a plate heated at 100 to 250° C.

5. An optical compensatory sheet comprising a transparent substrate, an orientation layer and an optically anisotropic layer in this order, said optically anisotropic layer comprising discotic liquid crystal molecules, wherein the orientation layer contains an acrylic copolymer or a methacrylic copolymer comprising repeating units represented by the formula (I) and repeating units represented by the formula (II) or (III), said discotic liquid crystal molecules being aligned at an average inclined angle in the range of 50° to 90°:

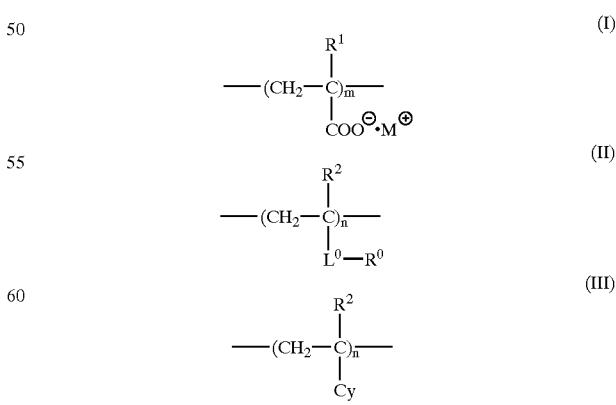

in which $R^1$ is hydrogen or methyl; $R^2$ is hydrogen, a halogen atom or an alkyl group having 1 to 6 carbon atoms;

M is proton, an alkali metal ion or an ammonium ion; $L^0$ is a divalent linking group selected from the group consisting of —O—, —CO—, —NH—, —SO$_2$—, an alkylene group, an alkenylene group, an arylene group and a combination thereof; $R^0$ is a hydrocarbon group having 10 to 100 carbon atoms or a fluorine atom substituted hydrocarbon group having 1 to 100 carbon atoms; Cy is an alicyclic group, an aromatic group or a heterocyclic group; m is 10 to 99 mole %; and n is 1 to 90 mole %.

6. The optical compensatory sheet as defined in claim 5, wherein the discotic liquid crystal molecules are twisted at a twist angle in the range of 90° to 360°.

7. The optical compensatory sheet as defined in claim 5, wherein the discotic liquid crystal molecules are polymerized.

8. The optical compensatory sheet as defined in claim 5, wherein the discotic liquid crystal molecules contain an asymmetric carbon atom.

9. The optical compensatory sheet as defined in claim 5, wherein the optically anisotropic layer further contains a chiral agent.

10. A liquid crystal display comprising a liquid crystal cell of an STN mode, two polarizing elements arranged on each side of the liquid crystal cell and one or two optical compensatory sheets arranged between the liquid crystal cell and the polarizing elements, wherein the optical compensatory sheet comprises a transparent substrate, an orientation layer and an optically anisotropic layer in order, said transparent substrate being adjacent to the polarizing element, said optically anisotropic layer comprising discotic liquid crystal molecules, said orientation layer containing an acrylic copolymer or a methacrylic copolymer comprising repeating units represented by the formula (I) and repeating units represented by the formula (II) or (III), said discotic liquid crystal molecules being aligned at an average inclined angle in the range of 50° to 90°, and said discotic liquid crystal molecules being twisted at a twist angle in the range of 90° to 360°:

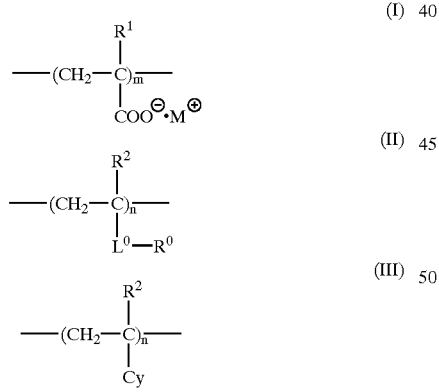

in which $R^1$ is hydrogen or methyl; $R^2$ is hydrogen, a halogen atom or an alkyl group having 1 to 6 carbon atoms; M is proton, an alkali metal ion or an ammonium ion; $L^0$ is a divalent linking group selected from the group consisting of —O—, —CO—, —NH—, —SO$_2$—, an alkylene group, an alkenylene group, an arylene group and a combination thereof; $R^0$ is a hydrocarbon group having 10 to 100 carbon atoms or a fluorine atom substituted hydrocarbon group having 1 to 100 carbon atoms; Cy is an alicyclic group, an aromatic group or a heterocyclic group; m is 10 to 99 mole %; and n is 1 to 90 mole %.

11. A method of alignment of discotic liquid crystal molecules, which comprises forming an optically anisotropic layer comprising discotic liquid crystal molecules on an orientation layer containing an acrylic copolymer or a methacrylic copolymer comprising repeating units represented by the formula (I) and repeating units represented by the formula (II) or (III) to align the discotic liquid crystal molecules at an average inclined angle in the range of 50° to 90°:

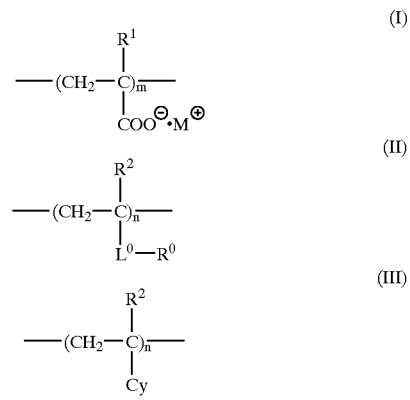

in which $R^1$ is hydrogen or methyl; $R^2$ is hydrogen, a halogen atom or an alkyl group having 1 to 6 carbon atoms; M is proton, an alkali metal ion or an ammonium ion; $L^0$ is a divalent linking group selected from the group consisting of —O—, —CO—, —NH—, —SO$_2$—, an alkylene group, an alkenylene group, an arylene group and a combination thereof; $R^0$ is a hydrocarbon group having 10 to 100 carbon atoms or a fluorine atom substituted hydrocarbon group having 1 to 100 carbon atoms; Cy is an alicyclic group, an aromatic group or a heterocyclic group; m is 10 to 99 mole %; and n is 1 to 90 mole %.

* * * * *